(12) United States Patent
    Das et al.

(10) Patent No.: US 10,975,461 B2
(45) Date of Patent: Apr. 13, 2021

(54) CASTING RECYCLED ALUMINUM SCRAP

(71) Applicant: Novelis Inc., Atlanta, GA (US)

(72) Inventors: Sazol Kumar Das, Acworth, GA (US);
    Simon William Barker, Woodstock, GA (US); Milan Felberbaum, Woodstock, GA (US); Rajeev G. Kamat, Marietta, GA (US); Duane E. Bendzinski, Woodstock, GA (US); Robert Bruce Wagstaff, Greenacres, WA (US); Samuel R. Wagstaff, Marietta, GA (US)

(73) Assignee: Novelis Inc., Atlanta, GA (US)

( * ) Notice: Subject to any disclaimer, the term of this patent is extended or adjusted under 35 U.S.C. 154(b) by 275 days.

(21) Appl. No.: 15/934,111

(22) Filed: Mar. 23, 2018

(65) Prior Publication Data

US 2018/0274072 A1    Sep. 27, 2018

Related U.S. Application Data

(60) Provisional application No. 62/475,489, filed on Mar. 23, 2017.

(51) Int. Cl.
    *C22F 1/047*    (2006.01)
    *B22D 11/00*    (2006.01)
    (Continued)

(52) U.S. Cl.
    CPC .............. *C22F 1/047* (2013.01); *B21B 3/00* (2013.01); *B22D 11/003* (2013.01); *B22D 11/06* (2013.01);
    (Continued)

(58) Field of Classification Search
    CPC ......................................... C22F 1/047
    (Continued)

(56) References Cited

U.S. PATENT DOCUMENTS 4,235,646 A    11/1980    Neufeld et al.
4,269,632 A    5/1981    Robertson et al.
    (Continued)

FOREIGN PATENT DOCUMENTS

DE    202017101498    8/2017
JP    07205534    8/1995
    (Continued)

OTHER PUBLICATIONS

JP 03-094040 A, Koichi, Aluminum alloy composite material for can end having bending part (Apr. 18, 1991) (Year: 1991).*

(Continued)

*Primary Examiner* — Coris Fung
*Assistant Examiner* — Danielle Carda
(74) *Attorney, Agent, or Firm* — Kilpatrick Townsend & Stockton LLP

(57) ABSTRACT

Techniques are disclosed for casting high-strength and highly formable metal products from recycled metal scrap without the addition of substantial or any amounts of primary aluminum. Additional alloying elements, such as magnesium, can be added to metal scrap, which can be cast and processed to produce a desirable metal coil at final gauge having desirable metallurgical and mechanical properties, such as high strength and formability. Thus, inexpensive and recycled metal scrap can be efficiently repurposed for new applications, such as automotive applications and beverage can stock.

30 Claims, 40 Drawing Sheets

(51) Int. Cl.
*B22D 15/00* (2006.01)
*B21B 3/00* (2006.01)
*B22D 11/06* (2006.01)
*C22C 1/02* (2006.01)
*C22B 21/00* (2006.01)
*C22C 21/06* (2006.01)

(52) U.S. Cl.
CPC ........ *B22D 15/005* (2013.01); *C22B 21/0092* (2013.01); *C22C 1/026* (2013.01); *C22C 21/06* (2013.01); *B21B 2003/001* (2013.01); *Y02P 10/20* (2015.11)

(58) Field of Classification Search
USPC ........................................................ 148/551
See application file for complete search history.

(56) References Cited

U.S. PATENT DOCUMENTS

| | | | |
|---|---|---|---|
| 4,282,044 A * | 8/1981 | Robertson | C22C 21/08 148/523 |
| 5,634,991 A | 6/1997 | Kamat et al. | |
| 5,681,405 A | 10/1997 | Newton et al. | |
| 5,833,775 A | 11/1998 | Newton et al. | |
| 6,120,621 A * | 9/2000 | Jin | B22D 11/06 148/415 |
| 8,524,015 B2 | 9/2013 | Zhao et al. | |
| 8,956,472 B2 | 2/2015 | Unal et al. | |
| 9,657,375 B2 | 5/2017 | Lorentzen et al. | |
| 2015/0101382 A1 | 4/2015 | Selepack | |

FOREIGN PATENT DOCUMENTS

| | | |
|---|---|---|
| JP | 2000160272 | 6/2000 |
| JP | 2002275566 | 9/2002 |
| JP | 2005344173 A * | 12/2005 |
| WO | 9628582 | 9/1996 |
| WO | 2016149061 | 9/2016 |

OTHER PUBLICATIONS

JP 2007-51307 A, Suzuki, Aluminum alloy sheet for can body having excellent bottom wrinkle property, and its manufacturing method (Mar. 1, 2007) (Year: 2007).*
Translation JP-2005344173-A (Year: 2005).*
Ford Motor Company, Engineering Material Specification, Aluminum Alloy, Sheet, Non-Heat Treatable, Reduce Ludering WSS-M2A176-A1 and Aluminum Alloy, Sheet, Non-Heat Treatable, Structural WSS-M2A176-A2, 2014.
International Application No. PCT/US2018/024010, "International Search Report and Written Opinion", dated May 25, 2018, 13 pages.
The Aluminum Association, "International Alloy Designations and Chemical Composition Limits for Wrought Aluminum and Wrought Aluminum Alloys", Feb. 2009, 37 pages.
Yoshida et al., "A New Used Aluminum Beverage Can Recycling System", Proceedings of the 12th International Conference on Aluminium Alloys. 2010.
German Application No. 20 2017 101 498.3, "Office Action", dated Jun. 26, 2017, 1 page.
European Application No. 18716840.6, Office Action, dated Aug. 25, 2020, 10 pages.
Korean Application No. 10-2019-7031262, Office Action, dated Jan. 22, 2021, 12 pages.
Japanese Application No. 2019-552143, Office Action, dated Dec. 8, 2020, 10 pages.

* cited by examiner

4302

4304

4306

4702

4704

4706

CASTING RECYCLED ALUMINUM SCRAP

CROSS-REFERENCE TO RELATED APPLICATION

The present application claims the benefit of U.S. Provisional Application No. 62/475,489, filed Mar. 23, 2017, the disclosure of which is hereby incorporated by reference in its entirety.

FIELD

The present disclosure relates to metal casting generally and more specifically to improvements in casting aluminum using recycled scrap such as used beverage can scrap.

BACKGROUND

Recycled scrap metal includes metal from used metal products that is collected and used to prepare other metal products. For example, used beverage can (UBC) scrap is collected metal from used beverage cans and similar products that can be recycled for use in further metal products. Aluminum UBC scrap is often a mixture of various aluminum alloys (e.g., from different alloys used for can bodies and can ends) and can often include foreign substances, such as rainwater, drink remainders, organic matter (e.g., paints and laminated films), and other materials. UBC scrap can be shredded and decoated or delacquered prior to being melted for use as liquid metal stock in casting a new metal product. Because of the impurities and unbalanced alloying elements present in the liquid UBC metal, it can be necessary to either treat the liquid UBC metal to remove undesirable elements or combine the liquid UBC metal with sufficient amounts of new, primary aluminum prior to casting. Similarly, recycled scrap from other sources can have relatively high amounts of impurities and/or unbalanced alloying elements.

The presence of trace elements in sufficient amounts in the liquid metal used to cast a metal product (e.g., a metal strip) can negatively affect the properties of the metal product, such as its strength and formability. Further, the impurities and elements present in UBC scrap and similar recycled scrap can cause unsuccessful and even dangerous results during the casting process, such as crack formation during the solidification and/or subsequent cooling of the metal product. Crack formation at these stages can render the cast product unusable and, in some cases, can cause damage to person and property.

In addition to hot cracking, a concern with using alloys having a high recycled content includes the variations in iron, manganese, and silicon content. Since these elements are extremely difficult to remove, their presence is predominantly limited to prevent or lower the contamination of scrap streams. The modification of these components is generally avoided as it can modify the size and species of intermetallic phases, which translates to deviations in certain mechanical behaviors.

Therefore, current techniques of using recycled scrap, such as UBC scrap, to produce certain metal products, especially those that must have material properties within certain specification limits, are either expensive in terms of time, space, and energy (e.g., removing impurities from liquid UBC metal or extensive post-casting processing and treatments) or require the use of significant amounts of new materials (e.g., by diluting liquid UBC metal with sufficient amounts of new metal).

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

Described herein is a metal casting method comprising melting recycled aluminum into liquid metal; adding an alloying element to the liquid metal to form a modified liquid metal, the alloying element comprising magnesium, silicon, or copper; casting the modified liquid metal into a metal product, wherein the modified liquid metal includes at least 50% of a recycled aluminum; and rolling the metal product. Optionally, the rolling comprises hot rolling the metal product to a gauge for delivery, cold rolling the metal product to a gauge for delivery, or hot rolling and cold rolling the metal product for delivery. The gauge for delivery can be an intermediate gauge or a final gauge. The modified liquid metal can comprise magnesium in an amount of up to about 7 wt. %. In some cases, the modified liquid metal comprises magnesium in an amount of at least 1.5 wt. % (e.g., from about 1.5 wt. % to about 7 wt. % or from about 1.5 wt. % to about 4 wt. %). The method can further comprise reheating the metal product to an annealing temperature after the rolling, wherein the annealing temperature is below a solidus temperature for the metal product. Optionally, the casting can comprise continuously casting the modified liquid metal or direct chill casting the modified liquid metal. The recycled aluminum can comprise used beverage can scrap containing a mixture of recycled metal from can ends and can bodies. In some cases, the modified liquid metal comprises at least about 60% of the recycled aluminum (e.g., at least about 80% of the recycled aluminum). Optionally, the modified liquid metal can comprise a hydrogen content of 0.25 mL/100 grams or less. Also described herein is a metal product cast from recycled materials according to the method described herein.

Further provided herein are metal products, comprising an aluminum alloy comprising about 0.01 wt. % to 1.0 wt. % Cu, 0.15 wt. % to 0.8 wt. % Fe, 0.5 wt. % to 7.0 wt. % Mg, 0.01 wt. % to 1.2 wt. % Mn, up to 1.5 wt. % Si, up to 0.15 wt. % impurities, and Al, wherein the metal product is cast from a modified liquid metal that includes at least 50% of a recycled aluminum. Optionally, the aluminum alloy comprises about 0.1 to 0.9 wt. % Cu, 0.25 wt. % to 0.7 wt. % Fe, 1.0 wt. % to 5.0 wt. % Mg, 0.1 wt. % to 0.9 wt. % Mn, 0.01 wt. % to 1.0 wt. % Si, 0.01 wt. % to 0.15 wt. % Ti, 0.01 wt. % to 5.0 wt. % Zn, 0.01 wt. % to 0.25 wt. % Cr, 0.01 wt. % to 0.1 wt. % Zr, up to 0.15 wt. % impurities, and Al. Optionally, the aluminum alloy comprises about 0.2 to 0.8 wt. % Cu, 0.3 wt. % to 0.6 wt. % Fe, 1.4 wt. % to 3.0 wt. % Mg, 0.2 wt. % to 0.7 wt. % Mn, 0.2 wt. % to 0.5 wt. % Si, 0.02 wt. % to 0.1 wt. % Ti, 0.02 wt. % to 3.0 wt. % Zn, 0.02 wt. % to 0.1 wt. % Cr, 0.02 wt. % to 0.05 wt. % Zr, up to 0.15 wt. % impurities, and Al. In some cases, the modified liquid metal comprises at least about 60% of the recycled aluminum (e.g., at least about 80% of the recycled aluminum). Optionally, the modified liquid metal can comprise a hydrogen content of 0.25 mL/100 grams or less. The recycled aluminum can comprise used beverage can scrap comprising a mixture of recycled metal from can ends and can bodies. In some cases, the metal product comprises a yield strength of at least 100 MPa, an ultimate tensile strength of at least 210 MPa, a uniform elongation of at least 18%, and/or a total elongation of at least 20.5%. The metal product can comprise Fe-containing constituents. Optionally, the Fe-containing constituents have a length ranging from about 0.6 μm to about 1.8 μm. In some cases, the metal product comprises intermetallic particles having a width to height ratio of about 3 or less.

BRIEF DESCRIPTION OF DRAWINGS

The specification makes reference to the following appended figures, in which use of like reference numerals in different figures is intended to illustrate like or analogous components.

DETAILED DESCRIPTION

Figure 1:
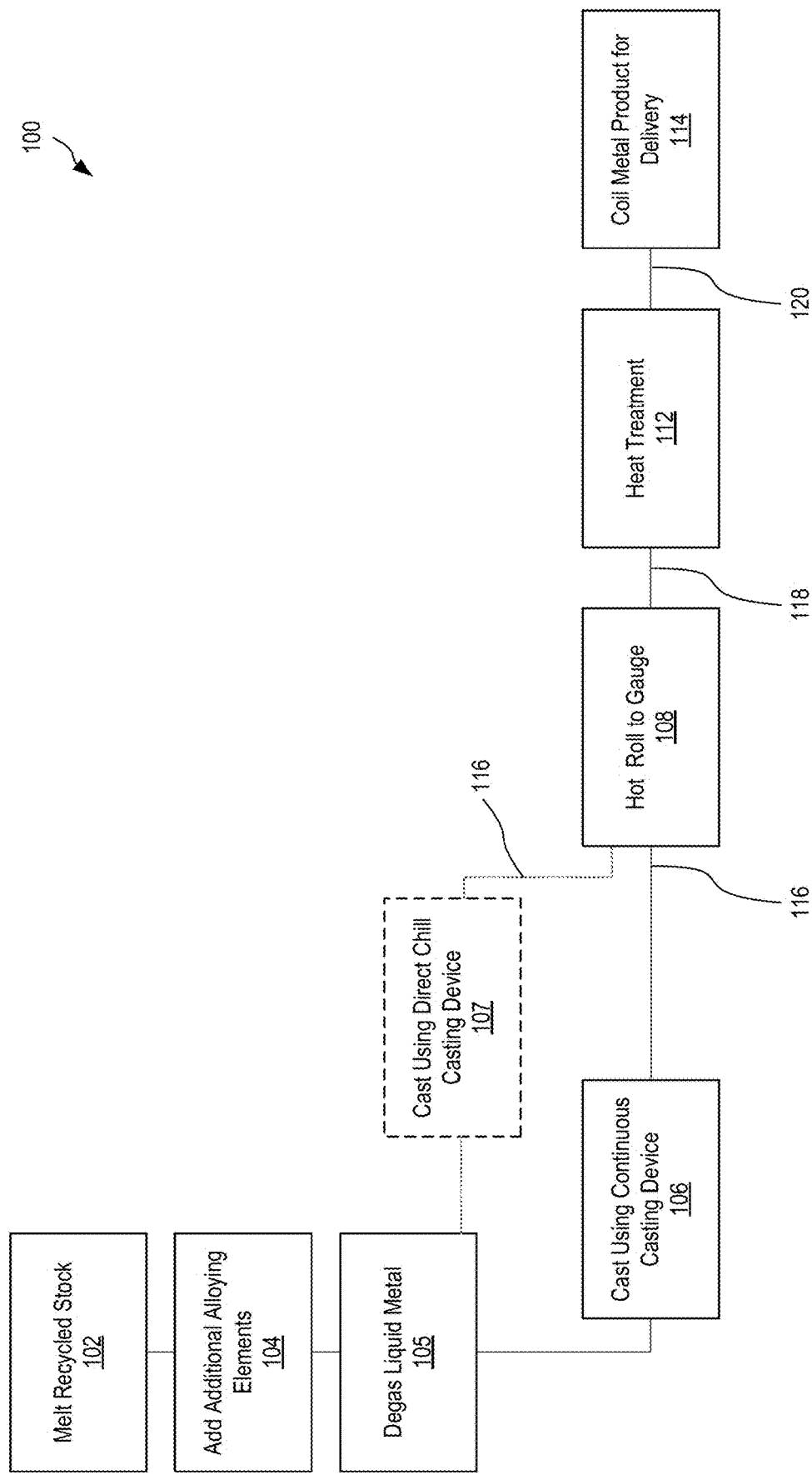
FIG. 1 is a flowchart depicting a process for casting and hot rolling a metal product from UBC or other scrap according to certain aspects of the present disclosure.

Certain aspects and features of the present disclosure relate to improvements in casting metal products from recycled metal scrap (e.g., recycled aluminum scrap such as used beverage can (UBC) scrap). The recycled metal scrap can be used to prepare metal products having mechanical properties (e.g., strength and formability) suitable for use in a variety of applications, such as automotive applications (e.g., hood inners) and household products (e.g., cookware, including pots and pans). Adding certain desirable trace elements to liquid metal prepared from the recycled scrap can lead to a modified liquid metal. This modified liquid metal can be used to prepare a recycled content alloy. The recycled content alloy can be cast using, for example, direct chill casting or continuous casting. For example, the use of the recycled content alloy in a continuous casting process can result in a cast alloy product with a minimal risk of hot cracking during the casting process. In some cases, combining the casting with a subsequent hot rolling process to a final gauge can produce a desirable metal coil at a final gauge having desirable mechanical properties. The concepts disclosed herein can allow inexpensive and recycled metal scrap to be efficiently repurposed for new applications, such as certain automotive parts or alternative can bodies. For example, a metal product cast and rolled as disclosed herein can meet and/or exceed the specification requirements set by an original equipment manufacturer (OEM) for automotive hood, deck-lid, or door inner panels. Certain aspects of the present disclosure may be used with any suitable metal as appropriate; however, certain aspects of the present disclosure are especially suitable for use with aluminum.

Definitions and Descriptions:

The terms "invention," "the invention," "this invention," and "the present invention" used herein are intended to refer broadly to all of the subject matter of this patent application and the claims below. Statements containing these terms should be understood not to limit the subject matter described herein or to limit the meaning or scope of the patent claims below.

As used herein, the meaning of "a," "an," or "the" includes singular and plural references unless the context clearly dictates otherwise.

As used herein, a plate generally has a thickness of greater than about 15 mm. For example, a plate may refer to an aluminum product having a thickness of greater than about 15 mm, greater than about 20 mm, greater than about 25 mm, greater than about 30 mm, greater than about 35 mm, greater than about 40 mm, greater than about 45 mm, greater than about 50 mm, or greater than about 100 mm.

As used herein, a shate (also referred to as a sheet plate) generally has a thickness of from about 4 mm to about 15 mm. For example, a shate may have a thickness of about 4 mm, about 5 mm, about 6 mm, about 7 mm, about 8 mm, about 9 mm, about 10 mm, about 11 mm, about 12 mm, about 13 mm, about 14 mm, or about 15 mm.

As used herein, a sheet generally refers to an aluminum product having a thickness of less than about 4 mm. For example, a sheet may have a thickness of less than about 4 mm, less than about 3 mm, less than about 2 mm, less than about 1 mm, less than about 0.5 mm, or less than about 0.3 mm (e.g., about 0.2 mm).

As used herein, the term foil indicates an alloy thickness in a range of up to about 0.2 mm (i.e., 200 microns (μm)). For example, a foil may have a thickness of up to 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, or 200 μm.

In this description, reference is made to alloys identified by aluminum industry designations, such as "series" or "5xxx." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

Reference is made in this application to alloy temper or condition. For an understanding of the alloy temper descriptions most commonly used, see "American National Standards (ANSI) H35 on Alloy and Temper Designation Systems." An F condition or temper refers to an aluminum alloy as fabricated. An O condition or temper refers to an aluminum alloy after annealing. An Hxx condition or temper, also referred to herein as an H temper, refers to a non-heat treatable aluminum alloy after cold rolling with or without thermal treatment (e.g., annealing). Suitable H tempers include HX1, HX2, HX3 HX4, HX5, HX6, HX7, HX8, or HX9 tempers. A T1 condition or temper refers to an aluminum alloy cooled from hot working and naturally aged (e.g., at room temperature). A T2 condition or temper refers to an aluminum alloy cooled from hot working, cold worked and naturally aged. A T3 condition or temper refers to an aluminum alloy solution heat treated, cold worked, and naturally aged. A T4 condition or temper refers to an aluminum alloy solution heat treated and naturally aged. A T5 condition or temper refers to an aluminum alloy cooled from hot working and artificially aged (at elevated temperatures). A T6 condition or temper refers to an aluminum alloy solution heat treated and artificially aged. A T7 condition or temper refers to an aluminum alloy solution heat treated and artificially overaged. A T8x condition or temper refers to an aluminum alloy solution heat treated, cold worked, and artificially aged. A T9 condition or temper refers to an aluminum alloy solution heat treated, artificially aged, and cold worked. A W condition or temper refers to an aluminum alloy after solution heat treatment.

As used herein, the meaning of "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C.

As used herein, terms such as "cast metal product," "cast product," "cast aluminum alloy product," and the like are interchangeable and refer to a product produced by direct chill casting (including direct chill co-casting) or semi-continuous casting, continuous casting (including, for example, by use of a twin belt caster, a twin roll caster, a block caster, or any other continuous caster), electromagnetic casting, hot top casting, or any other casting method.

As used herein, the term metal product can refer to any suitable shape or size of cast product, as appropriate.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

The following aluminum alloys are described in terms of their elemental composition in weight percentage (wt. %) based on the total weight of the alloy. In certain examples of each alloy, the remainder is aluminum, with a maximum wt. % of 0.15% for the sum of the impurities.

As used herein, the terms recycled scrap (e.g., recycled stock) can refer to a collection of recycled metal. Recycled scrap can include materials recycled from any suitable source, such as from a metal production facility (e.g., metal casting facility), from a metalworking facility (e.g., production facility that uses metal product to create consumable products), or from post-consumer sources (e.g., regional recycling facilities). Certain aspects of the present disclosure can be well-suited for recycled scrap from sources other than a metal production facility, since such recycled scrap likely contains a mixture of alloys or is mixed with other impurities or elements (e.g., such as paints or coatings). Recycled scrap can refer to recycled aluminum, such as recycled sheet aluminum products (e.g., aluminum pots and pans), recycled cast aluminum products (e.g., aluminum grills and wheel rims), UBC scrap (e.g., beverage cans), aluminum wire, and other aluminum materials.

Recycled Content Alloys

Described herein are recycled content alloys prepared from at least a portion of recycled scrap. For example, the techniques disclosed herein can allow suitable cast products to be produced from a modified liquid metal containing at or more than about 50%, about 60%, about 70%, about 80%, about 90%, about 91%, about 92%, about 93%, about 94%, about 95%, about 96%, about 97%, about 98%, or about 99% recycled scrap. In other words, the cast products described herein can include at or less than about 50%, about 40%, about 30%, about 20%, about 15%, about 10%, about 9%, about 8%, about 7%, about 6%, about 5%, about 4%, about 3%, about 2%, or about 1% primary aluminum). Certain aspects of the present disclosure relate to metal products made using a modified liquid metal that is mostly recycled scrap.

In some cases, the recycled scrap includes recycled aluminum scrap, such as UBC scrap. UBC scrap, for example, generally contains a mixture of metal from various alloys, such as metal from can bodies (e.g., 3104, 3004, or other 3xxx aluminum alloy) and can ends (e.g., 5182 or other 5xxx aluminum alloy). Other recycled scrap includes other mixtures of alloys. These mixtures of alloys, when melted, result in an alloy composition that can be difficult to cast as-is and can result in undesirable mechanical characteristics in a resulting product. Further, recycled scrap can contain other impurities and alloying elements, which end up in the liquid metal when the recycled scrap is melted. High concentrations of impurities and alloying elements in the liquid metal can result in casting problems, including hot cracking, element control issues (particularly for iron, manganese, and silicon), centerline segregation, and other issues. The concentrations of these impurities and alloying elements can be lowered by processing the liquid metal (e.g., thermally, chemically, magnetically, and/or electrically) to remove impurities or alloying elements, and/or by adding new, primary aluminum to the melt. Processing the liquid metal requires time, equipment, and energy. Adding primary aluminum reduces the amount of recycled content and raises the costs, as primary aluminum is more expensive to produce than recycled scrap. Therefore, a tradeoff is often made between processing the recycled scrap and adding primary aluminum. Using the techniques described herein, recycled scrap can be used with little or no purification and little or no additional of primary aluminum.

Optionally, the recycled scrap can be modified with one or more additional elements to prepare the recycled content alloys. In some examples, it can be desirable to add further magnesium (Mg) and/or other alloying elements to the recycled scrap, which can result in a recycled content alloy with improved castability of the liquid metal and improved metallurgical properties of the end product. For example, added Mg can increase the formability and strength of the cast metal product. In some examples, Mg can be added to the recycled scrap to achieve, in a recycled content alloy, a percentage of Mg of from about 0.50% to about 7.0% based on the total weight of the alloy (e.g., from about 1.5% to about 6.0%, from about 2.0% to about 5.0%, from about 2.5% to about 4.5%, or from about 3.0% to about 4.0%). The Mg percentage can be at or greater than approximately 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, or 7.0%. In some cases, Mg can be added to the recycled scrap to achieve, in a recycled content alloy, a percentage of Mg by weight of at least 1.5% and at or less than approximately 6.0%, 5.9%, 5.8%, 5.7%, 5.6%, 5.5%, 5.4%, 5.3%, 5.2%, 5.1%, 5.0%, 4.9%, 4.8%, 4.7%, 4.6%, 4.5%, 4.4%, 4.3%, 4.2%, 4.1%, 4.0%, 3.9%, 3.8%, 3.7%, 3.6%, 3.5%, 3.4%, 3.3%, 3.2%, 3.1%, or 3.0%.

Normally, adding additional alloying elements to recycled scrap can be undesirable, as recycled scrap, such as UBC scrap, already contains substantially high amounts of alloying elements. In addition, as more alloying elements are added, the risk of hot cracking increases and the resulting cast product can exhibit undesirable mechanical characteristics. However, surprisingly effective results have been found through the addition of Mg as disclosed herein, and in some cases, in combination with certain processing steps, as detailed herein. In some cases, additional copper (Cu) and/or silicon (Si) can be added to the recycled scrap prior to casting. In some cases, other alloying elements can be added to the recycled scrap prior to casting.

In some examples, the recycled content alloys described herein can have the following elemental composition as provided in Table 1.

TABLE 1

| Element | Weight Percentage (wt. %) |
|---|---|
| Cu | 0.01-1.0 |
| Fe | 0.15-0.8 |
| Mg | 0.5-7.0 |
| Mn | 0.01-1.2 |
| Si | 0-1.5 |
| Ti | 0-0.2 |
| Zn | 0-6.0 |
| Cr | 0-0.3 |
| Zr | 0-0.15 |
| Others | 0-0.05 (each) |
|  | 0-0.15 (total) |
| Al | Remainder |

In some examples, the recycled content alloys described herein can have the following elemental composition as provided in Table 2.

TABLE 2

| Element | Weight Percentage (wt. %) |
|---|---|
| Cu | 0.1-0.9 |
| Fe | 0.25-0.7 |
| Mg | 1.0-5.0 |
| Mn | 0.1-0.9 |
| Si | 0.01-1.0 |
| Ti | 0.01-0.15 |
| Zn | 0.01-5.0 |
| Cr | 0.01-0.25 |
| Zr | 0.01-0.1 |
| Others | 0-0.05 (each) |
|  | 0-0.15 (total) |
| Al | Remainder |

In some examples, the recycled content alloys described herein can have the following elemental composition as provided in Table 3.

TABLE 3

| Element | Weight Percentage (wt. %) |
|---|---|
| Cu | 0.2-0.8 |
| Fe | 0.3-0.6 |
| Mg | 1.4-3.0 |
| Mn | 0.2-0.7 |
| Si | 0.2-0.5 |
| Ti | 0.02-0.1 |
| Zn | 0.02-3.0 |
| Cr | 0.02-0.1 |
| Zr | 0.02-0.05 |
| Others | 0-0.05 (each) |
|  | 0-0.15 (total) |
| Al | Remainder |

In some examples, the alloys described herein include Cu in an amount of from about 0.01% to about 1.0% (e.g., from about 0.05% to about 1.0%, from about 0.1% to about 0.9%, from about 0.2 to about 0.8%, from about 0.15% to about 0.40%, or from about 0.20% to about 0.35%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.26%, 0.27%, 0.28%, 0.29%, 0.30%, 0.31%, 0.32%, 033%, 0.34%, 0.35%, 0.36%, 0.37%, 0.38%, 0.39%, 0.40%, 0.41%, 0.42%, 0.43%, 0.44%, 0.45%, 0.46%, 0.47%, 0.48%, 0.49%, 0.50%, 0.51%, 0.52%, 0.53%, 0.54%, 0.55%, 0.56%, 0.57%, 0.58%, 0.59%, 0.60%, 0.61%, 0.62%, 0.63%, 0.64%, 0.65%, 0.66%, 0.67%, 0.68%, 0.69%, 0.70%, 0.71% 0.72% 0.73% 0.74% 0.75% 0.76% 0.77% 0.78% 0.79% 0.80% 0.81% 0.82% 0.83%, 0.84%, 0.85%, 0.86%, 0.87%, 0.88%, 0.89%, 0.90%, 0.91%, 0.92%, 0.93%, 0.94%, 0.95%, 0.96%, 0.97%, 0.98%, 0.99%, or 1.0% Cu. All are expressed in wt. %.

In some examples, the alloys described herein include iron (Fe) in an amount of from about 0.15% to about 0.8% (e.g., from about 0.25% to about 0.7% or from about 0.3% to about 0.6%) based on the total weight of the alloy. For example, the alloy can include 0.15%, 0.16%, 0.17%, 0.18%, 0.19%, 0.20%, 0.21%, 0.22%, 0.23%, 0.24%, 0.25%, 0.26%, 0.27%, 0.28%, 0.29%, 0.30%, 0.31%, 0.32%, 033%, 0.34%, 0.35%, 0.36%, 0.37%, 0.38%, 0.39%, 0.40%, 0.41%, 0.42%, 0.43%, 0.44%, 0.45%, 0.46%, 0.47%, 0.48%, 0.49%, 0.50%, 0.51%, 0.52%, 0.53%, 0.54%, 0.55%, 0.56%, 0.57%, 0.58%, 0.59%, 0.60%, 0.61%, 0.62%, 0.63%, 0.64%, 0.65%, 0.66%, 0.67%, 0.68%, 0.69%, 0.70%, 0.71%, 0.72%, 0.73%, 0.74%, 0.75%, 0.76%, 0.77%, 0.78%, 0.79%, 0.80% Fe. All are expressed in wt. %.

In some examples, the alloys described herein include Mg in an amount of from about 0.50% to about 7.0% (e.g., from about 1.0% to about 5.0%, from about 1.4% to about 3.0%, from about 1.5% to about 2.6%, or from about 1.6% to about 2.5%) based on the total weight of the alloy. For example, the alloy can include 0.51%, 0.52%, 0.53%, 0.54%, 0.55%, 0.56%, 0.57%, 0.58%, 0.59%, 0.60%, 0.61%, 0.62%, 0.63%, 0.64%, 0.65%, 0.66%, 0.67%, 0.68%, 0.69%, 0.70%, 0.71%, 0.72%, 0.73%, 0.74%, 0.75%, 0.76%, 0.77%, 0.78%, 0.79%, 0.80%, 0.81%, 0.82%, 0.83%, 0.84%, 0.85%, 0.86%, 0.87%, 0.88%, 0.89%, 0.90%, 0.91%, 0.92%, 0.93%, 0.94%, 0.95%, 0.96%, 0.97%, 0.98%, 0.99%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, or 7.0% Mg. All are expressed in wt. %.

In some examples, the alloys described herein include manganese (Mn) in an amount of from about 0.01% to about 1.2% (e.g., from about 0.05% to about 1.0%, from about 0.1% to about 0.9%, or from about 0.2% to about 0.7%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.26%, 0.27%, 0.28%, 0.29%, 0.30%, 0.31%, 0.32%, 0.33%, 0.34%, 0.35%, 0.36%, 0.37%, 0.38%, 0.39%, 0.40%, 0.41%, 0.42%, 0.43%, 0.44%, 0.45%, 0.46%, 0.47%, 0.48%, 0.49%, 0.50%, 0.51%, 0.52%, 0.53%, 0.54%, 0.55%, 0.56%, 0.57%, 0.58%, 0.59%, 0.60%, 0.61%, 0.62%, 0.63%, 0.64%, 0.65%, 0.66%, 0.67%, 0.68%, 0.69%, 0.70%, 0.71%, 0.72%, 0.73%, 0.74%, 0.75%, 0.76%, 0.77%, 0.78%, 0.79%, 0.80%, 0.81%, 0.82%, 0.83%, 0.84%, 0.85%, 0.86%, 0.87%, 0.88%, 0.89%, 0.90%, 0.91%, 0.92%, 0.93%, 0.94%, 0.95%, 0.96%, 0.97%, 0.98%, 0.99%, 1.0%, 1.01%, 1.02%, 1.03%, 1.04%, 1.05%, 1.06%, 1.07%, 1.08%, 1.09%, 1.10%, 1.11%, 1.12%, 1.13%, 1.14%, 1.15%, 1.16%, 1.17%, 1.18%, 1.19%, or 1.20% Mn. All are expressed in wt. %.

In some examples, the alloys described herein include Si in an amount up to about 1.5 wt. % (e.g., from about 0.01% to about 1.50%, from about 0.20% to about 1.0%, or from about 0.3% to about 0.9%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.26%, 0.27%, 0.28%, 0.29%, 0.30%, 0.31%, 0.32%, 033%, 0.34%, 0.35%, 0.36%, 0.37%, 0.38%, 0.39%, 0.40%, 0.41%, 0.42%, 0.43%, 0.44%, 0.45%, 0.46%, 0.47%, 0.48%, 0.49%, 0.50%, 0.51%, 0.52%, 0.53%, 0.54%, 0.55%, 0.56%, 0.57%, 0.58%, 0.59%, 0.60%, 0.61%, 0.62%, 0.63%, 0.64%, 0.65%, 0.66%, 0.67%, 0.68%, 0.69%, 0.70%, 0.71%, 0.72%, 0.73%, 0.74%, 0.75%, 0.76%, 0.77%, 0.78%, 0.79%, 0.80%, 0.81%, 0.82%, 0.83%, 0.84%, 0.85%, 0.86%, 0.87%, 0.88%, 0.89%, 0.90%, 0.91%, 0.92%, 0.93%, 0.94%, 0.95%, 0.96%, 0.97%, 0.98%, 0.99%, 1.0%, 1.01%, 1.02%, 1.03%, 1.04%, 1.05%, 1.06%, 1.07%, 1.08%, 1.09%, 1.10%, 1.11%, 1.12%, 1.13%, 1.14%, 1.15%, 1.16%, 1.17%, 1.18%, 1.19%, 1.20%, 1.21%, 1.22%, 1.23%, 1.24%, 1.25%, 1.26%, 1.27%, 1.28%, 1.29%, 1.30%, 1.31%, 1.32%, 1.33%, 1.34%, 1.35%, 1.36%, 1.37%, 1.38%, 1.39%, 1.40%, 1.41%, 1.42%, 1.43%, 1.44%, 1.45%, 1.46%, 1.47%, 1.48%, 1.49%, or 1.50% Si. In some cases, Si is not present in the alloy (i.e., 0%). All are expressed in wt. %.

In some examples, the alloys described herein include titanium (Ti) in an amount up to about 0.2% (e.g., from about 0.01% to about 0.15% or from about 0.02% to about 0.1%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, or 0.20% Ti. In some cases, Ti is not present in the alloy (i.e., 0%). All are expressed in wt. %.

In some examples, the alloys described herein include zinc (Zn) in an amount of from about 0% to about 6.0% (e.g., from about 0.01% to about 5.0% or from about 0.02% to about 3.0%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.26%, 0.27%, 0.28%, 0.29%, 0.30%, 0.31%, 0.32%, 0.33%, 0.34%, 0.35%, 0.36%, 0.37%, 0.38%, 0.39%, 0.40%, 0.41%, 0.42%, 0.43%, 0.44%, 0.45%, 0.46%, 0.47%, 0.48%, 0.49%, 0.50%, 0.51%, 0.52%, 0.53%, 0.54%, 0.55%, 0.56%, 0.57%, 0.58%, 0.59%, 0.60%, 0.61%, 0.62%, 0.63%, 0.64%, 0.65%, 0.66%, 0.67%, 0.68%, 0.69%, 0.70%, 0.71%, 0.72%, 0.73%, 0.74%, 0.75%, 0.76%, 0.77%, 0.78%, 0.79%, 0.80%, 0.81%, 0.82%, 0.83%, 0.84%, 0.85%, 0.86%, 0.87%, 0.88%, 0.89%, 0.90%, 0.91%, 0.92%, 0.93%, 0.94%, 0.95%, 0.96%, 0.97%, 0.98%, 0.99%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, or 6.0% Zn. In some cases, Zn is not present in the alloy (i.e., 0%). All are expressed in wt. %.

In some examples, the alloys described herein include chromium (Cr) in an amount up to about 0.30% (e.g., from about 0.01% to about 0.25% or from about 0.02% to about 0.1%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.26%, 0.27%, 0.28%, 0.29%, or 0.30% Cr. In some cases, Cr is not present in the alloy (i.e., 0%). All are expressed in wt. %.

In some examples, the alloys described herein include zirconium (Zr) in an amount of from about 0% to about 0.15% (e.g., from about 0.01% to about 0.1% or from about 0.02% to about 0.05%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, or 0.15% Zr. In some cases, Zr is not present in the alloy (i.e., 0%). All are expressed in wt. %.

Optionally, the alloy compositions described herein can further include other minor elements, sometimes referred to as impurities, in amounts of 0.05% or below, 0.04% or below, 0.03% or below, 0.02% or below, or 0.01% or below for each impurity. These impurities may include, but are not limited to, Sn, Ga, Ca, Bi, Na, Pb, Li, W, Mo, Ni, V or combinations thereof. Accordingly, Sn, Ga, Ca, Bi, Na, Pb, Li, W, Mo, Ni, or V may be present in alloys in amounts of 0.05% or below, 0.04% or below, 0.03% or below, 0.02% or below or 0.01% or below. In some cases, the sum of all impurities does not exceed 0.15% (e.g., 0.10%). All expressed in wt. %. The remaining percentage of the alloy is aluminum.

In some examples, suitable alloys for use in the recycled content alloys described herein can be a 1xxx series aluminum alloy, a 2xxx series aluminum alloy, a 3xxx series aluminum alloy, a 4xxx series aluminum alloy, a 5xxx series aluminum alloy, a 6xxx series aluminum alloy, a 7xxx series aluminum alloy, an 8xxx series aluminum alloy, or any combination thereof. The 1xxx, 2xxx, 3xxx, 4xxx, 5xxx, 6xxx, 7xxx, or 8xxx series aluminum alloy can be modified to include an amount of Mg, Cu, and/or Si as described above.

Suitable 1xxx series aluminum alloys for use in the recycled content alloys described herein include, for example, AA1050, AA1060, AA1070, AA1100, AA1100A, AA1200, AA1200A, AA1300, AA1110, AA1120, AA1230, AA1230A, AA1235, AA1435, AA1145, AA1345, AA1445, AA1150, AA1350, AA1350A, AA1450, AA1370, AA1275, AA1185, AA1285, AA1385, AA1188, AA1190, AA1290, AA1193, AA1198, and AA1199.

Suitable 2xxx series aluminum alloys for use in the recycled content alloys described herein include, for example, AA2001, A2002, AA2004, AA2005, AA2006, AA2007, AA2007A, AA2007B, AA2008, AA2009, AA2010, AA2011, AA2011A, AA2111, AA2111A, AA2111B, AA2012, AA2013, AA2014, AA2014A, AA2214, AA2015, AA2016, AA2017, AA2017A, AA2117, AA2018, AA2218, AA2618, AA2618A, AA2219, AA2319, AA2419, AA2519, AA2021, AA2022, AA2023, AA2024, AA2024A, AA2124, AA2224, AA2224A, AA2324, AA2424, AA2524, AA2624, AA2724, AA2824, AA2025, AA2026, AA2027, AA2028, AA2028A, AA2028B, AA2028C, AA2029, AA2030, AA2031, AA2032, AA2034, AA2036, AA2037, AA2038, AA2039, AA2139, AA2040, AA2041, AA2044, AA2045, AA2050, AA2055, AA2056, AA2060, AA2065, AA2070, AA2076, AA2090, AA2091, AA2094, AA2095, AA2195, AA2295, AA2196, AA2296, AA2097, AA2197, AA2297, AA2397, AA2098, AA2198, AA2099, and AA2199.

Suitable 3xxx series aluminum alloys for use in the recycled content alloys described herein include, for example, AA3002, AA3102, AA3003, AA3103, AA3103A, AA3103B, AA3203, AA3403, AA3004, AA3004A, AA3104, AA3204, AA3304, AA3005, AA3005A, AA3105, AA3105A, AA3105B, AA3007, AA3107, AA3207, AA3207A, AA3307, AA3009, AA3010, AA3110, AA3011, AA3012, AA3012A, AA3013, AA3014, AA3015, AA3016, AA3017, AA3019, AA3020, AA3021, AA3025, AA3026, AA3030, AA3130, and AA3065.

Suitable 4xxx series aluminum alloys for use in the recycled content alloys described herein include, for example, AA4004, AA4104, AA4006, AA4007, AA4008, AA4009, AA4010, AA4013, AA4014, AA4015, AA4015A, AA4115, AA4016, AA4017, AA4018, AA4019, AA4020, AA4021, AA4026, AA4032, AA4043, AA4043A, AA4143, AA4343, AA4643, AA4943, AA4044, AA4045, AA4145, AA4145A, AA4046, AA4047, AA4047A, and AA4147.

Suitable 5xxx series aluminum alloys for use in the recycled content alloys described herein include, for example, AA5005, AA5005A, AA5205, AA5305, AA5505, AA5605, AA5006, AA5106, AA5010, AA5110, AA5110A, AA5210, AA5310, AA5016, AA5017, AA5018, AA5018A, AA5019, AA5019A, AA5119, AA5119A, AA5021, AA5022, AA5023, AA5024, AA5026, AA5027, AA5028, AA5040, AA5140, AA5041, AA5042, AA5043, AA5049, AA5149, AA5249, AA5349, AA5449, AA5449A, AA5050, AA5050A, AA5050C, AA5150, AA5051, AA5051A, AA5151, AA5251, AA5251A, AA5351, AA5451, AA5052, AA5252, AA5352, AA5154, AA5154A, AA5154B, AA5154C, AA5254, AA5354, AA5454, AA5554, AA5654, AA5654A, AA5754, AA5854, AA5954, AA5056, AA5356, AA5356A, AA5456, AA5456A, AA5456B, AA5556, AA5556A, AA5556B, AA5556C, AA5257, AA5457, AA5557, AA5657, AA5058, AA5059, AA5070, AA5180, AA5180A, AA5082, AA5182, AA5083, AA5183, AA5183A, AA5283, AA5283A, AA5283B, AA5383, AA5483, AA5086, AA5186, AA5087, AA5187, and AA5088.

Suitable 6xxx series aluminum alloys for use in the recycled content alloys described herein include, for example, AA6101, AA6101A, AA6101B, AA6201, AA6201A, AA6401, AA6501, AA6002, AA6003, AA6103, AA6005, AA6005A, AA6005B, AA6005C, AA6105, AA6205, AA6305, AA6006, AA6106, AA6206, AA6306, AA6008, AA6009, AA6010, AA6110, AA6110A, AA6011, AA6111, AA6012, AA6012A, AA6013, AA6113, AA6014, AA6015, AA6016, AA6016A, AA6116, AA6018, AA6019, AA6020, AA6021, AA6022, AA6023, AA6024, AA6025, AA6026, AA6027, AA6028, AA6031, AA6032, AA6033, AA6040, AA6041, AA6042, AA6043, AA6151, AA6351, AA6351A, AA6451, AA6951, AA6053, AA6055, AA6056, AA6156, AA6060, AA6160, AA6260, AA6360, AA6460, AA6460B, AA6560, AA6660, AA6061, AA6061A, AA6261, AA6361, AA6162, AA6262, AA6262A, AA6063, AA6063A, AA6463, AA6463A, AA6763, A6963, AA6064, AA6064A, AA6065, AA6066, AA6068, AA6069, AA6070, AA6081, AA6181, AA6181A, AA6082, AA6082A, AA6182, AA6091, and AA6092.

Suitable 7xxx series aluminum alloys for use in the recycled content alloys described herein include, for example, AA7019, AA7020, AA7021, AA7039, AA7072, AA7075, AA7085, AA7108, AA7108A, AA7015, AA7017, AA7018, AA7019A, AA7024, AA7025, AA7028, AA7030, AA7031, AA7035, AA7035A, AA7046, AA7046A, AA7003, AA7004, AA7005, AA7009, AA7010, AA7011, AA7012, AA7014, AA7016, AA7116, AA7122, AA7023, AA7026, AA7029, AA7129, AA7229, AA7032, AA7033, AA7034, AA7036, AA7136, AA7037, AA7040, AA7140, AA7041, AA7049, AA7049A, AA7149, AA7249, AA7349, AA7449, AA7050, AA7050A, AA7150, AA7250, AA7055, AA7155, AA7255, AA7056, AA7060, AA7064, AA7065, AA7068, AA7168, AA7175, AA7475, AA7076, AA7178, AA7278, AA7278A, AA7081, AA7181, AA7185, AA7090, AA7093, AA7095, and AA7099.

Suitable 8xxx series aluminum alloys for use in the recycled content alloys described herein include, for example, AA8005, AA8006, AA8007, AA8008, AA8010, AA8011, AA8011A, AA8111, AA8211, AA8112, AA8014, AA8015, AA8016, AA8017, AA8018, AA8019, AA8021, AA8021A, AA8021B, AA8022, AA8023, AA8024, AA8025, AA8026, AA8030, AA8130, AA8040, AA8050, AA8150, AA8076, AA8076A, AA8176, AA8077, AA8177, AA8079, AA8090, AA8091, and AA8093.

Various products including the recycled content alloys described herein can be produced. In some examples, the products prepared including the recycled content alloys described herein can be a cladded product including a core layer and one or more cladding layers. The core layer has a first side and a second side and one or more cladding layer(s) can be bonded to the first side or the second side of the core layer. In some examples, the core layer is clad on only one side (i.e., one cladding layer is present in the clad aluminum alloy product). In other examples, the core layer is clad on both sides (i.e., two cladding layers are present in the clad aluminum alloy product).

The cladding layer(s) can be attached to a core layer by direct chill co-casting (i.e., fusion casting) as described in, for example, U.S. Pat. Nos. 7,748,434 and 8,927,113, both of which are hereby incorporated by reference in their entireties, by hot and cold rolling a composite cast ingot as described in U.S. Pat. No. 7,472,740, which is hereby incorporated by reference in its entirety, or by roll bonding to achieve the required metallurgical bonding between the core and the cladding.

The recycled content alloys described herein can be used as the core layer or as the one or more cladding layers. Optionally, the one or more cladding layers can include a 1xxx series aluminum alloy, a 2xxx series aluminum alloy, a 3xxx series aluminum alloy, a 4xxx series aluminum alloy, a 5xxx series aluminum alloy, a 6xxx series aluminum alloy, a 7xxx series aluminum alloy, or an 8xxx series aluminum alloy. In some examples, the cladded product is prepared from a recycled content alloy as described herein as the core and a 5xxx or 6xxx series aluminum alloy as one or both of the cladding layers.

The aluminum alloy product described herein can have any suitable gauge. The recycled content alloys can be cast and processed into various sizes and thicknesses, such as foil (e.g., below approximately 0.20 mm), sheet (e.g., from approximately 0.20 mm to 4.0 mm), shate (e.g., from approximately 4.0 mm to 15.0 mm), or plate (e.g., greater than approximately 15.0 mm), although other thicknesses and ranges can be used as well. In some examples, the aluminum alloy products described herein can be provided and delivered to a customer or an end user in an intermediate gauge (e.g., a gauge that will be further reduced by the customer or end user, as desired). In some examples, the aluminum alloy products described herein can be provided and delivered to a customer or an end user in a final gauge (e.g., a gauge that will not be further reduced by the customer or end user).

Products including the recycled content alloys described herein can include a hydrogen content of 0.15 mL/100 grams or less (e.g., at or less than 0.10 mL/100 grams, at or less than 0.08 mL/100 grams, or at or less than 0.06 mL/100 grams). For example, the amount of hydrogen included in the aluminum alloy products can be at or less than approximately 0.15 mL/100 grams, 0.14 mL/100 grams, 0.13 mL/100 grams, 0.12 mL/100 grams, 0.11 mL/100 grams, 0.1 mL/100 grams, 0.09 mL/100 grams, 0.08 mL/100 grams, 0.07 mL/100 grams, 0.06 mL/100 grams, 0.05 mL/100 grams, 0.04 mL/100 grams, 0.03 mL/100 grams, 0.02 mL/100 grams, or 0.01 mL/100 grams. Optionally, the hydrogen content in the products can be at least 0.08 mL/100 grams. For example, the hydrogen content can be from 0.08 mL/100 grams to 0.25 mL/100 grams, from 0.1 mL/100 grams to 0.20 mL/100 grams, or from 0.12 mL/100 grams to 0.18 mL/100 grams. The amount of dissolved hydrogen present impacts the properties of the resulting metal product. During casting, the dissolved hydrogen can have an impact on the castability of the metal product (e.g., resistance to hot cracking) as well as the resultant metal product's mechanical properties (e.g., bending strength, toughness, fatigue strength, maximum elongation, crash worthiness, surface quality, corrosion resistance, and other properties). Dissolved hydrogen can affect solidification and can result in porosity in the cast metal product. Products prepared from the recycled content alloys described herein, having the above-described hydrogen content, do not suffer from these detrimental effects.

The recycled content aluminum alloy products described herein include iron-containing intermetallic particles, also referred to herein as Fe-containing constituents. In some cases, the iron-containing intermetallic particles are spherical. The Fe-containing constituents can have a length ranging from about 0.6 μm to about 1.8 μm (e.g., from about 0.7 μm to about 1.7 μm or from about 0.8 μm to about 1.6 μm).

The aluminum alloy products described herein contain intermetallic particles that have a low aspect ratio (e.g., width to height ratio). In some cases, a low aspect ratio is a ratio of about 3 or less (e.g., about 2.5 or less, about 2 or less, or about 1.5 or less). In particular, the intermetallic particles are circular or spherical in shape. An aspect ratio of 1 (e.g., close to a circular cross section, i.e., spherical particles) is a preferable Fe-containing intermetallic particle shape for mechanical properties, for example bending, forming, crushing, and/or crash-testing. These intermetallic particles enhance the desirable mechanical properties of the products.

In some cases, the metal products described herein can have a yield strength of at least about 100 MPa. For example, the metal products described herein can have a yield strength of from about 100 MPa to about 300 MPa (e.g., from about 150 MPa to about 250 MPa). In some cases, the yield strength can be about 100 MPa, 110 MPa, 120 MPa, 130 MPa, 140 MPa, 150 MPa, 160 MPa, 170 MPa, 180 MPa, 190 MPa, 200 MPa, 210 MPa, 220 MPa, 230 MPa, 240 MPa, 250 MPa, 260 MPa, 270 MPa, 280 MPa, 290 MPa, or 300 MPa.

In some cases, the metal products described herein can have an ultimate tensile strength of at least about 210 MPa. For example, the metal products described herein can have an ultimate tensile strength of from about 210 MPa to about 350 MPa (e.g., from about 250 MPa to about 325 MPa). In some cases, the ultimate tensile strength can be about 210 MPa, 220 MPa, 230 MPa, 240 MPa, 250 MPa, 260 MPa, 270 MPa, 280 MPa, 290 MPa, 300 MPa, 310 MPa, 320 MPa, 330 MPa, 340 MPa, or 350 MPa.

In some cases, the metal products described herein can have a uniform elongation of at least about 18%. For example, the metal products described herein can have a uniform elongation of from about 18% to about 25% (e.g., from about 19% to about 23%). In some cases, the uniform elongation can be about 18%, 18.5%, 19%, 19.5%, 20%, 20.5%, 21%, 21.5%, 22%, 22.5%, 23%, 23.5%, 24%, 24.5%, or 25%.

In some cases, the metal products described herein can have a total elongation of at least about 20.5%. For example, the metal products described herein can have a total elongation of from about 20.5% to about 27.5% (e.g., from about 22% to about 26%). In some cases, the total elongation can be about 20.5%, 21%, 21.5%, 22%, 22.5%, 23%, 23.5%, 24%, 24.5%, 25%, 25.5%, 26%, 26.5%, 27%, or 27.5%.

Methods of Making

The recycled content alloys can be used to cast various metallic cast products, such as billets, ingots, or strips. Prior to casting, liquid metal from recycled scrap can optionally be degassed to reduce the amount of hydrogen dissolved in the liquid metal. In some cases, the degassing can include bubbling a gas, such as an inert gas (e.g., argon or nitrogen), through the liquid metal to induce dissolving of the hydrogen bubbles into the gas, and thus out of the liquid metal. Any suitable degassing technique can be used.

After the optional degassing step, the recycled content alloys described herein can be cast using any suitable casting method known to those of ordinary skill in the art. As a few non-limiting examples, the casting process can include a direct chill (DC) casting process or a continuous casting (CC) process. A direct chill casting system can include a mold cavity and a retractable bottom block. As liquid metal solidifies in the mold cavity, the bottom block can be retracted away from the mold cavity to support the solidifying ingot (e.g., embryonic ingot) as the ingot continuous to grow in length due to solidifying metal at the surfaces of the ingot and as the ingot continuous to solidify throughout. The continuous casting system can include a pair of moving opposed casting surfaces (e.g., moving opposed belts, rolls or blocks), a casting cavity between the pair of moving opposed casting surfaces, and a molten metal injector. The molten metal injector can have an end opening from which molten metal can exit the molten metal injector and be injected into the casting cavity. Certain aspects of the present disclosure can involve continuous casting using a twin belt continuous casting device or a twin roll continuous casting device.

After casting, the metal product (e.g., metal sheets, plates, or other cast products) can be rolled to a desired gauge. The metal product cast from the recycled content alloys as disclosed herein can have higher-than-usual concentrations of alloying elements. The traditional rolling technique is to pass the metal product through a hot rolling process and then a cold rolling process. Hot rolling occurs at temperatures above the recrystallization temperature of the metal, while cold rolling occurs at temperatures below the recrystallization temperature. Since cold rolling involves deforming the metal at temperatures below the recrystallization temperature, the metal is strain hardened through the formation of dislocations within the metal's matrix.

Through non-trivial testing and experimentation, it has been found that a metal product cast using the recycled content alloys disclosed herein, with higher-than-usual concentrations of alloying elements, can be advantageously hot rolled to gauge (e.g., to an intermediate gauge or to a final gauge, as further described above), thus eliminating the requirement for one or more cold rolling steps that would otherwise deform the metal product to the desired gauge. Optionally, the metal products described herein can be delivered in any suitable gauge as described herein. For example, the metal product can be delivered in an intermediate gauge or in a final gauge to a customer (e.g., an original equipment manufacturer) or any other suitable end user. In some cases, hot rolling to gauge can include receiving a metal product from a continuous casting device, although that need not always be the case. In some cases, it has been determined that hot rolling to gauge can result in improved metallurgical properties over techniques that include cold rolling to gauge without hot rolling and hot rolling to an intermediate gauge and then cold rolling to the final gauge. Further, casting the metal product using a continuous casting device, such as a casting device as disclosed herein, can facilitate hot rolling to gauge without needing to rely on subsequent cold rolling. In some cases, the cast metal products are cold rolled during processing.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a flowchart depicting a process 100 for casting and hot rolling a metal product from recycled scrap according to certain aspects of the present disclosure. At block 102, recycled scrap, such as UBC scrap, is melted. The scrap can be melted in any suitable vessel, such as a rotary furnace, a crucible furnace, or any other suitable heating device. The liquid metal resulting from the recycled scrap can include alloying elements that would render the liquid metal a non-standard alloy, such as an alloy that is not normally used for beverage parts (e.g., can ends or can bodies) or automotive parts (e.g., automotive hood liners).

At block 104, additional alloying elements can be added to the liquid metal to achieve a modified liquid metal with desired concentrations of alloying elements. Adding alloying elements can include melting raw elements or mixtures of aluminum and the alloying elements into the liquid metal from block 102. After adding the alloying elements, the modified liquid metal can have a desired composition of alloying elements and aluminum.

At block 105, the modified liquid metal from block 104 can be degassed to decrease the amount of dissolved gasses in the modified liquid metal. Degassing the modified liquid metal can include lowering the concentration of hydrogen in the modified liquid metal to a desired concentration, such as those identified above (e.g., at or below 0.25 mL/100 grams). For example, the amount of hydrogen included in the modified liquid metal after degassing can be at or less than approximately 0.25 mL/100 grams, 0.24 mL/100 grams, 0.23 mL/100 grams, 0.22 mL/100 grams, 0.21 mL/100 grams, 0.2 mL/100 grams, 0.19 mL/100 grams, 0.18 mL/100 grams, 0.17 mL/100 grams, 0.16 mL/100 grams, 0.15 mL/100 grams, 0.14 mL/100 grams, 0.13 mL/100 grams, 0.12 mL/100 grams, 0.11 mL/100 grams, 0.1 mL/100 grams, 0.09 mL/100 grams, 0.08 mL/100 grams, 0.07 mL/100 grams, 0.06 mL/100 grams, or 0.05 mL/100 grams. Any suitable technique can be used to degas the modified liquid metal.

At block 106, the degassed, modified liquid metal from block 105 can be cast using a continuous casting device to result in an intermediate metal product 116. The modified liquid metal cast at block 106 can include little or no primary aluminum. In some cases, the modified liquid metal can include at or less than approximately 50%, 40%, 30%, 20%, 15%, 10%, 9%, 8%, 7%, 6%, 5%, 4%, 3%, 2%, or 1% primary aluminum.

In some cases, instead of casting using a continuous casting device, as described with reference to block 106, the degassed, modified liquid metal from block 105 can be cast using a direct chill casting device at block 107 and optionally rolled to an intermediate gauge. The resulting metal product at the intermediate gauge can be an intermediate metal product 116. Rolling to an intermediate gauge can include reducing the thickness of a direct-chill-cast ingot using any suitable equipment, such as using a reversing mill. In some cases, the modified liquid metal can include at or less than approximately 50%, 40%, 30%, 20%, 15%, 10%, 9%, 8%, 7%, 6%, 5%, 4%, 3%, 2%, or 1% primary aluminum.

At block 108, the intermediate metal product 116 can be hot rolled to gauge. Hot rolling to gauge can include applying pressure to the intermediate metal product 116 through one or more work rolls at elevated temperatures, such as temperatures at or above the recrystallization temperature of the intermediate metal product 116, although lower temperatures can also be used. For example, in some cases the hot rolling can occur at temperatures at or above approximately 400° C., although other temperatures can be used. As a result of the hot rolling at block 108, the intermediate metal product 116 is reduced in thickness from an as-cast gauge to a desired gauge for delivery to an original equipment manufacturer (OEM) or other user. In an example, the as-cast gauge of an intermediate metal product 116 can be approximately 10 mm, whereas the final gauge (e.g., a desired gauge for delivery to an OEM) can be approximately 1.5 mm, although other gauges can be used. During hot rolling, the metal product can pass through any number of rollers implemented through any number of roll stands. After hot rolling, the metal product can be considered a hot-rolled metal product 118. The hot-rolled metal product 118 can have a T4 or O temper.

In some cases, the metal product can be preheated prior to hot rolling. For example, the metal product can be preheated to a temperature at or above the recrystallization temperature. In an example, a metal product can be preheated to a temperature at or above approximately 400° C., 450° C., 500° C., 550° C., 560° C., 570° C., or 580° C. In some cases, the metal product can be preheated in an oven at 400° C. to 580° C. for a period of 5 minutes to 15 hours. In some cases, the oven temperature can be approximately 550° C. to 570° C. and the time can be between 30 minutes and 6 hours. In some cases, the oven temperature can be approximately 560° C. and the time can be between 30 minutes and 6 hours. In some cases, preheating can occur at other temperatures and for other durations.

At optional block 112, the hot-rolled metal product 118 can undergo heat treatment. In some cases, the heat treatment includes annealing. At block 112, the hot-rolled metal product 118 can be reheated to at or above an annealing temperature for a suitable period of time. For example, heating the hot-rolled metal product 118 to a temperature at or above 350° C. for approximately 1 hour can bring the metal product to an O temper.

In some cases, heat treatment can include solutionizing the hot-rolled metal product 118 to put certain alloying elements back into solution, such as silicon and copper. As part of solutionizing, the reheated metal product can be quenched to facilitate keeping the alloying elements in solution.

Heat treatment can improve metallurgical and/or mechanical properties of the metal product. For example, annealing can result in improvements to the formability of the metal product.

At block 114, the metal product can be coiled for delivery to an OEM. In some cases, the metal product can undergo further processing before delivery or can proceed directly into part manufacturing without coiling.

Figure 2:
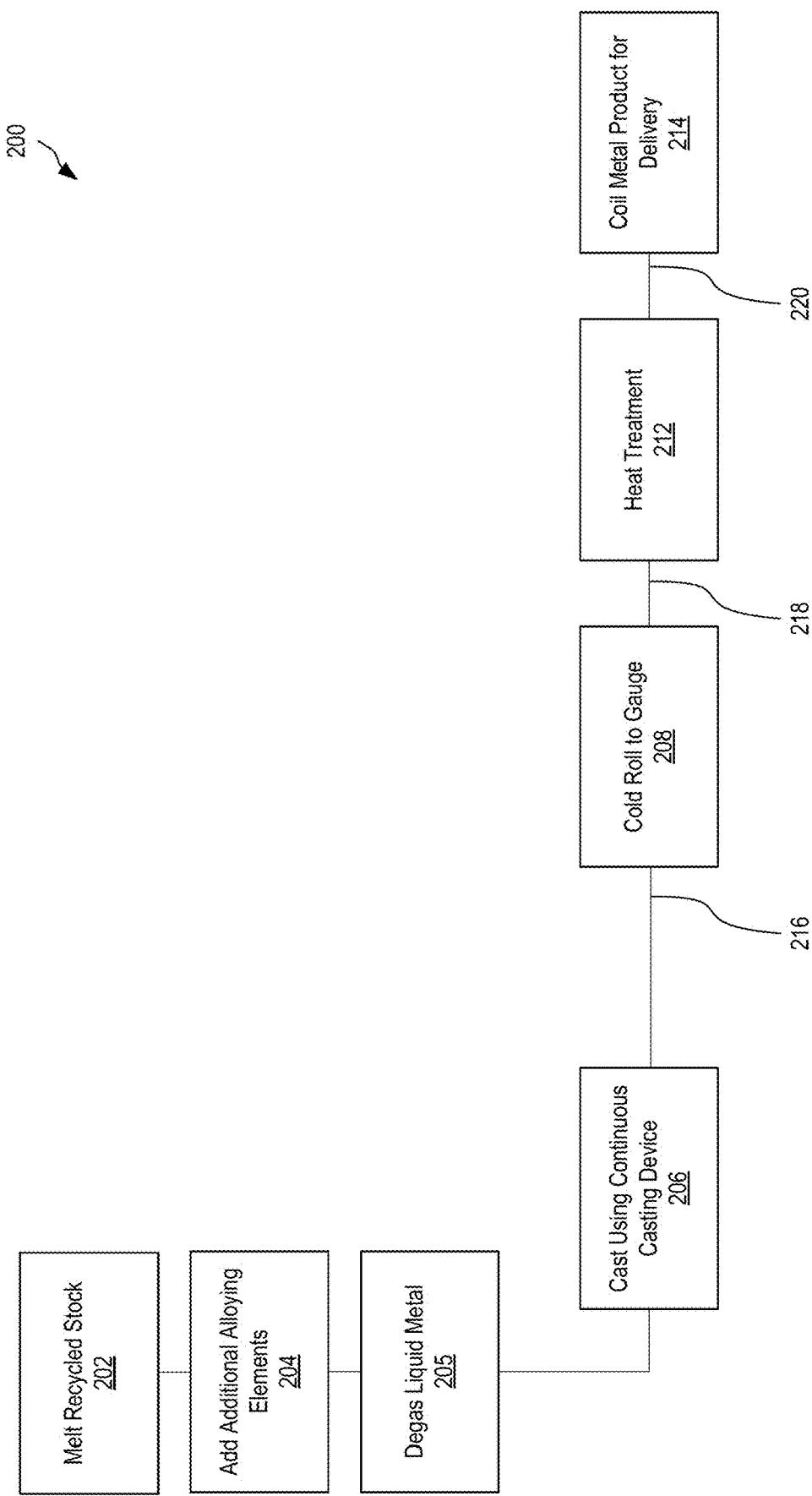
FIG. 2 is a flowchart depicting a process for casting and cold rolling a metal product from UBC or other scrap according to certain aspects of the present disclosure.

FIG. 2 is a flowchart depicting a process 200 for casting and cold rolling a metal product from recycled scrap, such as UBC scrap, according to certain aspects of the present disclosure. At block 202, recycled scrap, such as UBC scrap, is melted 202. The scrap can be melted in any suitable vessel, such as a rotary furnace, a crucible furnace, or any other suitable heating device. The liquid metal resulting from the recycled scrap can include alloying elements that would render the liquid metal a non-standard alloy, such as an alloy that is not normally used for beverage parts (e.g., can ends or can bodies) or automotive parts (e.g., automotive hood inners or deck-lid inners).

At block 204, additional alloying elements can be added to the liquid metal to achieve a modified liquid metal with desired concentrations of alloying elements. Adding alloying elements can include melting raw elements or mixtures of aluminum and the alloying elements into the liquid metal from block 202. After adding the alloying elements, the modified liquid metal can have a desired composition of alloying elements and aluminum.

At block 205, the modified liquid metal from block 204 can be degassed to decrease the amount of dissolved gasses in the modified liquid metal. Degassing the modified liquid metal can include lowering the concentration of hydrogen in the modified liquid metal to a desired concentration, such as those identified above (e.g., at or below 0.25 mL/100 grams). For example, the amount of hydrogen included in the modified liquid metal after degassing can be at or less than approximately 0.25 mL/100 grams, 0.24 mL/100 grams, 0.23 mL/100 grams, 0.22 mL/100 grams, 0.21 mL/100 grams, 0.2 mL/100 grams, 0.19 mL/100 grams, 0.18 mL/100 grams, 0.17 mL/100 grams, 0.16 mL/100 grams, 0.15 mL/100 grams, 0.14 mL/100 grams, 0.13 mL/100 grams, 0.12 mL/100 grams, 0.11 mL/100 grams, 0.1 mL/100 grams, 0.09 mL/100 grams, 0.08 mL/100 grams, 0.07 mL/100 grams, 0.06 mL/100 grams, or 0.05 mL/100 grams. Any suitable technique can be used to degas the modified liquid metal.

At block 206, the degassed, modified liquid metal from block 205 can be cast using a continuous casting device, to result in an intermediate metal product 216. The modified liquid metal cast at block 206 can include little or no primary aluminum. In some cases, the modified liquid metal can include at or less than approximately 50%, 40%, 30%, 20%, 15%, 10%, 9%, 8%, 7%, 6%, 5%, 4%, 3%, 2%, or 1% primary aluminum.

At block 208, the intermediate metal product 216 can be cold rolled to gauge. Cold rolling to gauge can include applying pressure to the intermediate metal product 216 through one or more work rolls at temperatures below the recrystallization temperature of the intermediate metal product 216. For example, in some cases the cold rolling can occur at temperatures below approximately 400° C., although other temperatures can be used. As a result of the cold rolling at block 208, the intermediate metal product 216 is reduced in thickness from an as-cast gauge to a desired gauge for delivery to an OEM or other user. In an example, the as-cast gauge of an intermediate metal product 216 can be approximately 10 mm, whereas the final gauge (e.g., a desired gauge for delivery to an OEM) can be approximately 1.5 mm, although other gauges can be used. During cold rolling, the metal product can pass through any number of rollers implemented through any number of roll stands. After cold rolling, the metal product can be considered a cold-rolled metal product 218. The cold-rolled metal product 218 can have an H temper.

At optional block 212, the cold-rolled metal product 218 can undergo heat treatment. In some cases, the heat treatment includes annealing. At block 212, the cold-rolled metal product 218 can be reheated to at or above an annealing temperature for a suitable period of time. For example, heating the cold-rolled metal product 218 to a temperature at or above 350° C. for approximately 1 hour can bring the metal product to an O temper.

In some cases, heat treatment can include solutionizing the cold-rolled metal product 218 to put certain alloying elements back into solution, such as silicon and copper. As part of solutionizing, the reheated metal product can be quenched to facilitate keeping the alloying elements in solution.

Heat treatment can improve metallurgical and/or mechanical properties of the metal product. For example, annealing can result in improvements to the formability of the metal product.

At block 214, the metal product can be coiled for delivery to an OEM. In some cases, the metal product can undergo further processing before delivery or can proceed directly into part manufacturing without coiling.

Figure 3:
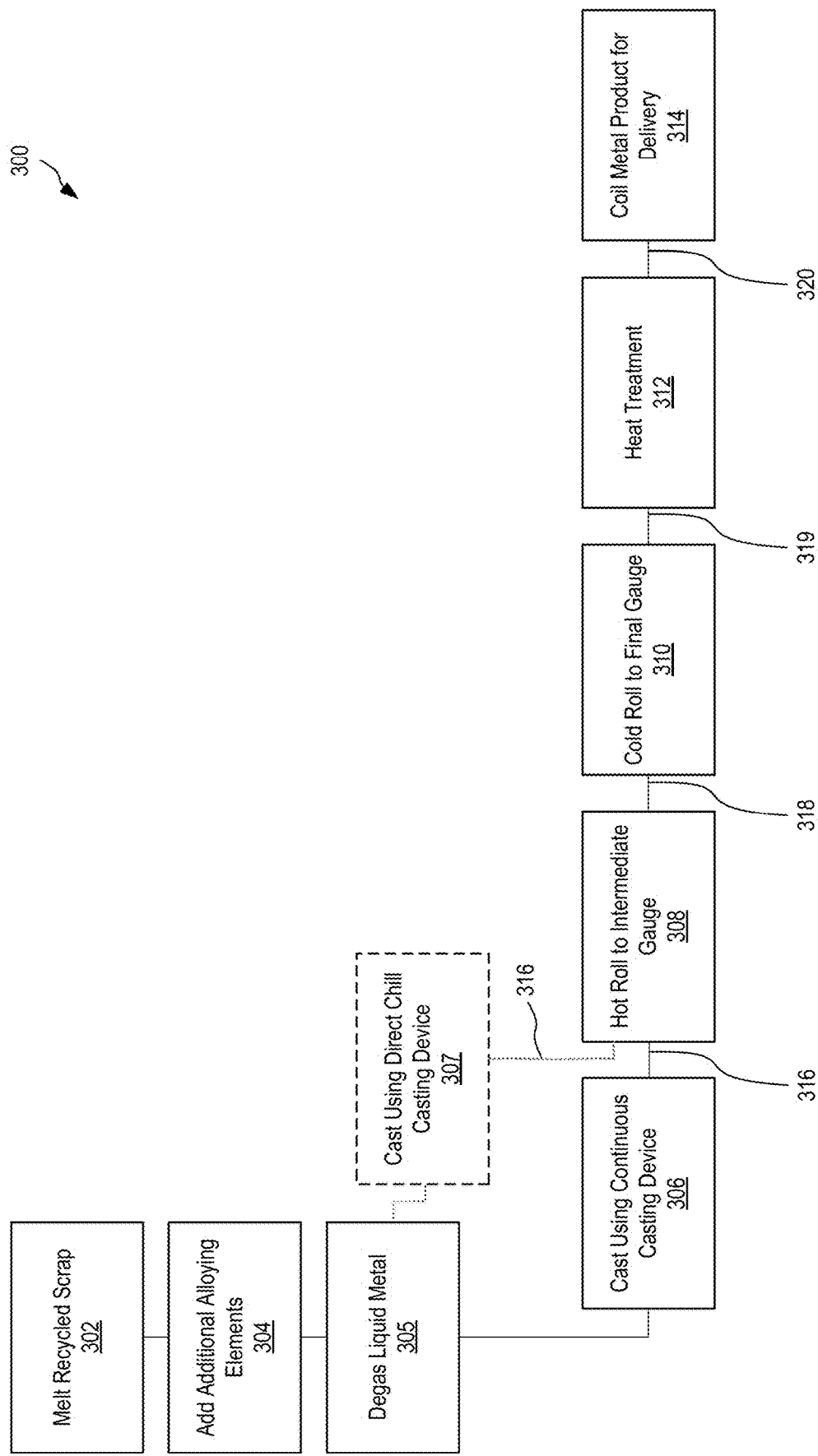
FIG. 3 is a flowchart depicting a process for casting and rolling a metal product from UBC or other scrap using hot and cold rolling according to certain aspects of the present disclosure.

FIG. 3 is a flowchart depicting a process 300 for casting and rolling a metal product from recycled scrap, such as UBC scrap, using hot and cold rolling according to certain aspects of the present disclosure. At block 302, recycled scrap, such as UBC scrap, is melted 302. The scrap can be melted in any suitable vessel, such as a rotary furnace, a crucible furnace, or any other suitable heating device. The liquid metal resulting from the recycled scrap can include alloying elements that would render the liquid metal a non-standard alloy, such as an alloy that is not normally used for beverage parts (e.g., can ends or can bodies) or automotive parts (e.g., automotive hood liners).

At block 304, additional alloying elements can be added to the liquid metal to achieve a modified liquid metal with desired concentrations of alloying elements. Adding alloying elements can include melting raw elements or mixtures of aluminum and the alloying elements into the modified liquid metal from block 302. After adding the alloying elements, the modified liquid metal can have a desired composition of alloying elements and aluminum.

At block 305, the modified liquid metal from block 304 can be degassed to decrease the amount of dissolved gasses in the modified liquid metal. Degassing the modified liquid metal can include lowering the concentration of hydrogen in the modified liquid metal to a desired concentration, such as those identified above (e.g., at or below 0.25 mL/100 grams). For example, the amount of hydrogen included in the modified liquid metal after degassing can be at or less than approximately 0.25 mL/100 grams, 0.24 mL/100 grams, 0.23 mL/100 grams, 0.22 mL/100 grams, 0.21 mL/100 grams, 0.2 mL/100 grams, 0.19 mL/100 grams, 0.18 mL/100 grams, 0.17 mL/100 grams, 0.16 mL/100 grams, 0.15 mL/100 grams, 0.14 mL/100 grams, 0.13 mL/100 grams, 0.12 mL/100 grams, 0.11 mL/100 grams, 0.1 mL/100 grams, 0.09 mL/100 grams, 0.08 mL/100 grams, 0.07 mL/100 grams, 0.06 mL/100 grams, or 0.05 mL/100 grams. Any suitable technique can be used to degas the modified liquid metal.

At block 306, the degassed, modified liquid metal from block 305 can be cast using a continuous casting device to result in an intermediate metal product 316. The modified liquid metal cast at block 306 can include little or no primary aluminum. In some cases, the modified liquid metal can include at or less than approximately 50%, 40%, 30%, 20%, 15%, 10%, 9%, 8%, 7%, 6%, 5%, 4%, 3%, 2%, or 1% primary aluminum.

In some cases, instead of casting using a continuous casting device, as described with reference to block 306, the degassed, modified liquid metal from block 305 can be cast using a direct chill casting device at block 307 and optionally rolled to an initial, intermediate gauge. The resulting metal product at the intermediate gauge can be an intermediate metal product 316. Rolling to an intermediate gauge can include reducing the thickness of a direct-chill-cast ingot using any suitable equipment, such as using a reversing mill. In some cases, the modified liquid metal can include at or less than approximately 50%, 40%, 30%, 20%, 15%, 10%, 9%, 8%, 7%, 6%, 5%, 4%, 3%, 2%, or 1% primary aluminum.

At block 308, the intermediate metal product 316 can be hot rolled and reduced in thickness to an intermediate gauge. Hot rolling to an intermediate gauge can include applying pressure to the intermediate metal product 316 through one or more work rolls at elevated temperatures, such as temperatures at or above the recrystallization temperature of the intermediate metal product 316, although lower temperatures can also be used. For example, in some cases the hot rolling can occur at temperatures at or above approximately 400° C., although other temperatures can be used. As a result of the hot rolling at block 308, the intermediate metal product 316 is reduced in thickness from an as-cast gauge to an intermediate gauge. In an example, the as-cast gauge of an intermediate metal product 316 can be approximately 10 mm, whereas the intermediate gauge can be approximately 4 mm, although other gauges can be used. During hot rolling, the metal product can pass through any number of rollers implemented through any number of roll stands. After hot rolling, the metal product can be considered a hot-rolled metal product 318. The hot-rolled metal product 318 can have a T4 or O temper.

In some cases, the metal product can be preheated prior to hot rolling. For example, the metal product can be preheated to a temperature at or above the recrystallization temperature. In an example, a metal product can be preheated to a temperature at or above approximately 400° C., 450° C., 500° C., 550° C., 560° C., 570° C., or 580° C. In some cases, the metal product can be preheated in an oven at 400° C. to 580° C. for a period of 5 minutes to 15 hours. In some cases, the oven temperature can be approximately 550° C. to 570° C. and the time can be between 30 minutes and 6 hours. In some cases, the oven temperature can be approximately 560° C. and the time can be between 30 minutes and 6 hours. In some cases, preheating can occur at other temperatures and for other durations.

At block 310, the hot-rolled metal product 318 can be cold rolled from the intermediate gauge to the final gauge. Cold rolling to gauge can include applying pressure to the hot-rolled metal product 318 through one or more work rolls at temperatures below the recrystallization temperature of the hot-rolled metal product 318. For example, in some cases the cold rolling can occur at temperatures below approximately 400° C., although other temperatures can be used. As a result of the cold rolling at block 310, the hot-rolled metal product 318 is reduced in thickness from an intermediate gauge to a desired gauge for delivery to an OEM or other user. In an example, the intermediate gauge of a hot-rolled metal product 318 can be approximately 4 mm, whereas the final gauge (e.g., a desired gauge for delivery to an OEM) can be approximately 1.5 mm, although other gauges can be used. During cold rolling, the metal product can pass through any number of rollers implemented through any number of roll stands. After cold rolling, the metal product can be considered a cold-rolled metal product 319. The cold-rolled metal product 319 can have a T3 temper.

At optional block 312, the cold-rolled metal product 318 can undergo heat treatment. In some cases, the heat treatment includes annealing. At block 312, the cold-rolled metal product 319 can be reheated to at or above an annealing temperature for a suitable period of time. For example, heating the cold-rolled metal product 319 to a temperature at or above 350° C. for approximately 1 hour can bring the metal product to an O temper.

In some cases, heat treatment can include solutionizing the cold-rolled metal product 319 to put certain alloying elements back into solution, such as silicon and copper. As part of solutionizing, the reheated metal product can be quenched to facilitate keeping the alloying elements in solution.

Heat treatment can improve metallurgical and/or mechanical properties of the metal product. For example, annealing can result in improvements to the formability of the metal product.

At block 314, the metal product can be coiled for delivery to an OEM. In some cases, the metal product can undergo further processing before delivery or can proceed directly into part manufacturing without coiling.

Figure 4:
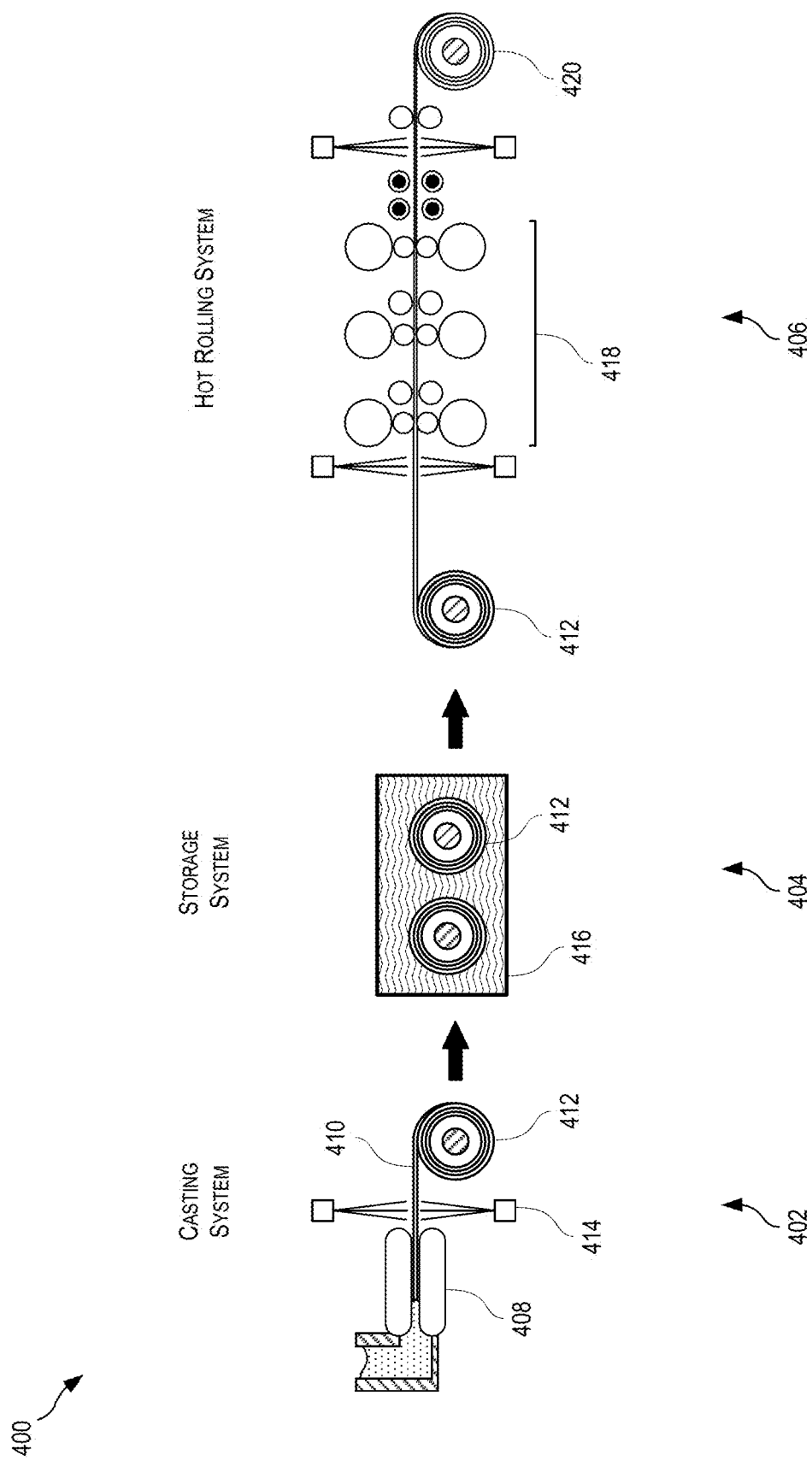
FIG. 4 is a schematic diagram depicting a decoupled metal casting and rolling system according to certain aspects of the present disclosure.

FIG. 4 is a schematic diagram depicting a decoupled metal casting and rolling system 400 according to certain aspects of the present disclosure. The decoupled metal casting and rolling system 400 can be especially suitable for casting and rolling metal from recycled scrap, such as UBC scrap. For example, the decoupled metal casting and rolling system 400 can be used to perform the process 100 of FIG. 1.

The decoupled metal casting and rolling system 400 can include a casting system 402, a storage system 404, and a hot rolling system 406. The decoupled metal casting and rolling system 400 can be considered a single, continuous processing line having decoupled subsystems. The metal product 410 cast by the casting system 402 can continue in a downstream direction through the storage system 404 and the hot rolling system 406. The decoupled metal casting and rolling system 400 can be considered continuous, as metal product 410 can be continuously produced by the casting system 402, stored by the storage system 404, and hot rolled by the hot rolling system 406. In some cases, the decoupled metal casting and rolling system 400 can be located within a single building or facility, however in some cases the subsystems of the decoupled metal casting and rolling system 400 may be located separately from one another. In some cases, a single casting system 402 can be associated with one or more storage systems 404 and one or more hot rolling systems 406, thereby allowing the casting system 402 to operate continuously at a rate of speed much higher than a single storage system 404 or hot rolling system 406 would otherwise permit.

The casting system 402 includes a continuous casting device, such as a continuous belt caster 408 (e.g., a twin belt caster), that continuously casts a metal product 410. The casting system 402 can optionally include a fast quenching system 414 positioned immediately downstream of the continuous belt caster 408, or shortly thereafter. The casting system 402 can include a coiling device capable of coiling the metal product 410 into an intermediate coil 412. While the continuous casting system 402 depicted in FIG. 4 is a continuous belt caster, other continuous casting systems can be used, such as twin roll continuous casting systems.

The intermediate coil 412 accumulates a portion of the metal product 410 exiting the continuous belt caster 408 and can be transported to another location, allowing a new intermediate coil 412 to form thereafter from additional metal product 410 exiting the continuous belt caster 408, thus allowing the continuous belt caster 408 to operate continuously or semi-continuously.

The intermediate coil 412 can be provided directly to the hot rolling system 406, or can be stored and/or processed in the storage system 404. The storage system 404 can include various storage mechanisms, such as vertical or horizontal storage mechanisms and periodic or continuously rotating storage mechanisms. In some cases, intermediate coils 412 can undergo preheating in a preheater 416 (e.g., a furnace) when being stored in the storage system 404. Preheating can occur for some or all of the duration of time when the intermediate coil 412 is in the storage system 404. After being stored in the storage system 404, the metal product 410 can be provided to the hot rolling system 406.

The hot rolling system 406 can reduce the thickness of the metal product 410 from an as-cast gauge to a desired gauge for distribution. In some cases, the desired gauge for distribution can be at or approximately 0.7 mm to 4.5 mm, or at or approximately 1.5 mm to 3.5 mm. The hot rolling system 406 can include a set of hot rolling stands 418 for reducing the thickness of the metal product 410. In some cases, the set of hot rolling stands 418 can include a single hot rolling stand, however any number of hot rolling stands can be used, such as two, three, or more. In some cases, the use of a larger number of hot rolling stands (e.g., three, four, or more) can result in better surface quality for a given total reduction of thickness (e.g., reduction of thickness from before the first hot rolling stand to after the last hot rolling stand) because each rolling stand therefore needs to reduce the thickness of the metal by a smaller amount, and thus fewer surface defects are generally imparted on the metal product. However, a suitable surface quality can be achieved using one or two hot rolling stands. The hot rolling system 406 can further perform other processing of the metal product, such as surface finishing (e.g., texturing), preheating, and heat treating. Metal product 410 exiting the hot rolling system 406 can be provided directly to further processing equipment (e.g., a blanking machine or a bending machine) or can be coiled into a distributable coil 420 (e.g., a finished coil). As used herein, the term distributable can describe a metal product, such as a coiled metal product, that has the desired characteristics of a consumer of the metal product. For example, a distributable coil 420 can include coiled metal product having physical and/or chemical characteristics that meet an original equipment manufacturer's specifications. The distributable coil 420 can be in any suitable temper, including a W temper, a T temper, or an O temper. The distributable coil 420 can be stored, sold, and shipped as appropriate.

The decoupled metal casting and rolling system 400 depicted in FIG. 4 allows the speed of the casting system 402 to be decoupled from the speed of the hot rolling system 406. As depicted, the decoupled metal casting and rolling system 400 uses a storage system 404 for storing intermediate coils 412, wherein the metal product 410 exiting the continuous belt caster 408 is coiled into discrete units and stored until the hot rolling system 406 is available to process them. Instead of storing intermediate coils 412, in some cases, the storage system 404 uses an inline accumulator that accepts metal product 410 from the casting system 402 at a first speed and accumulates it between a set of moving rollers to allow the continuous metal product 410 to be fed into a hot rolling system 406 at a second speed different from the first speed. The inline accumulator can be sized to accommodate a difference in first speed and second speed for a predetermined time period based on the desired casting duration of the casting system 402. In systems where the casting system 402 is desired to operate continuously, a coil-based storage system 404 can be desirable.

Figure 5:
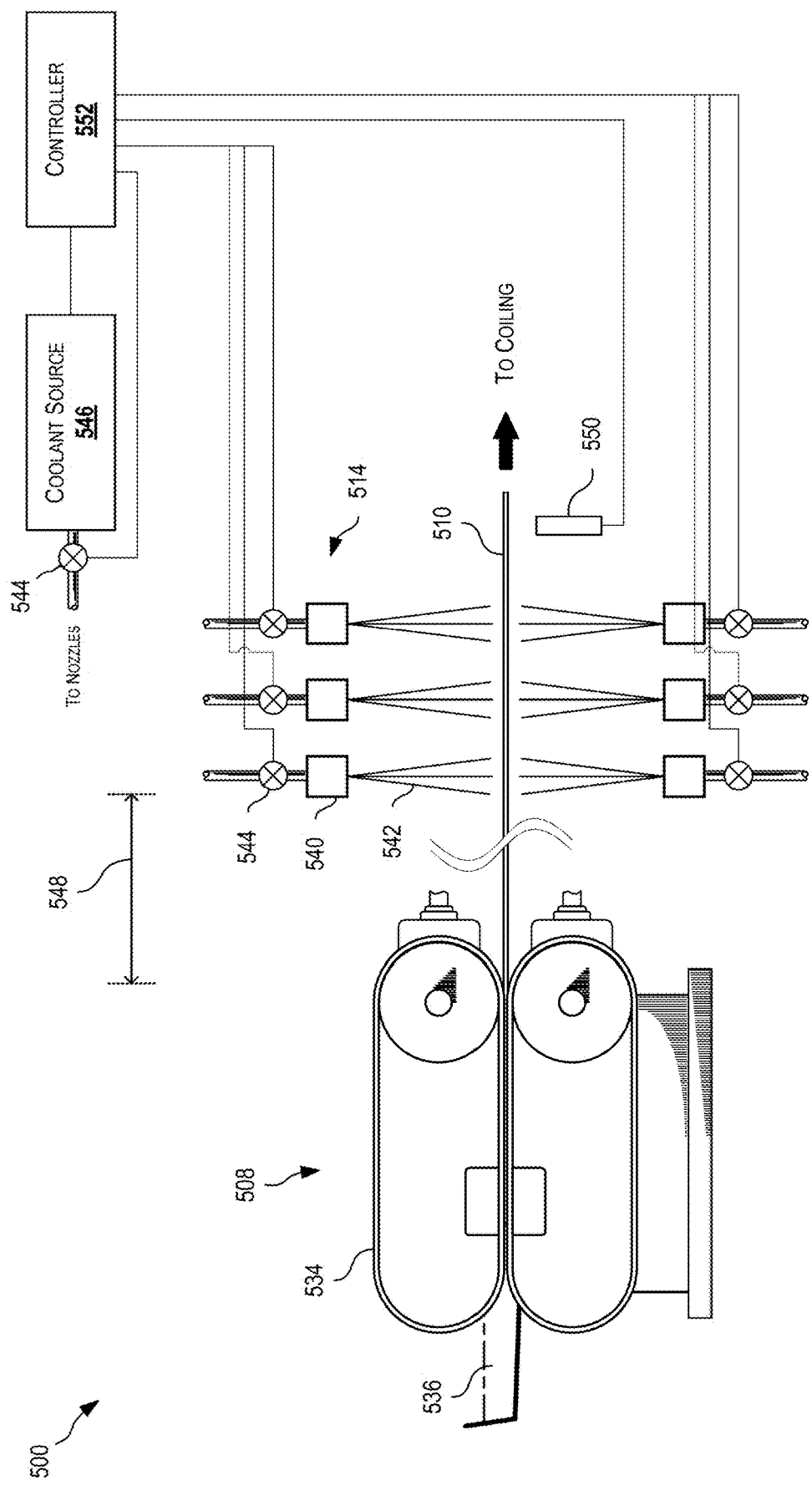
FIG. 5 is a schematic diagram depicting a continuous casting system according to certain aspects of the present disclosure.

FIG. 5 is a schematic diagram depicting a continuous casting system 500 according to certain aspects of the present disclosure. The continuous casting system 500 includes a continuous casting device, such as a continuous belt caster 508. The continuous casting system 500 can be especially suitable for casting and rolling metal from UBC scrap. For example, the continuous casting system 400 can be used to perform the casting at blocks 106, 206, or 306 of FIG. 1, 2, or 3, respectively.

The continuous belt caster 508 includes opposing belts 534 capable of extracting heat from liquid metal 536 (e.g., a modified liquid metal) at a cooling rate sufficient to solidify the liquid metal 536, which once solid passes out of the continuous belt caster 508 as a metal product 510. The liquid metal 536 can be the modified liquid metal from recycled scrap, such as UBC scrap, as described herein.

The continuous belt caster 508 can operate at a desired casting speed. The opposing belts 534 can be made of any suitable material, however in some cases the belts 534 are made from copper. Cooling systems within the continuous belt caster 508 can extract sufficient heat from the liquid metal 536 such that the metal product 510 exiting the continuous belt caster 508 has a temperature between 200° C. to 530° C., although other ranges can be used.

In some cases, fast solidification and fast cooling can be achieved by using a continuous belt caster 508 configured to extract sufficient heat from the metal such that the metal product 510 exiting the continuous belt caster 508 has a temperature below 200° C. In other cases, fast post-casting cooling can be performed by a quenching system 514 positioned immediately downstream of the continuous belt caster 508 or shortly thereafter. The quenching system 514 can extract sufficient heat from the metal product 510 such that the metal product exits the quenching system 514 at a temperature at or below 100° C., despite the temperature at which the metal product 510 exits the continuous belt caster 508. As one example, the quenching system 514 can be configured to reduce the temperature of the metal product 510 to at or below 100° C. within approximately ten seconds.

The quenching system 514 can include one or more nozzles 540 for distributing coolant 542 onto the metal product 510. Coolant 542 can be fed to nozzles 540 from a coolant source 546 coupled to the nozzles 540 by appropriate piping. The quenching system 514 can include one or move valves 544, including valves 544 associated with one or more nozzles 540 and/or valves 544 associated with the coolant source 546, to adjust the amount of coolant 542 being applied to the metal product 510. In some cases, the coolant source 546 can include a temperature control device for setting a desired temperature of the coolant 542. A controller 552 can be operatively coupled to the valve(s) 544, the coolant source 546, and/or a sensor 550 to control the quenching system 514. The sensor 550 can be any suitable sensor for determining a temperature of the metal product 510, such as a temperature of the metal product 510 as it exits the quenching system 514. Based on the a detected temperature, the controller 552 can adjust a temperature of the coolant 542 or a flow rate of the coolant 542 to maintain the temperature of the metal product 510 as it exits the quenching system 514 within desired parameters (e.g., below 100° C.).

The quenching system 514 can be positioned to begin cooling the metal product 510 a distance 548 downstream of where the metal product 510 exits the continuous belt caster 508. The distance 548 can be as small as practicable. In some cases, the distance 548 is at or less than 5 meters, 4 meters, 3 meters, 2 meters, 1 meter, 50 cm, 25 cm, 20 cm, 15 cm, 10 cm, 5 cm, 2.5 cm, or 1 cm.

Metal product 510 exiting the quenching system 514 can be coiled, by a coiling device, into an intermediate coil. In some cases, the metal product 510 can continue directly to hot rolling.

Illustrations of Suitable Products and Methods

As used below, any reference to a series of illustrations is to be understood as a reference to each of those illustrations disjunctively (e.g., "Illustrations 1-4" is to be understood as "Illustrations 1, 2, 3, or 4").

Illustration 1 is a metal casting method comprising: melting recycled aluminum into liquid metal; adding an alloying element to the liquid metal to form a modified liquid metal, the alloying element comprising magnesium, silicon, or copper; casting the modified liquid metal into a metal product, wherein the modified liquid metal includes at least 50% of a recycled aluminum; and rolling the metal product.

Illustration 2 is the method of any preceding or subsequent illustration, wherein the rolling comprises hot rolling the metal product to a gauge for delivery.

Illustration 3 is the method of any preceding or subsequent illustration, wherein the gauge for delivery is an intermediate gauge.

Illustration 4 is the method of any preceding or subsequent illustration, wherein the gauge for delivery is a final gauge.

Illustration 5 is the method of any preceding or subsequent illustration, wherein the rolling comprises cold rolling the metal product to a gauge for delivery.

Illustration 6 is the method of any preceding or subsequent illustration, wherein the gauge for delivery is an intermediate gauge.

Illustration 7 is the method of any preceding or subsequent illustration, wherein the gauge for delivery is a final gauge.

Illustration 8 is the method of any preceding or subsequent illustration, wherein the rolling comprises hot rolling and cold rolling the metal product.

Illustration 9 is the method of any preceding or subsequent illustration, wherein the modified liquid metal comprises magnesium in an amount of up to about 7 wt. %.

Illustration 10 is the method of any preceding or subsequent illustration, wherein the modified liquid metal comprises magnesium in an amount of at least about 1.5 wt. %.

Illustration 11 is the method of any preceding or subsequent illustration, the modified liquid metal comprises magnesium in an amount of from about 1.5 wt. % to about 4 wt. %.

Illustration 12 is the method of any preceding or subsequent illustration, further comprising reheating the metal product to an annealing temperature after the rolling, wherein the annealing temperature is below a solidus temperature for the metal product.

Illustration 13 is the method of any preceding or subsequent illustration, wherein the casting comprises continuously casting the modified liquid metal.

Illustration 14 is the method of any preceding or subsequent illustration, wherein the casting comprises direct chill casting the modified liquid metal.

Illustration 15 is the method of any preceding or subsequent illustration, wherein the recycled aluminum comprises used beverage can scrap containing a mixture of recycled metal from can ends and can bodies.

Illustration 16 is the method of any preceding or subsequent illustration, wherein the modified liquid metal comprises at least of the 60% recycled aluminum.

Illustration 17 is the method of any preceding or subsequent illustration, wherein the modified liquid metal comprises at least of the 80% recycled aluminum.

Illustration 18 is the method of any preceding or subsequent illustration, wherein the modified liquid metal comprises a hydrogen content of 0.25 mL/100 grams or less.

Illustration 19 is a metal product cast from recycled materials according to a method comprising any preceding or subsequent illustration.

Illustration 20 is a metal product, comprising an aluminum alloy comprising about 0.01 wt. % to 1.0 wt. % Cu, 0.15 wt. % to 0.8 wt. % Fe, 0.5 wt. % to 7.0 wt. % Mg, 0.01 wt. % to 1.2 wt. % Mn, up to 1.5 wt. % Si, up to 0.15 wt. % impurities, and Al; wherein the metal product is cast from a modified liquid metal that includes at least 50% of a recycled aluminum.

Illustration 21 is the metal product of any preceding or subsequent illustration, wherein the aluminum alloy comprises about 0.1 to 0.9 wt. % Cu, 0.25 wt. % to 0.7 wt. % Fe, 1.0 wt. % to 5.0 wt. % Mg, 0.1 wt. % to 0.9 wt. % Mn, 0.01 wt. % to 1.0 wt. % Si, 0.01 wt. % to 0.15 wt. % Ti, 0.01 wt. % to 5.0 wt. % Zn, 0.01 wt. % to 0.25 wt. % Cr, 0.01 wt. % to 0.1 wt. % Zr, up to 0.15 wt. % impurities, and Al.

Illustration 22 is the metal product of any preceding or subsequent illustration, wherein the aluminum alloy comprises about 0.2 to 0.8 wt. % Cu, 0.3 wt. % to 0.6 wt. % Fe, 1.4 wt. % to 3.0 wt. % Mg, 0.2 wt. % to 0.7 wt. % Mn, 0.2 wt. % to 0.5 wt. % Si, 0.02 wt. % to 0.1 wt. % Ti, 0.02 wt. % to 3.0 wt. % Zn, 0.02 wt. % to 0.1 wt. % Cr, 0.02 wt. % to 0.05 wt. % Zr, up to 0.15 wt. % impurities, and Al.

Illustration 23 is the metal product of any preceding or subsequent illustration, wherein the modified liquid metal includes at least 60% of the recycled aluminum.

Illustration 24 is the metal product of any preceding or subsequent illustration, wherein the modified liquid metal includes at least 80% of the recycled aluminum.

Illustration 25 is the metal product of any preceding or subsequent illustration, wherein the modified liquid metal comprises a hydrogen content of 0.25 mL/100 grams or less.

Illustration 26 is the metal product of any preceding or subsequent illustration, wherein the recycled aluminum comprises used beverage can scrap comprising a mixture of recycled metal from can ends and can bodies.

Illustration 27 is the metal product of any preceding or subsequent illustration, wherein the metal product comprises a yield strength of at least 100 MPa.

Illustration 28 is the metal product of any preceding or subsequent illustration, wherein the metal product comprises an ultimate tensile strength of at least 210 MPa.

Illustration 29 is the metal product of any preceding or subsequent illustration, wherein the metal product comprises a uniform elongation of at least 18%.

Illustration 30 is the metal product of any preceding or subsequent illustration, wherein the metal product comprises a total elongation of at least 20.5%.

Illustration 31 is the metal product of any preceding or subsequent illustration, wherein the metal product comprises Fe-containing constituents.

Illustration 32 is the metal product of any preceding or subsequent illustration, wherein the Fe-containing constituents have a length ranging from about 0.6 µm to about 1.8 µm.

Illustration 33 is the metal product of any preceding or subsequent illustration, wherein the metal product comprises intermetallic particles having a width to height ratio of about 3 or less.

The following examples will serve to further illustrate the present invention without, however, constituting any limitation thereof. On the contrary, it is to be clearly understood that resort may be had to various embodiments, modifications, and equivalents thereof which, after reading the description herein, may suggest themselves to those skilled in the art without departing from the spirit of the invention.

EXAMPLES

Example 1

Table 4, below, depicts trace elements and alloying elements found in UBC scrap, a first alternative alloy ("UBC 1"), a second alternative alloy ("UBC 2"), a standard 5754 direct chill cast aluminum alloy ("5754DC"), and two 5754 continuously cast aluminum alloys ("5754CC" and "5754CC 1"). The 5754DC aluminum alloy, 5754CC aluminum alloy, and 5754CC 1 aluminum alloy are standard alloys that have not been prepared from mostly recycled scrap, such as UBC scrap, and serve as comparative alloys.

TABLE 4

|  | Cu | Fe | Mg | Mn | Si | Ti | Zn | Cr | Zr |
| --- | --- | --- | --- | --- | --- | --- | --- | --- | --- |
| UBC Scrap | 0.15-0.20 | 0.35-0.40 | 1.2-1.5 | 0.85 | 0.15-0.26 | 0.03 | 0.1 | 0.02 | — |
| UBC 1 | 0.37 | 0.3 | 1.5 | 0.8 | 0.29 | 0.02 | 0.1 | 0.05 | 0.001 |
| UBC 2 | 0.39 | 0.32 | 2.59 | 0.78 | 0.31 | 0.02 | 0.1 | 0.05 | 0.001 |
| 5754DC | 0.1 | 0.19 | 3.09 | 0.25 | 0.059 | 0.02 | 0.01 | 0.007 | 0.001 |
| 5754CC | 0.03 | 0.36 | 2.69 | 0.19 | 0.22 | 0.05 | 0.02 | 0.007 | 0.001 |
| 5754CC 1 | 0.04 | 0.20 | 3.52 | 0.30 | 0.08 | 0.03 | 0.01 | 0.031 | 0.001 |

The values in Table 4 represent approximate weight percentages of the particular elements. UBC 1 alloy is created by adding approximately 0.25 wt. % Cu and approximately 0.15 wt. % Si to UBC scrap, resulting in a composition including approximately 0.37 wt. % Cu and approximately 0.29 wt. % Si. UBC 2 alloy is made similarly to UBC 1, however with the addition of approximately 1.0 wt. % Mg, resulting in a composition including approximately 2.59 wt. % Mg. By comparison, the 5754DC, 5754CC, and 5754CC 1 alloys are shown, which are generally more lean in Fe, Si, and/or Cu in comparison to UBC scrap.

Example 2

Figure 6:
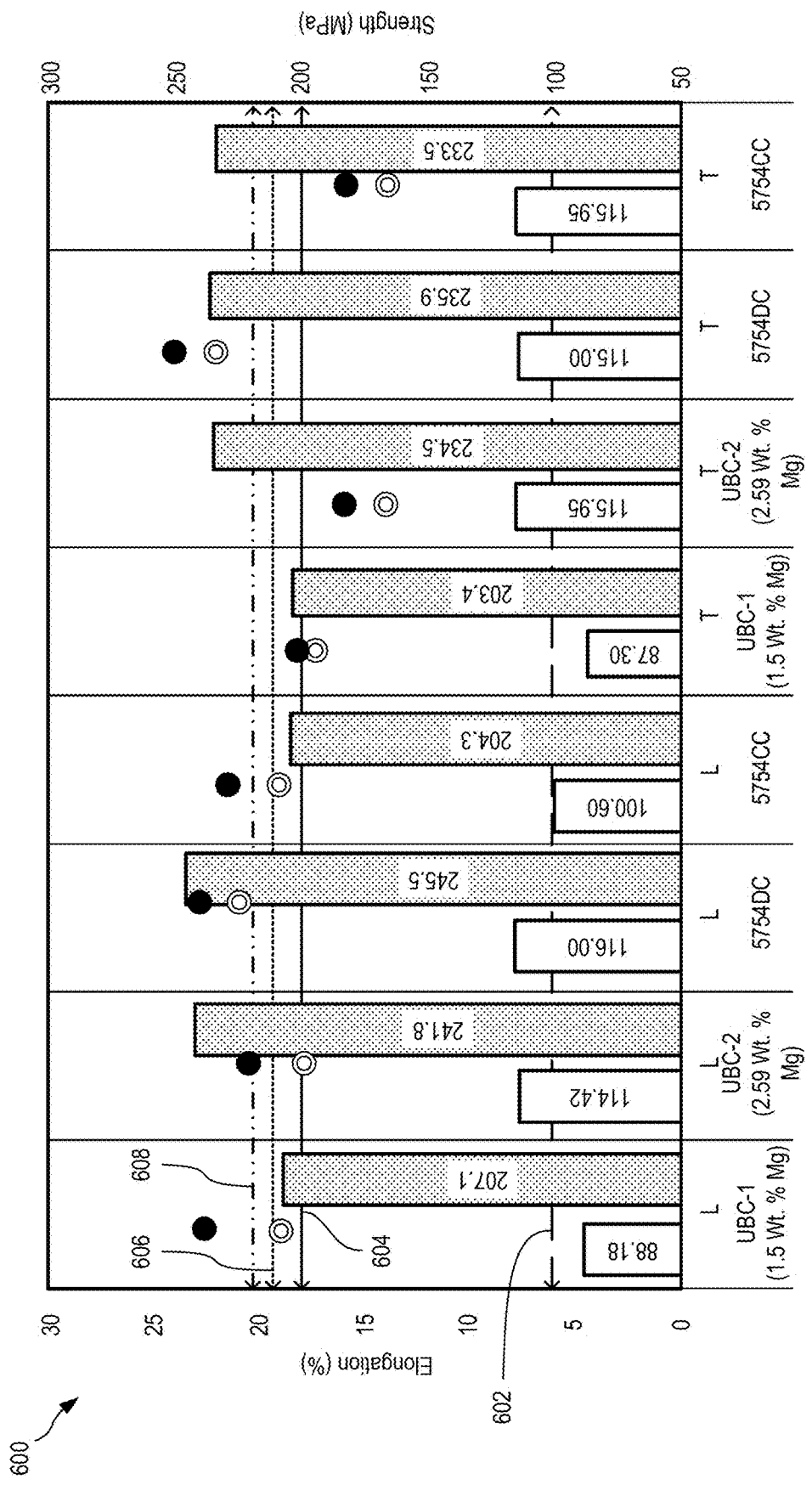
FIG. 6 is a chart depicting the longitudinal and transverse elongation and strength of metal products formed according to certain aspects of the present disclosure.

FIG. 6 is a chart 600 depicting the longitudinal and transverse elongation and strength properties of metal products prepared according to certain aspects of the present disclosure. The chart 600 depicts the longitudinal (referred to as "L" in FIG. 6) and transverse (referred to as "T" in FIG. 6) elongation and strength properties of metal products formed from the UBC 1 alloy, UBC 2 alloy, 5754DC alloy, and 5754CC alloy of Table 4, above. Each of the metal products were hot rolled to an intermediate gauge and then cold rolled to a final gauge, such as seen in process 3 of FIG. 3.

Chart 600 depicts data for UBC 1 alloy cast using a continuous casting device as disclosed herein, UBC 2 alloy cast using a continuous casting device as disclosed herein, a standard 5754DC aluminum alloy cast using direct chill casting in a vertical casting pit, and a 5754CC aluminum alloy cast using a continuous casting device. UBC 1 alloy and UBC 2 alloy both contain approximately 0.29-0.31 wt. % Si and 0.37-0.39 wt. % Cu, with UBC 1 alloy containing approximately 1.5 wt. % Mg and UBC 2 alloy containing approximately 2.59 wt. % Mg. The UBC 1 and UBC 2 samples were successfully cast using a continuous casting device, without cracking or other casting defects.

Additionally, the chart 600 includes horizontal lines depicting various minimum specification limits, such as for a traditional 5754DC alloy. A yield strength specification limit 602 is at approximately 100 MPa, a uniform elongation specification limit 604 is at approximately 18%, an ultimate tensile strength specification limit 606 is at approximately 210 MPa, and the total elongation specification limit 608 is at approximately 20.5%. Other minimum specification limits can be used. In some cases, minimum specification limits within 5%, 6%, 7%, 8%, 9%, 10%, 12%, 15%, 20%, or 30% of the specification limit can be used.

The standard 5754DC alloy achieved a longitudinal yield strength of approximately 116.00 MPa and a transverse yield strength of approximately 115.00 MPa, both above the yield strength specification limit 602, as well as a longitudinal ultimate tensile strength of approximately 245.5 MPa and a transverse ultimate tensile strength of approximately 235.9 MPa, both above the ultimate tensile strength specification limit 606. Additionally, the standard 5754DC alloy achieved a longitudinal uniform elongation of approximately 21% and a transverse uniform elongation of approximately 22%, both above the uniform elongation specification limit 604, as well as a longitudinal total elongation of approximately 23% and a transverse total elongation of approximately 24%, both above the total elongation specification limit 608. These results are to be expected for the standard 5754DC alloy, which was prepared using traditional techniques with the use of substantial amounts of primary aluminum (e.g., using mostly primary aluminum).

The continuously cast 5754CC alloy achieved a longitudinal yield strength of approximately 100.60 MPa and a transverse yield strength of approximately 115.95 MPa, one below and one above the yield strength specification limit 602, as well as a longitudinal ultimate tensile strength of approximately 204.3 MPa and a transverse ultimate tensile strength of approximately 233.5 MPa, one below and one above the ultimate tensile strength specification limit 606. Additionally, the continuously cast 5754CC alloy achieved a longitudinal uniform elongation of approximately 19% and a transverse uniform elongation of approximately 14%, one above and one below the uniform elongation specification limit 604, as well as a longitudinal total elongation of approximately 22% and a transverse total elongation of approximately 15%, one above and one below the total elongation specification limit 608. These results show that longitudinal and transverse specification limits are difficult to achieve through continuous casting, even with a 5754CC alloy.

The continuously cast UBC 1 alloy achieved a longitudinal yield strength of approximately 88.18 MPa and a transverse yield strength of approximately 87.30 MPa, both below the yield strength specification limit 602, as well as a longitudinal ultimate tensile strength of approximately 207.1 MPa and a transverse ultimate tensile strength of approximately 203.4 MPa, both below the ultimate tensile strength specification limit 606. Additionally, the continuously cast UBC 1 alloy achieved a longitudinal uniform elongation of approximately 19% and a transverse uniform elongation of approximately 17%, one above and one below the uniform elongation specification limit 604, as well as a longitudinal total elongation of approximately 23% and a transverse total elongation of approximately 18%, one above and one below the total elongation specification limit 608. These results show that with minimal or no additional magnesium added to UBC scrap, specification limits are difficult to achieve, even if casting was accomplished without substantial casting defects.

The continuously cast UBC 2 alloy achieved a longitudinal yield strength of approximately 114.42 MPa and a transverse yield strength of approximately 115.95 MPa, both well above the yield strength specification limit 602, as well as a longitudinal ultimate tensile strength of approximately 241.8 MPa and a transverse ultimate tensile strength of approximately 234.5 MPa, both well above the ultimate tensile strength specification limit 606. Additionally, the continuously cast UBC 2 alloy achieved a longitudinal uniform elongation of approximately 18% and a transverse uniform elongation of approximately 14%, both at or above the uniform elongation specification limit 604, as well as a longitudinal total elongation of approximately 21% and a transverse total elongation of approximately 15%, one above and one below the total elongation specification limit 608. These results show that with the addition of magnesium to UBC scrap, specification limits can be achieved when the alloy is cast using continuous casting techniques.

Example 3

FIGS. 7-12 depict various measurements obtained through testing three sets of metal product continuously cast using a UBC-based alloy, UBC 1 identified in Table 4, having 1.5 wt. % Mg according to certain aspects of the present disclosure. Each set of metal products was prepared using the same continuous casting process (e.g., continuous casting system 402 of FIG. 4) and then rolled through cold rolling only (e.g., as seen in process 200 of FIG. 2), hot rolling only (as seen in process 100 of FIG. 1), and a combination of cold and hot rolling (e.g., as seen in FIG. 3). For ease of interpretation, the three rolling techniques can be identified as cold rolling only, hot rolling only, and hot rolling and cold rolling. As used herein, the term "cold rolling only" can refer to cold rolling without any or a substantial amount of hot rolling occurring, although other processing may take place. As used herein, the term "hot rolling only" can refer to hot rolling without any or a substantial amount of cold rolling occurring, although other processing may take place. The tensile tests were performed according to ASTM B557 2" GL tensile tests.

The traditional rolling route, including cold and hot rolling, is generally complex and involves substantial equipment and resources. The cold rolling only and hot rolling only routes can be desirable and more economical, using simpler and/or less equipment and resources. It can be desirable to prepare metal products by casting UBC-based alloys and performing hot rolling without cold rolling or cold rolling without hot rolling.

As seen in FIGS. 7-12, the continuously cast UBC 1 alloy identified in Table 4 performed well in strength and formability after being hot and cold rolled, but moderately in strength and formability after hot rolling only or cold rolling only.

Figure 7:
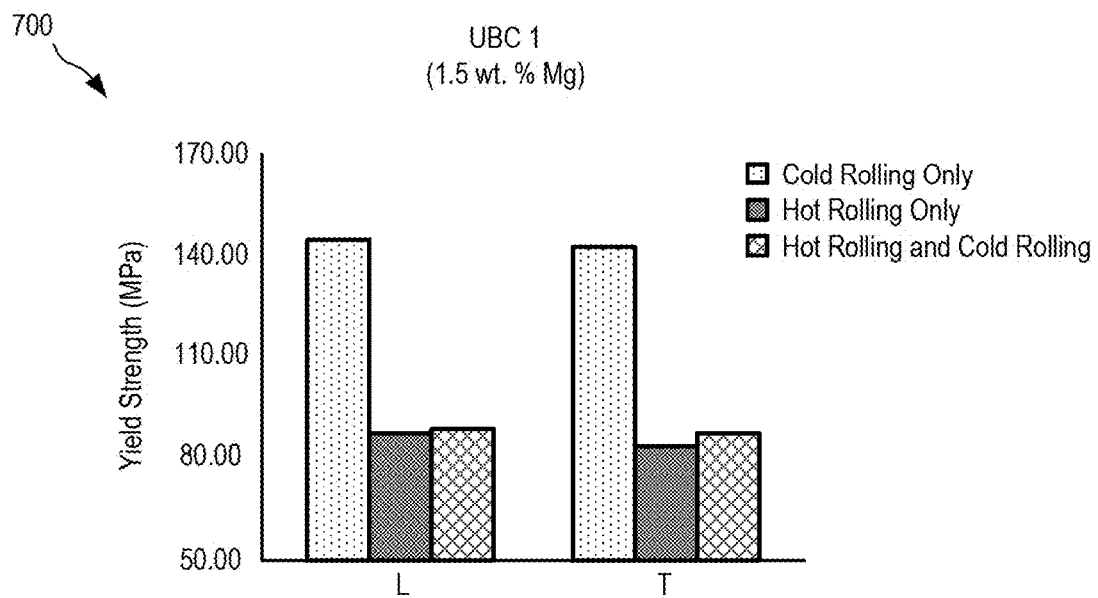
FIG. 7 is a chart depicting the yield strength for metal product samples prepared using a UBC-based alloy having 1.5 wt. % Mg according to certain aspects of the present disclosure.

FIG. 7 is a chart 700 depicting yield strength for metal product samples continuously cast using UBC 1. The chart 700 depicts longitudinal (L) and transverse (T) yield strength in megapascals (MPa) for three metal product samples continuously cast using the UBC 1 alloy identified in Table 4. Each sample went through one of three different rolling techniques, including cold rolling (e.g., as seen in process 200 of FIG. 2), hot rolling (as seen in process 100 of FIG. 1), and a combination of cold and hot rolling (e.g., as seen in FIG. 3).

High yield strengths were seen in the cold rolled only samples, with moderate yield strength seen in the hot rolled and hot and cold rolled samples.

Figure 8:
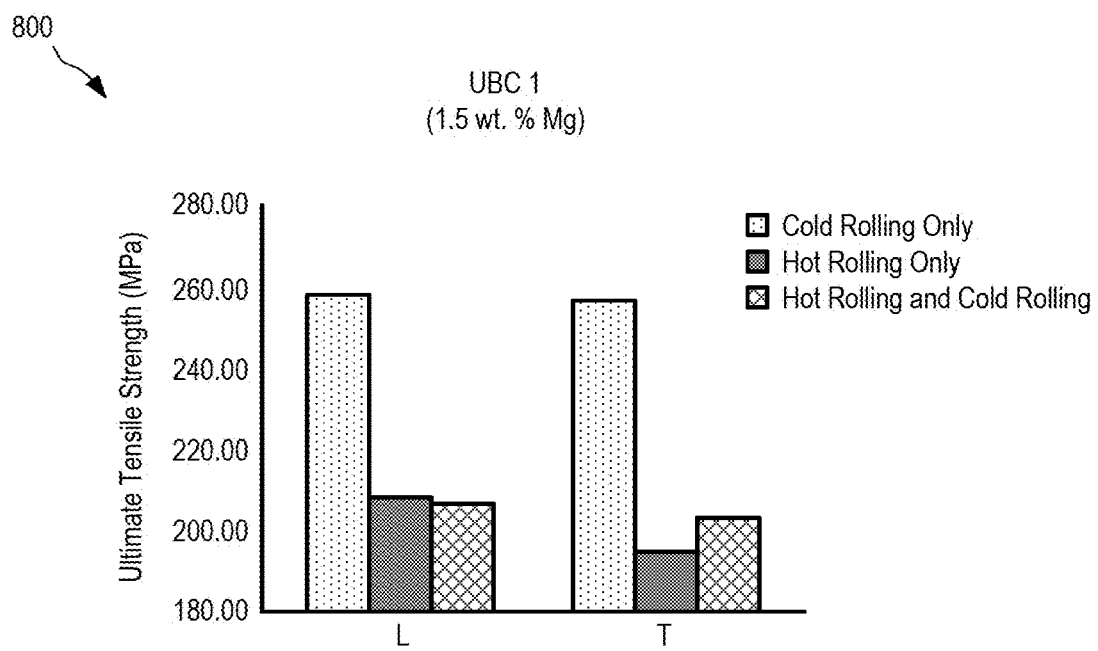
FIG. 8 is a chart 800 depicting the ultimate tensile strength for metal product samples prepared using a UBC-based alloy having 1.5 wt. % Mg according to certain aspects of the present disclosure.

FIG. 8 is a chart 800 depicting ultimate tensile strength for metal product samples continuously cast using UBC 1. The chart 800 depicts longitudinal (L) and transverse (T) ultimate tensile strength in megapascals (MPa) for three metal product samples continuously cast using the UBC 1 alloy identified in Table 4. Each sample went through one of three different rolling techniques, including cold rolling (e.g., as seen in process 200 of FIG. 2), hot rolling (as seen in process 100 of FIG. 1), and a combination of cold and hot rolling (e.g., as seen in FIG. 3).

High ultimate tensile strengths were seen in the cold rolled only samples, with moderate ultimate tensile strengths seen in the hot rolled and hot and cold rolled samples.

Figure 9:
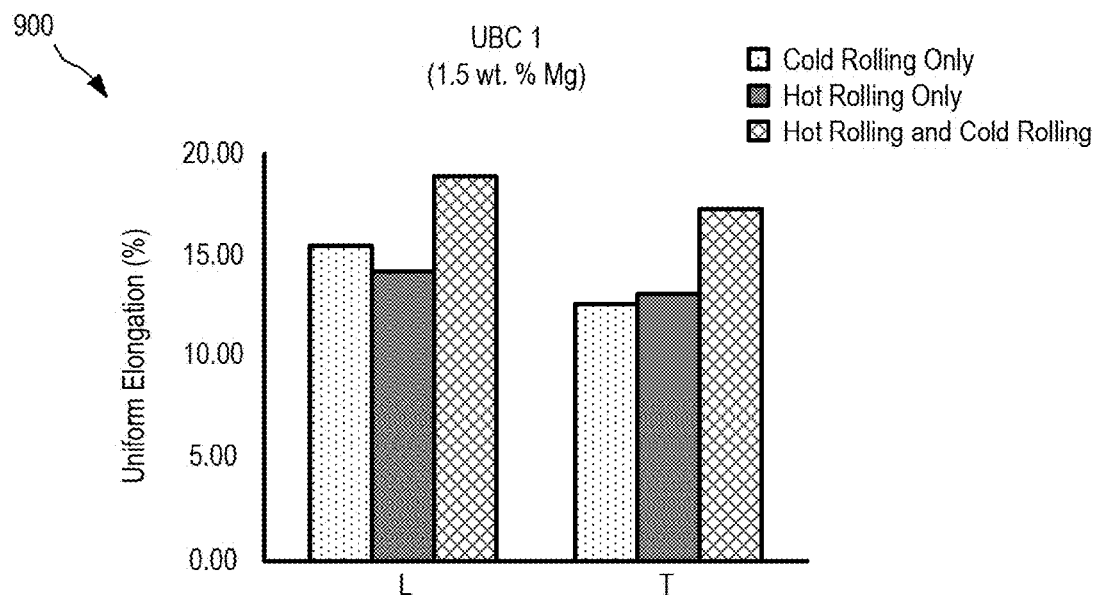
FIG. 9 is a chart depicting the uniform elongation for metal product samples prepared using a UBC-based alloy having 1.5 wt. % Mg according to certain aspects of the present disclosure.

FIG. 9 is a chart 900 depicting uniform elongation for metal product samples continuously cast using UBC 1. The chart 900 depicts longitudinal (L) and transverse (T) uniform elongation in percent elongation for three metal product samples continuously cast using the UBC 1 alloy identified in Table 4. Each sample went through one of three different rolling techniques, including cold rolling (e.g., as seen in process 200 of FIG. 2), hot rolling (as seen in process 100 of FIG. 1), and a combination of cold and hot rolling (e.g., as seen in FIG. 3).

High uniform elongations were seen in all three of the cold rolled samples, hot rolled samples, and hot and cold rolled samples.

Figure 10:
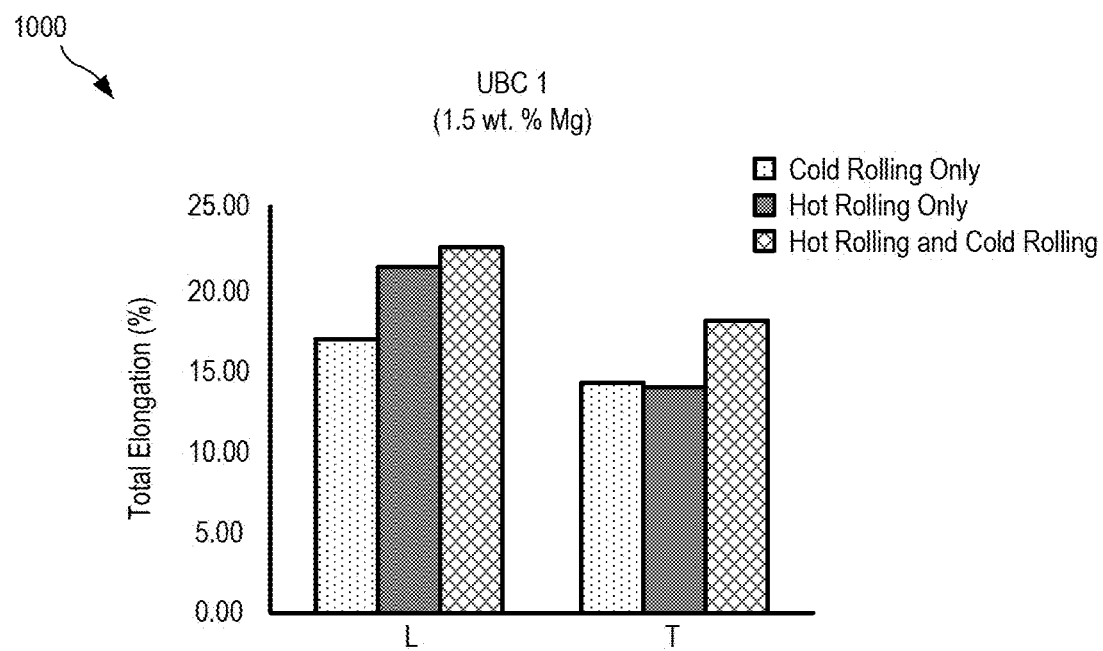
FIG. 10 is a chart depicting the total elongation for metal product samples prepared using a UBC-based alloy having 1.5 wt. % Mg according to certain aspects of the present disclosure.

FIG. 10 is a chart 1000 depicting total elongation for metal product samples continuously cast using UBC 1. The chart 1000 depicts longitudinal (L) and transverse (T) total elongations in percent elongation for three metal product samples continuously cast using the UBC 1 alloy identified in Table 4. Each sample went through one of three different rolling techniques, including cold rolling (e.g., as seen in process 200 of FIG. 2), hot rolling (as seen in process 100 of FIG. 1), and a combination of cold and hot rolling (e.g., as seen in FIG. 3).

High total elongations were seen in all three of the cold rolled samples, hot rolled samples, and hot and cold rolled samples.

Figure 11:
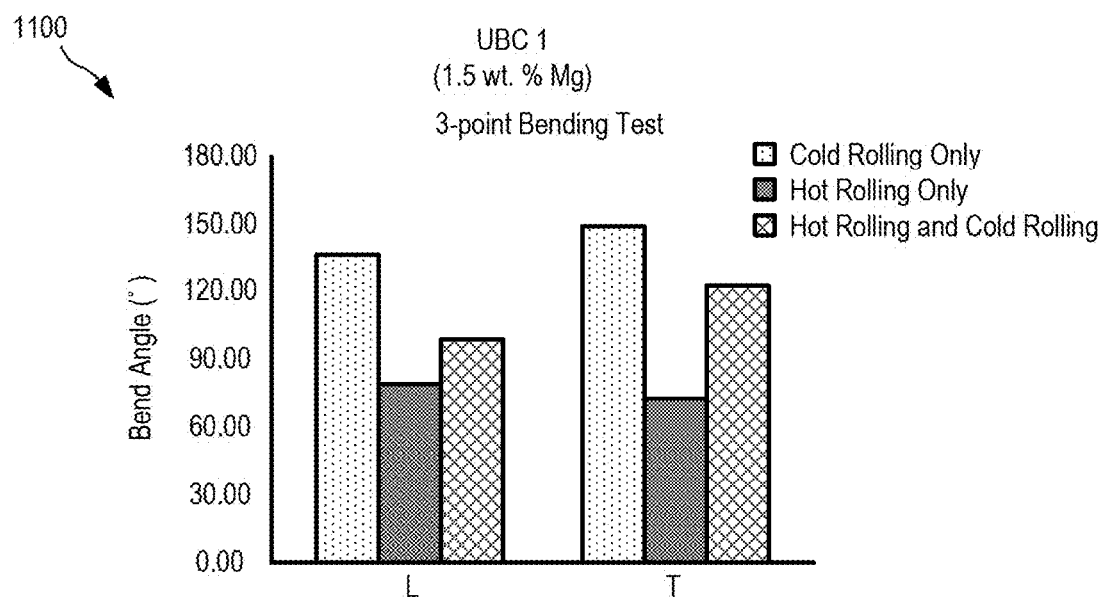
FIG. 11 is a chart depicting 3-point bending test results (internal bend angle β) for metal product samples prepared using a UBC-based alloy having 1.5 wt. % Mg according to certain aspects of the present disclosure.
Figure 29:
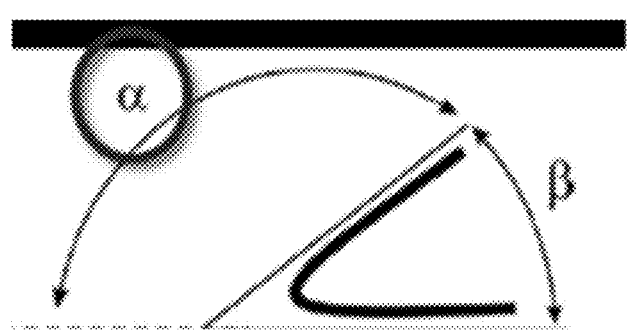
FIG. 29 is a schematic depicting 3-point bend test methods, including internal bend angle β and external bend angle α, according to certain aspects of the present disclosure.

FIG. 11 is a chart 1100 depicting 3-point bending test results (internal bend angle β according to the VDA 238-100 Tight Radius Bending Test (see FIG. 29)) for metal product samples continuously cast using UBC 1. The samples tested in the 3-point bending test were tested after 10% pre-strain. The chart 1100 depicts longitudinal (L) and transverse (T) 3-point bending test results in degrees of bend angle (°) for three metal product samples continuously cast using the UBC 1 alloy identified in Table 4. Each sample went through one of three different rolling techniques, including cold rolling (e.g., as seen in process 200 of FIG. 2), hot rolling (as seen in process 100 of FIG. 1), and a combination of cold and hot rolling (e.g., as seen in FIG. 3).

High bendability in a 3-point bend test were seen in all three of the cold rolled samples, hot rolled samples, and hot and cold rolled samples, with the cold rolled samples showing the highest internal bend angle (β-angle) indicating the lowest bendability (i.e., formability) of the UBC-based aluminum alloys processed according to process 100 of FIG. 1, process 200 of FIG. 2, and process 300 of FIG. 3. The hot rolled samples processed according to process 100 of FIG. 1 exhibited the lowest internal bend angle (β-angle), indicating the greatest bendability provided by the three process routes.

Figure 12:
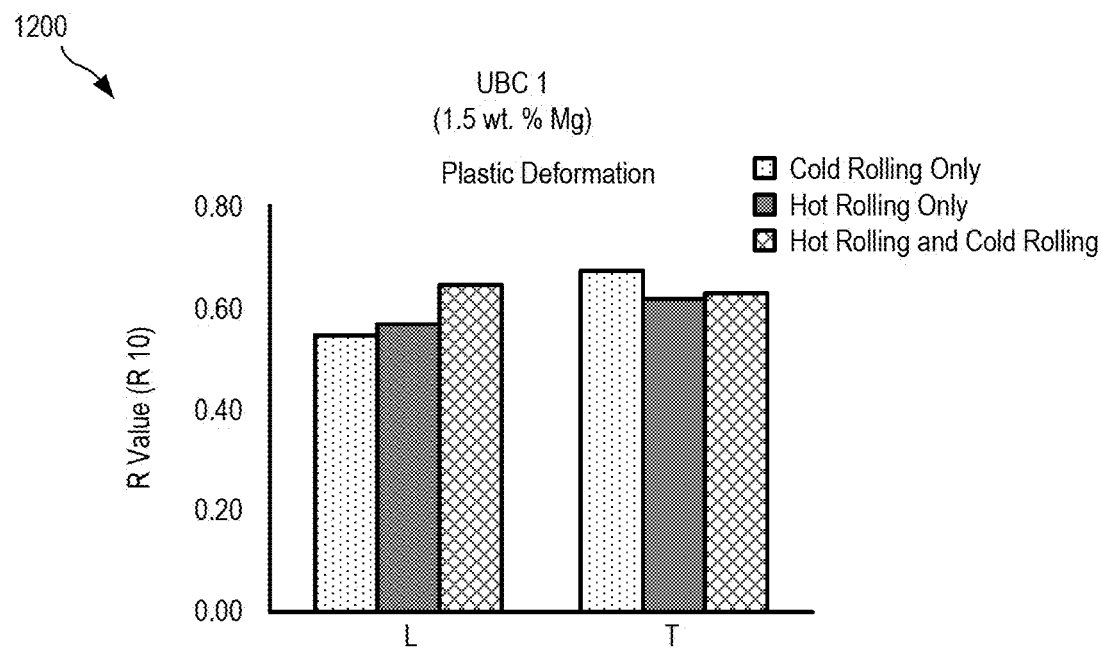
FIG. 12 is a chart depicting plastic deformation test results for metal product samples prepared using a UBC-based alloy having 1.5 wt. % Mg according to certain aspects of the present disclosure.

FIG. 12 is a chart 1200 depicting plastic deformation test results for metal product samples continuously cast using UBC 1. The plastic deformation test results are indicated in terms of an R value (e.g., Lankford coefficient) equal to the true width strain divided by the true thickness strain. A higher R value can be desirable, at least for the applications mentioned herein, as it indicates more resistance to thinning during elongation. The R value can be calculated pursuant to an "R10" test, wherein the R value is determined at 10% strain. The chart 1200 depicts longitudinal (L) and transverse (T) R values for three metal product samples continuously cast using the UBC 1 alloy identified in Table 4. Each sample went through one of three different rolling techniques, including cold rolling (e.g., as seen in process 200 of FIG. 2), hot rolling (as seen in process 120 of FIG. 1), and a combination of cold and hot rolling (e.g., as seen in FIG. 3).

High R values in a plastic deformation test were seen mostly in the hot and cold rolled samples, with slightly lower R values in the hot rolled and cold rolled samples.

Figure 13:
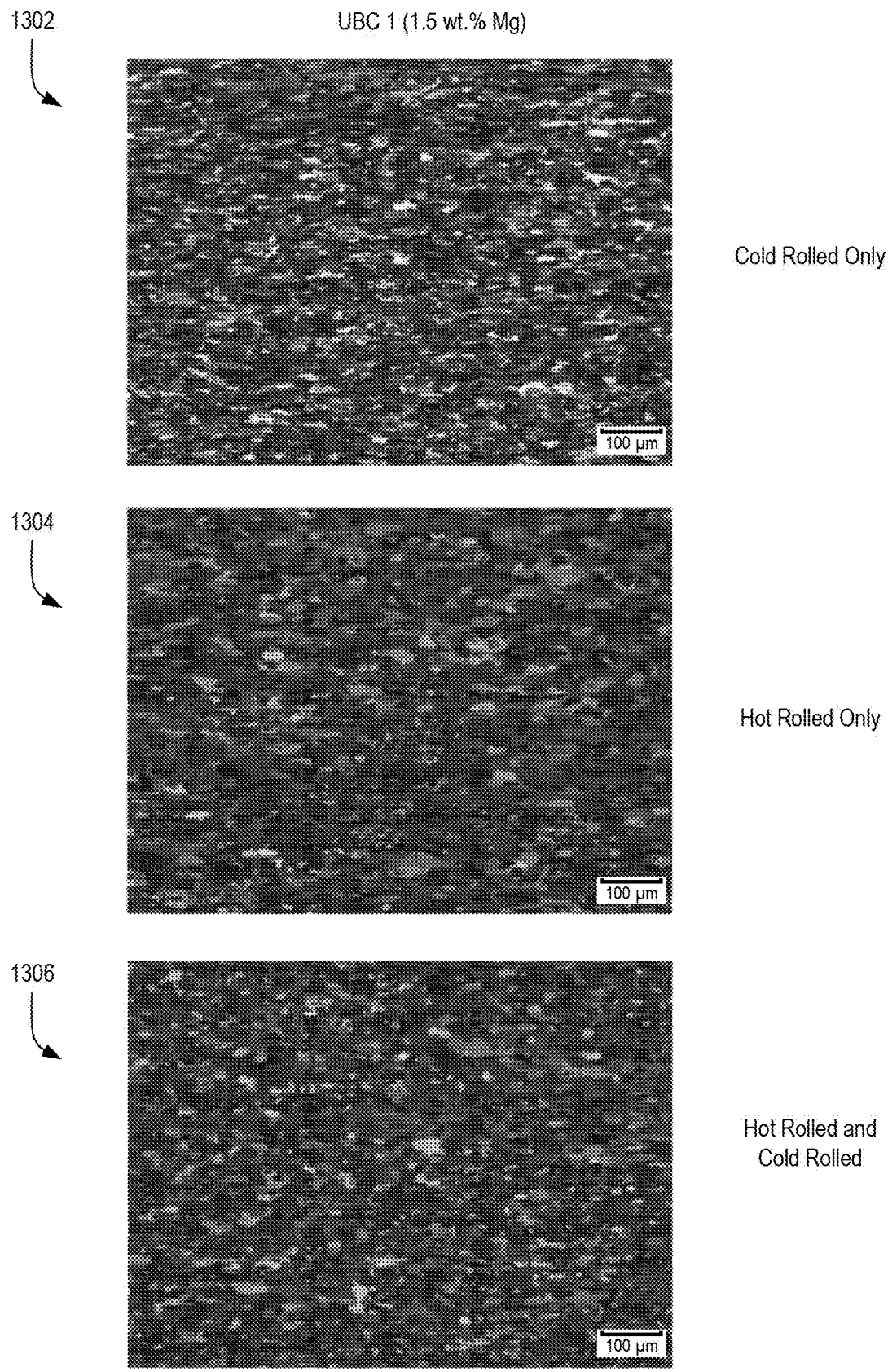
FIG. 13 depicts a set of micrographs for metal product samples prepared using a UBC-based alloy having 1.5 wt. % Mg according to certain aspects of the present disclosure.

FIG. 13 depicts a set of micrographs 1302, 1304, 1306 for metal product samples continuously cast using UBC 1. Micrographs 1302, 1304, 1306 are taken of metal samples made from continuously cast UBC 1 alloy from Table 4. Micrograph 1302 was taken of a metal product that was cold rolled only and annealed to an O-temper, depicting somewhat large and elongated grains. Micrograph 1304 was taken of a metal product that was hot rolled only and annealed to an O-temper, depicting somewhat large grains. Micrograph 1306 was taken of a metal product that was hot rolled and cold rolled and annealed to an O-temper, depicting somewhat large grains.

Example 4

FIGS. 14-19 depict various measurements obtained through testing three sets of metal product continuously cast using a UBC-based alloy having 2.59 wt. % Mg according to certain aspects of the present disclosure. Each set of metal products was prepared similarly to those prepared with reference to FIGS. 7-13, however using the UBC 2 alloy of Table 4. The tensile tests were performed according to ASTM B5513 2" GL tensile tests.

As seen in FIGS. 14-19, the continuously cast UBC 2 alloy performed approximately just as well after being hot rolled only as in being hot and cold rolled. Thus, the UBC-based alloy with added magnesium can be used to continuously cast metal product that achieves desired performance after hot rolling without the need to cold roll the metal product.

Figure 14:
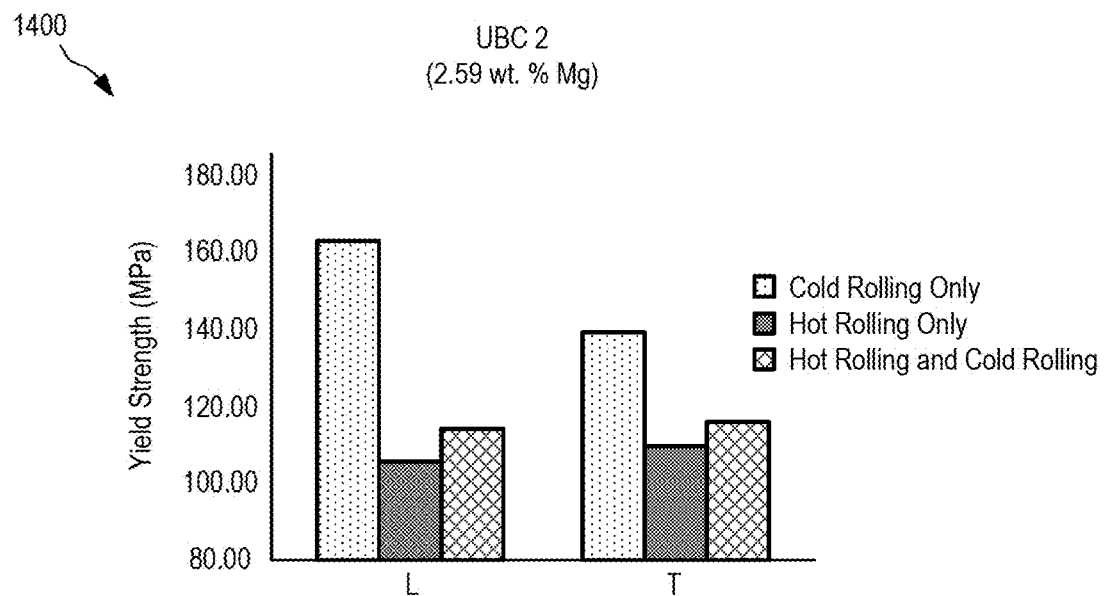
FIG. 14 is a chart depicting the yield strength for metal product samples prepared using a UBC-based alloy having 2.59 wt. % Mg according to certain aspects of the present disclosure.

FIG. 14 is a chart 1400 depicting yield strength for metal product samples continuously cast using a UBC-based alloy having 2.59 wt. % Mg according to certain aspects of the present disclosure. The chart 1400 depicts longitudinal (L) and transverse (T) yield strengths in megapascals (MPa) for three metal product samples continuously cast using the UBC 2 alloy identified in Table 4. Each sample went through one of three different rolling techniques, including cold rolling (e.g., as seen in process 200 of FIG. 2), hot rolling (as seen in process 100 of FIG. 1), and a combination of cold and hot rolling (e.g., as seen in FIG. 3).

A very high yield strength was seen in the cold rolled only samples; however, the hot rolled and hot and cold rolled samples showed more than adequate yield strengths. Interestingly, the hot rolled only sample achieved a substantially similar yield strength to the hot and cold rolled sample.

Figure 15:
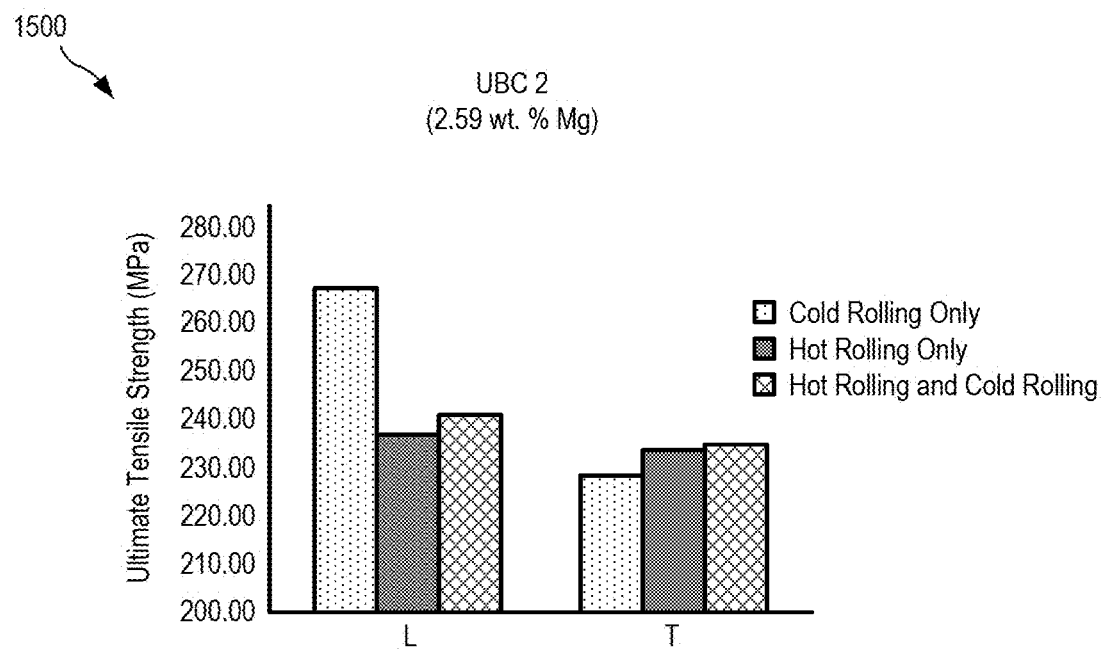
FIG. 15 is a chart depicting the ultimate tensile strength for metal product samples prepared using a UBC-based alloy having 2.59 wt. % Mg according to certain aspects of the present disclosure.

FIG. 15 is a chart 1500 depicting the ultimate tensile strength for metal product samples continuously cast using a UBC-based alloy having 2.59 wt. % Mg according to certain aspects of the present disclosure. The chart 1500 depicts longitudinal (L) and transverse (T) ultimate tensile strength in megapascals (MPa) for three metal product samples continuously cast using the UBC 2 alloy identified in Table 4. Each sample went through one of three different rolling techniques, including cold rolling (e.g., as seen in process 200 of FIG. 2), hot rolling (as seen in process 100 of FIG. 1), and a combination of cold and hot rolling (e.g., as seen in FIG. 3).

A very high ultimate tensile strength was seen in the cold rolled only sample, with more than adequate ultimate tensile strength seen in the hot rolled and hot and cold rolled samples. Interestingly, the hot rolled only sample achieved a substantially similar ultimate tensile strength to the hot and cold rolled sample.

Figure 16:
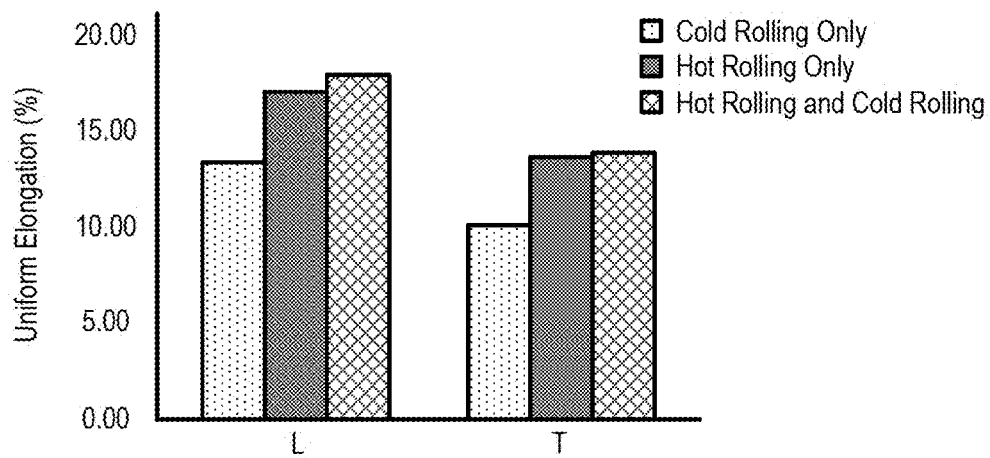
FIG. 16 is a chart depicting the uniform elongation for metal product samples prepared using a UBC-based alloy having 2.59 wt. % Mg according to certain aspects of the present disclosure.

FIG. 16 is a chart 1600 depicting uniform elongation for metal product samples continuously cast using a UBC-based alloy having 2.59 wt. % Mg according to certain aspects of the present disclosure. The chart 1600 depicts longitudinal (L) and transverse (T) uniform elongation in percent elongation for three metal product samples continuously cast using the UBC 2 alloy identified in Table 4. Each sample went through one of three different rolling techniques, including cold rolling (e.g., as seen in process 200 of FIG. 2), hot rolling (as seen in process 100 of FIG. 1), and a combination of cold and hot rolling (e.g., as seen in FIG. 3).

High uniform elongations were seen in all three of the cold rolled samples, hot rolled samples, and hot and cold rolled samples. Interestingly, the hot rolled only sample achieved a substantially similar uniform elongation to the hot and cold rolled sample.

Figure 17:
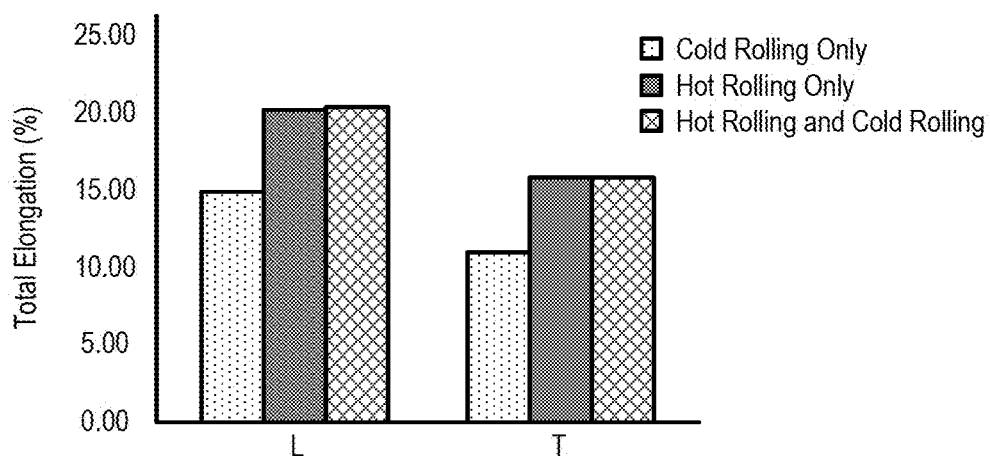
FIG. 17 is a chart depicting the total elongation for metal product samples prepared using a UBC-based alloy having 2.59 wt. % Mg according to certain aspects of the present disclosure.

FIG. 17 is a chart 1700 depicting the total elongation for metal product samples continuously cast using a UBC-based alloy having 2.59 wt. % Mg according to certain aspects of the present disclosure. The chart 1700 depicts longitudinal (L) and transverse (T) total elongation in percent elongation for three metal product samples continuously cast using the UBC 2 alloy identified in Table 4. Each sample went through one of three different rolling techniques, including cold rolling (e.g., as seen in process 200 of FIG. 2), hot rolling (as seen in process 100 of FIG. 1), and a combination of cold and hot rolling (e.g., as seen in FIG. 3).

High total elongations were seen in all three of the cold rolled, hot rolled, and hot and cold rolled samples. Interestingly, the hot rolled only sample achieved a substantially similar total elongation to the hot and cold rolled sample.

Figure 18:
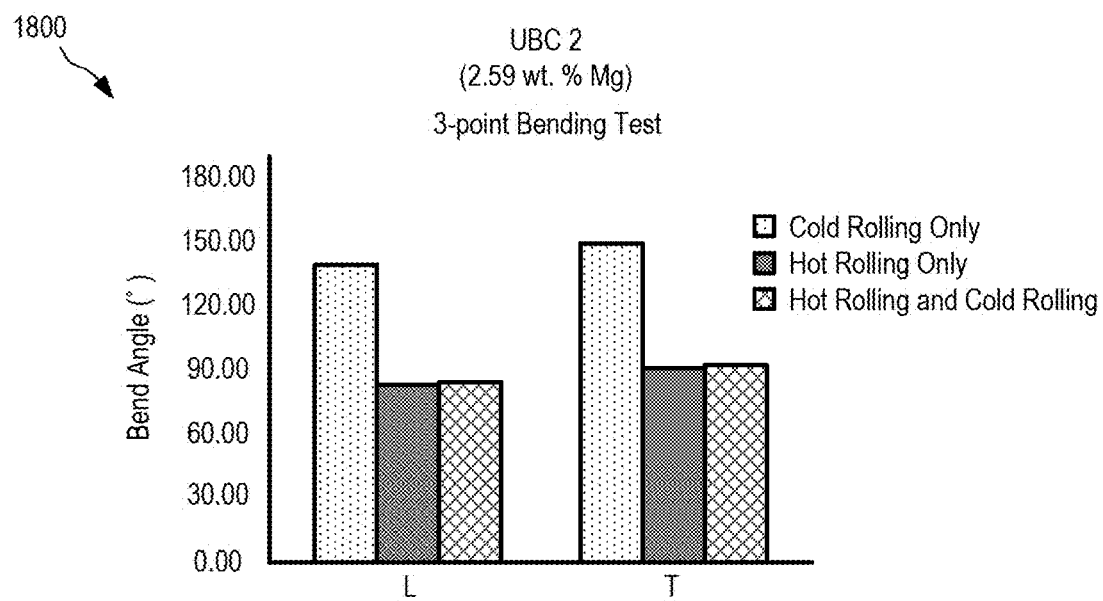
FIG. 18 is a chart depicting 3-point bending test results (internal bend angle β) for metal product samples prepared using a UBC-based alloy having 2.59 wt. % Mg according to certain aspects of the present disclosure.

FIG. 18 is a chart 1800 depicting 3-point bending test results (internal bend angle β) for metal product samples continuously cast using a UBC-based alloy having 2.59 wt. % Mg according to certain aspects of the present disclosure. The samples tested in the 3-point bending test were tested after 10% pre-strain. The chart 1800 depicts longitudinal (L) and transverse (T) 3-point bending test results in degrees of bend angle (°) for three metal product samples continuously cast using the UBC 2 alloy identified in Table 4. Each sample went through one of three different rolling techniques, including cold rolling (e.g., as seen in process 200 of FIG. 2), hot rolling (as seen in process 100 of FIG. 1), and a combination of cold and hot rolling (e.g., as seen in FIG. 3).

Very high internal bend angle (β-angle) in a 3-point bend test was seen the cold rolled only sample; however, the hot rolled only and hot and cold rolled samples exhibited lower internal bend angles (β-angles), indicating more than adequate bendability. Interestingly, the hot rolled only samples achieved substantially similar bendability to the hot and cold rolled samples.

Figure 19:
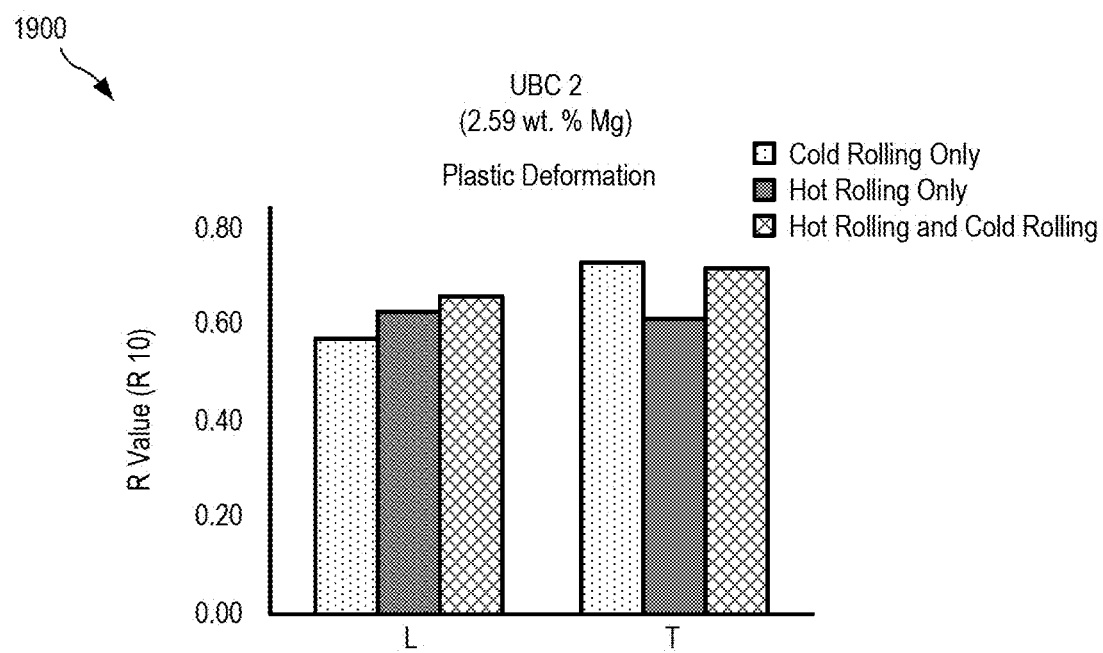
FIG. 19 is a chart depicting plastic deformation test results for metal product samples prepared using a UBC-based alloy having 2.59 wt. % Mg according to certain aspects of the present disclosure.

FIG. 19 is a chart 1900 depicting plastic deformation test results for metal product samples continuously cast using a UBC-based alloy having 2.59 wt. % Mg according to certain aspects of the present disclosure. The plastic deformation test results are indicated in terms of an R value equal to the true width strain divided by the true thickness strain. A higher R value can be desirable, at least for the applications mentioned herein, as it indicates more resistance to thinning during elongation. The chart 1900 depicts longitudinal (L) and transverse (T) R values for three metal product samples continuously cast using the UBC 2 alloy identified in Table 4. Each sample went through one of three different rolling techniques, including cold rolling (e.g., as seen in process 200 of FIG. 2), hot rolling (as seen in process 100 of FIG. 1), and a combination of cold and hot rolling (e.g., as seen in FIG. 3).

High R values in a plastic deformation test were seen in all of the cold rolled, hot rolled, and hot and cold rolled samples. Interestingly, the hot rolled only sample achieved substantially similar resistance to plastic deformation to the hot and cold rolled sample.

Figure 20:
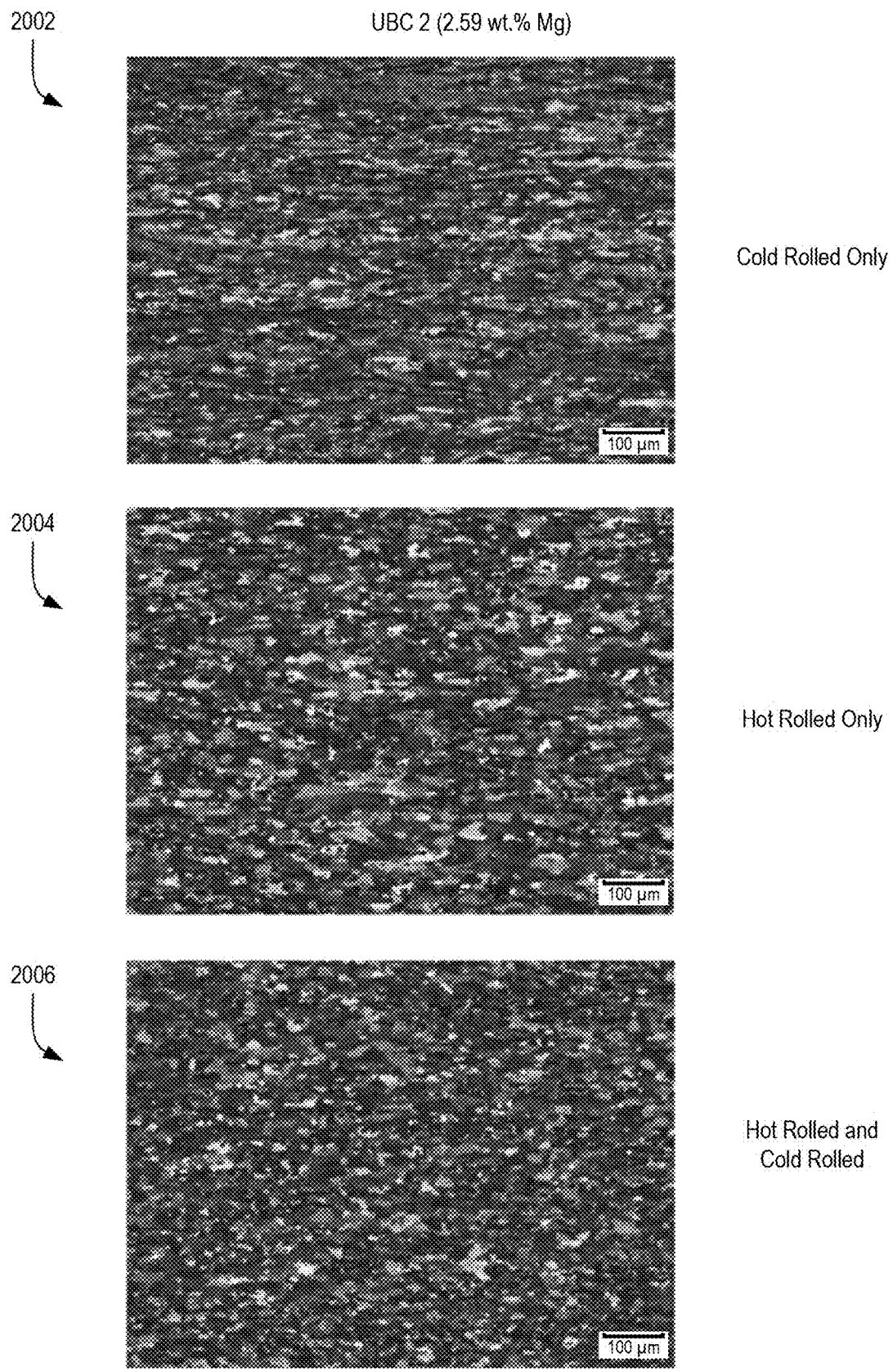
FIG. 20 depicts a set of micrographs for metal product samples prepared using a UBC-based alloy having 2.59 wt. % Mg according to certain aspects of the present disclosure.

FIG. 20 depicts a set of micrographs 2002, 2004, 2006 for metal product samples continuously cast using a UBC-based alloy having 2.59 wt. % Mg according to certain aspects of the present disclosure. Micrographs 2002, 2004, 2006 were taken of metal samples made from continuously cast UBC 2 alloy from Table 4. Micrograph 2002, showing a metal product that was cold rolled only and annealed to an O-temper, depicted smaller grains, at least as compared to the micrograph 1302 of UBC 1 as seen in FIG. 13, with the elongated characteristics of cold rolling. Micrograph 2004, taken of a metal product that was hot rolled only and annealed to an O-temper, depicted relatively small grains, at least as compared to the micrograph 1304 of UBC 1 as seen in FIG. 13. Micrograph 2006, taken of a metal product that was hot rolled and cold rolled and annealed to an O-temper, depicted relatively small grains, at least as compared to the micrograph 1306 of UBC 1 as seen in FIG. 13. The grain structure of the hot rolled and hot and cold rolled samples, as seen in micrograph 2004 and micrograph 2006, respectively, is finer and can be more desirable than the grain structure of the cold rolled only sample depicted in micrograph 2002. Interestingly, the hot rolled only sample achieved substantially similar grain structure to the hot and cold rolled sample.

Small grain size can be desirable, at least for the applications noted herein. The smaller grains of the metal products continuously cast from the UBC-based alloy with the addition of further alloying elements (e.g., Mg) demonstrate how a desirable metal product can be cast from a UBC-based alloy with little or no additional primary aluminum.

Example 5

Figure 21:
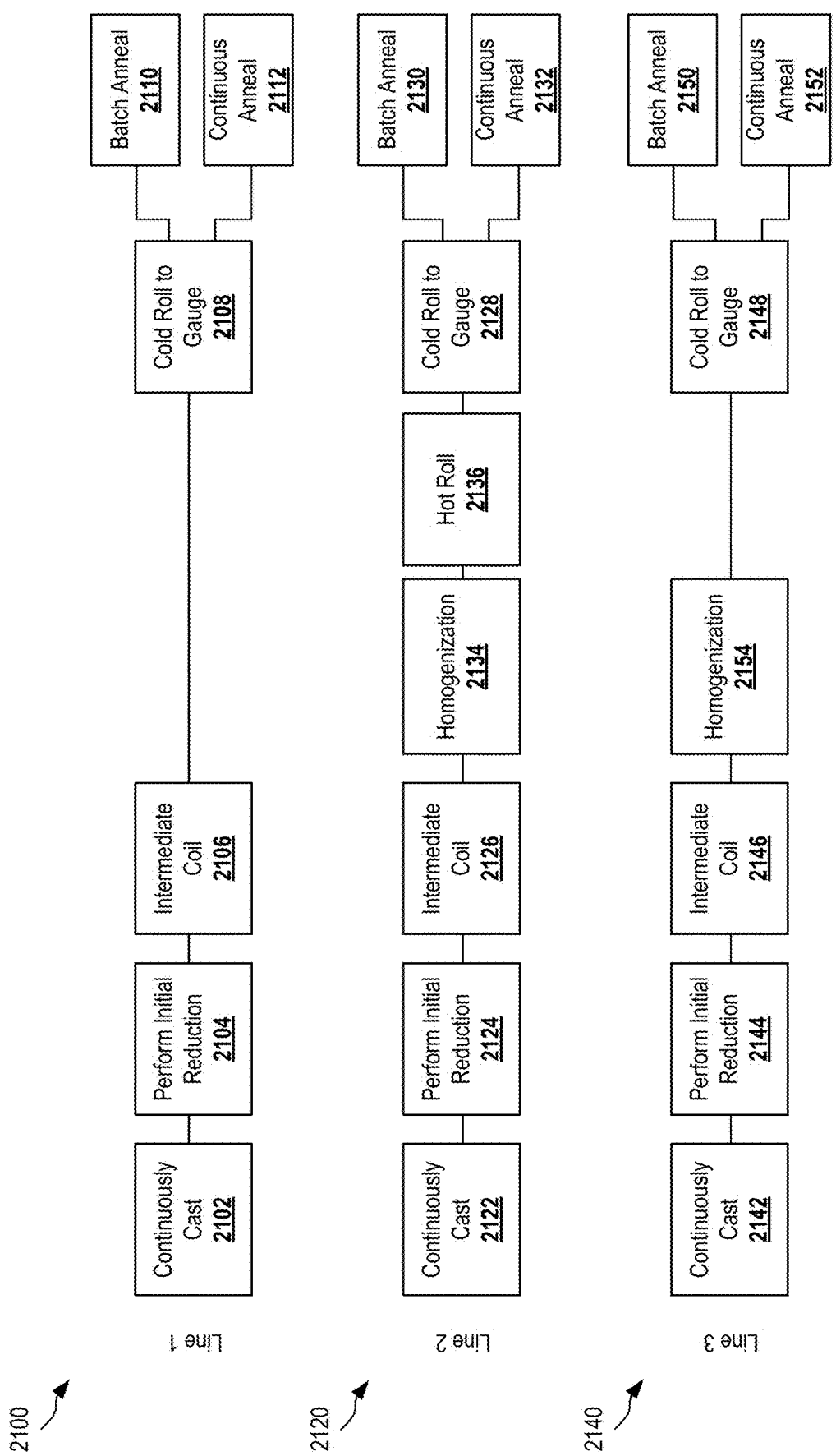
FIG. 21 is a set of flowcharts depicting processes for preparing and producing UBC-based aluminum alloys according to certain aspects of the present disclosure.

FIG. 21 is a schematic diagram depicting a set of different processes for continuously casting and rolling metal product according to certain aspects of the present disclosure. Process Line 1 2100 includes casting and hot rolling the metal product, with coil cooling and cold rolling, and without homogenization. Process Line 2 2120 includes casting and hot rolling the metal product, with quenching, homogenization, additional hot rolling, quenching, and cold rolling. Process Line 3 2140 includes casting and hot rolling the metal product, with quenching, homogenization, quenching, and cold rolling.

Figure 22:
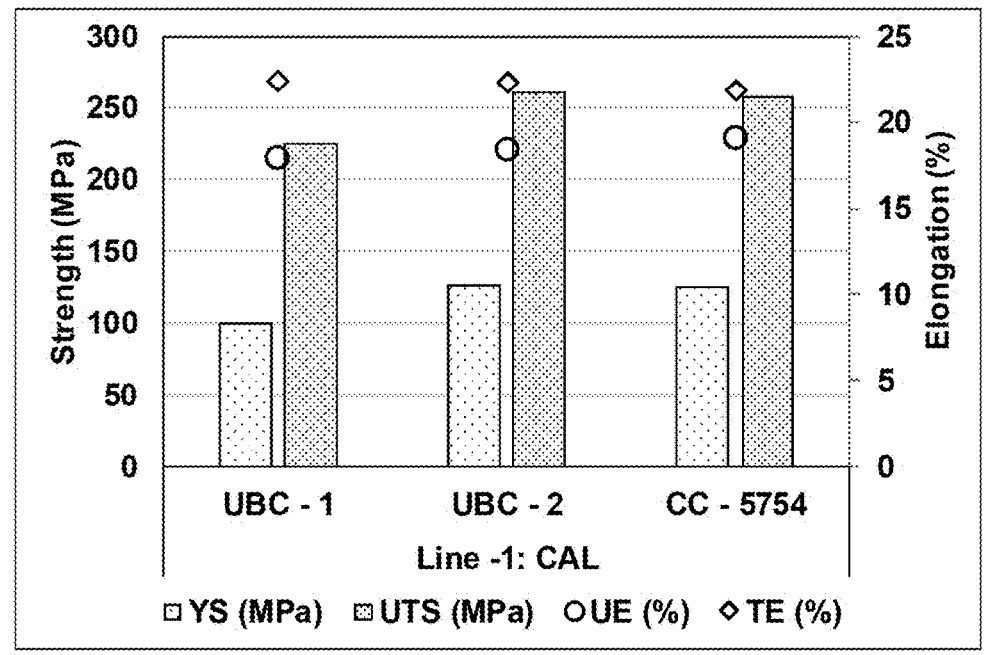
FIG. 22 is a chart depicting the yield strength, ultimate tensile strength, uniform elongation, and total elongation for metal product samples prepared using UBC-based alloys according to certain aspects of the present disclosure.
Figure 23:
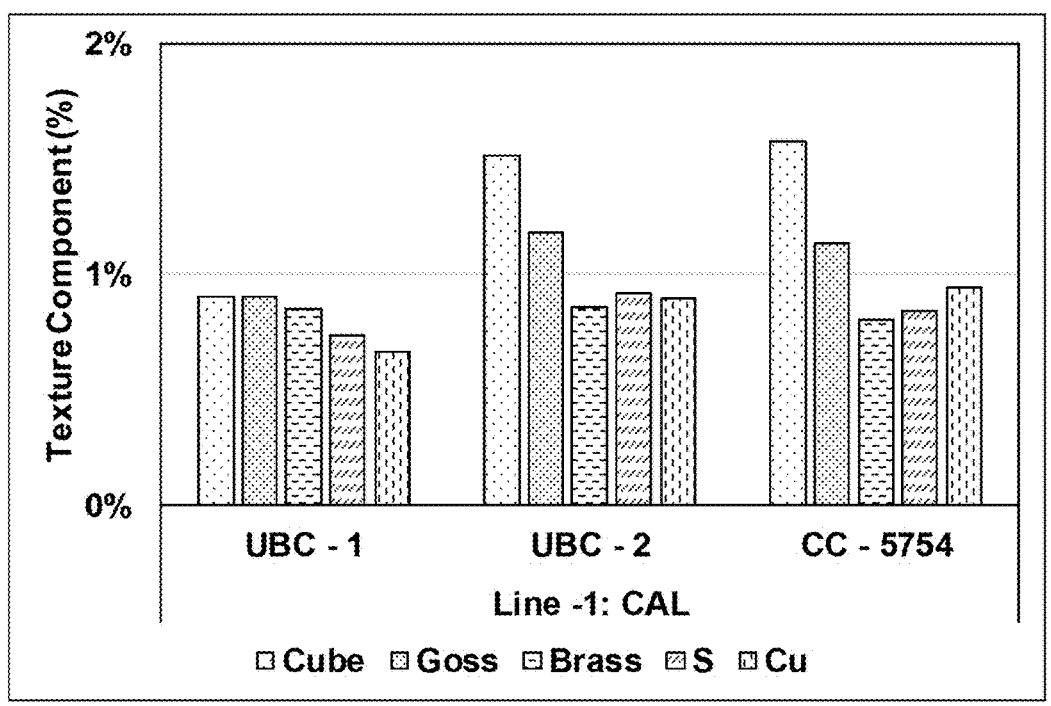
FIG. 23 is a chart depicting the texture component content for metal product samples prepared using UBC-based alloys according to certain aspects of the present disclosure.

UBC-based alloys including UBC 1 and UBC 2, along with 5754CC 1 (see Table 4), were prepared and processed according to Process Line 1 2100. Additionally, each alloy was further subjected to continuous annealing ("CAL") by heating to a temperature of 520° C. at a rate of 500° C./s without soaking (i.e., the alloys were not held at this temperature). FIG. 22 is a chart 2200 depicting the mechanical properties of the UBC 1, UBC 2, and 5754CC 1 alloys. UBC 1 achieved about a 20% lower yield strength ("YS"), a 15% lower ultimate tensile strength ("UTS"), a 2% lower uniform elongation ("UE"), and a similar total elongation ("TE") when compared to the 5754CC 1 alloy. UBC 2 achieved mechanical properties similar to the 5754CC 1 alloy. FIG. 23 is a chart 2300 depicting the texture component content of the UBC 1, UBC 2, and 5754CC 1 alloys, including Cube, Goss, Brass, S, and Copper ("Cu"). UBC 1 exhibited a lower texture component content when compared to the 5754CC 1 alloy. UBC 2 exhibited a similar texture component content to the 5754CC 1 alloy.

Figure 24:
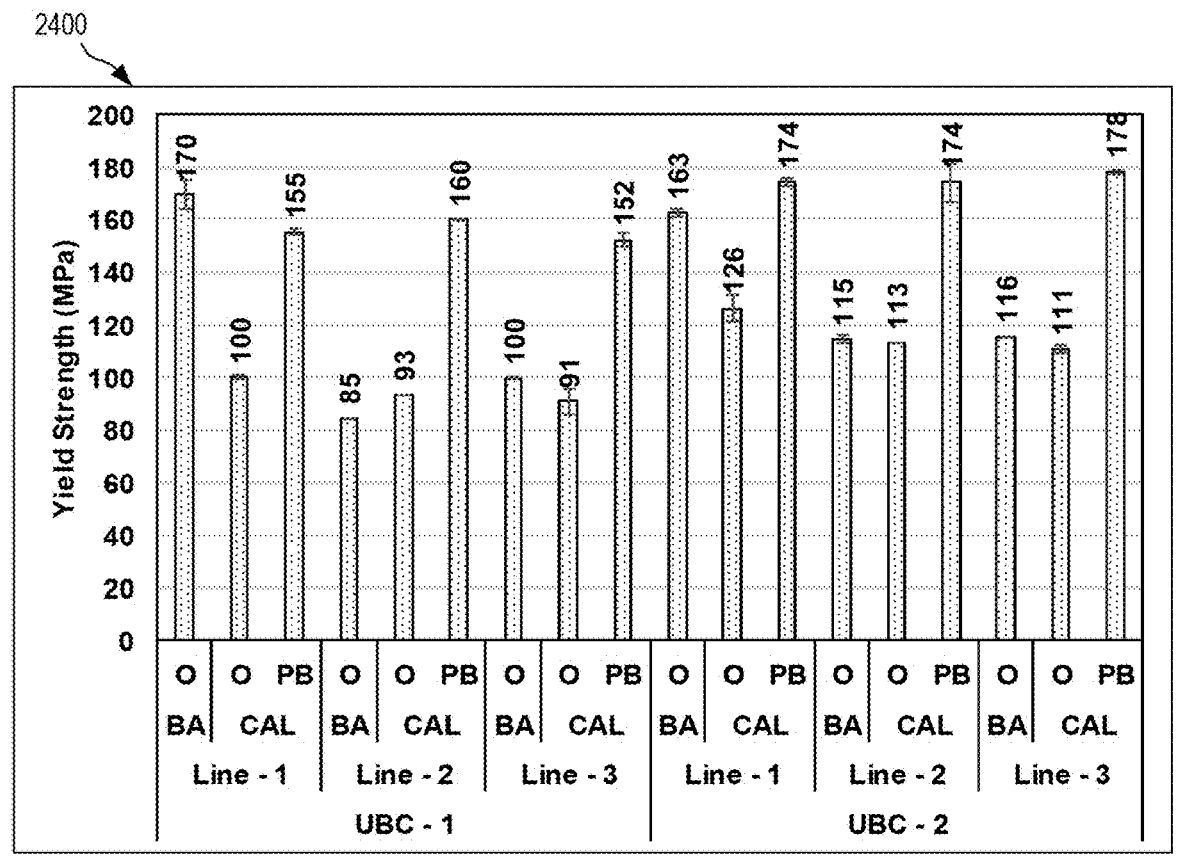
FIG. 24 is a chart depicting the yield strength for metal product samples prepared using UBC-based alloys according to certain aspects of the present disclosure.
Figure 25:
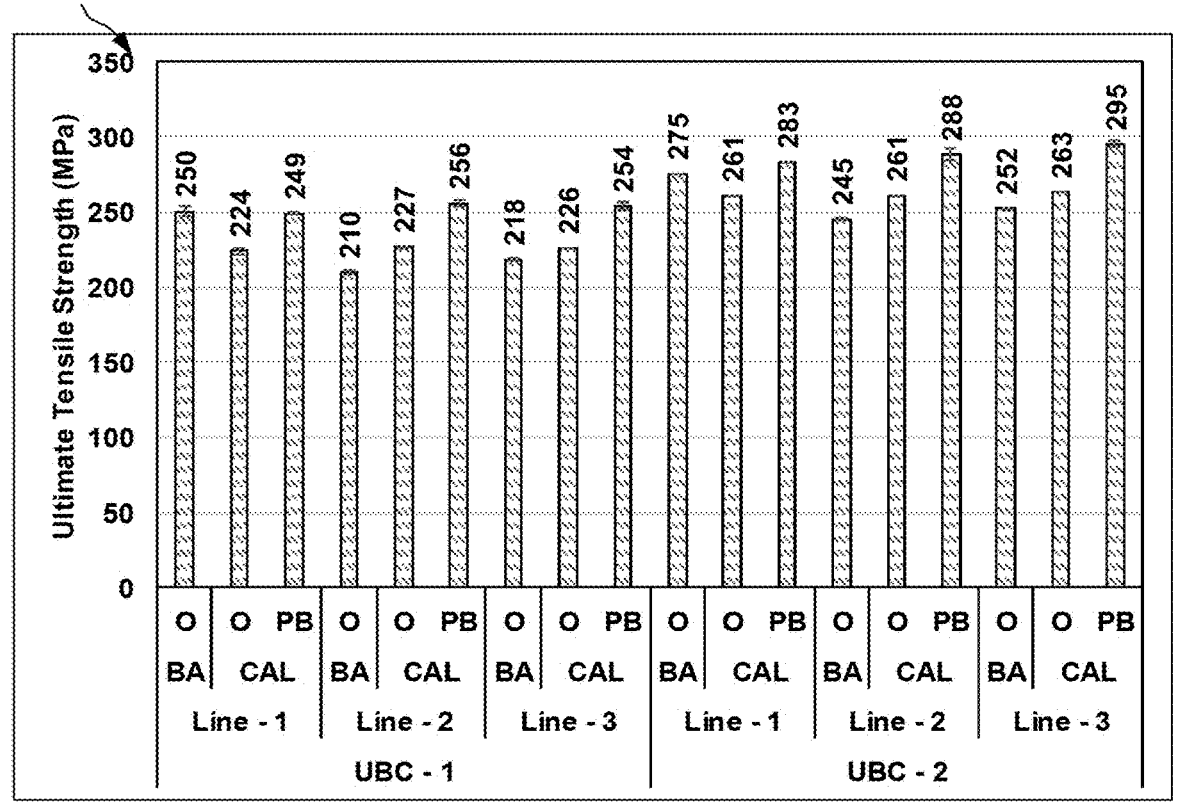
FIG. 25 is a chart depicting the ultimate tensile strength for metal product samples prepared using UBC-based alloys according to certain aspects of the present disclosure.
Figure 26:
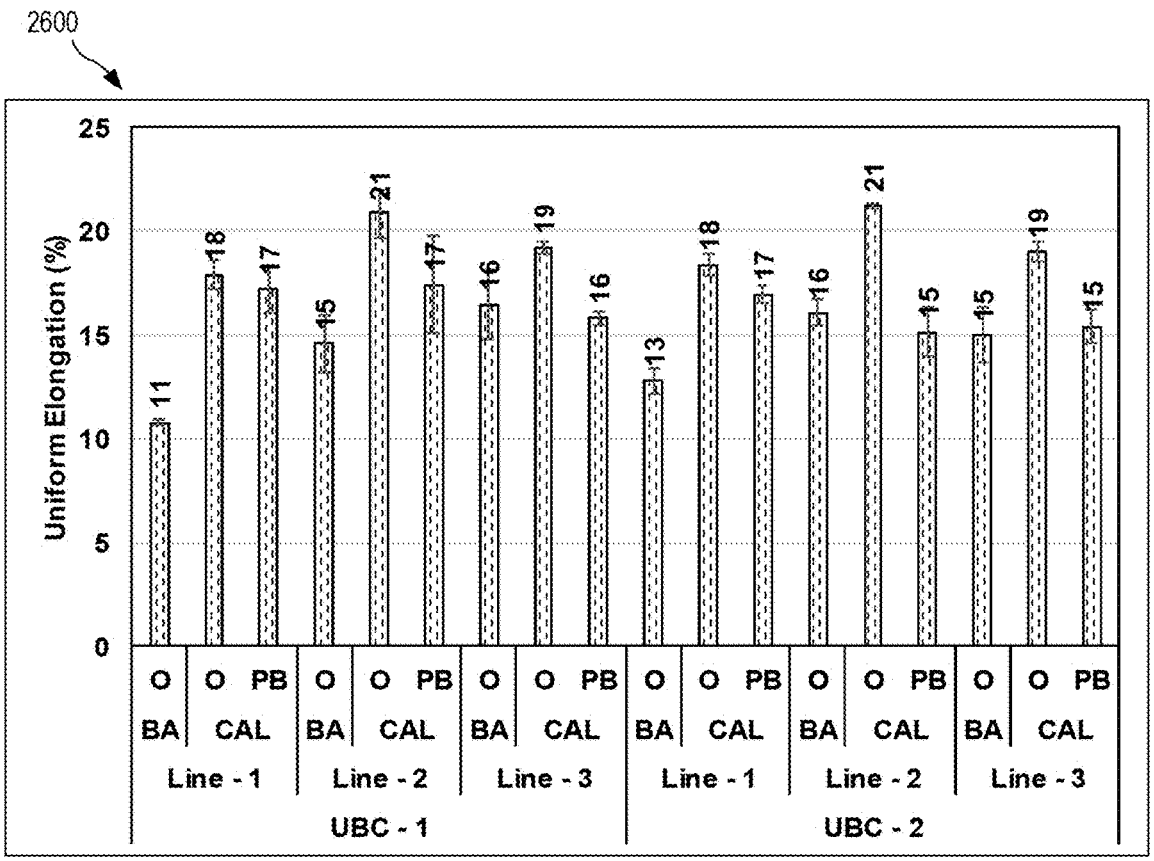
FIG. 26 is a chart depicting the uniform elongation for metal product samples prepared using UBC-based alloys according to certain aspects of the present disclosure.
Figure 27:
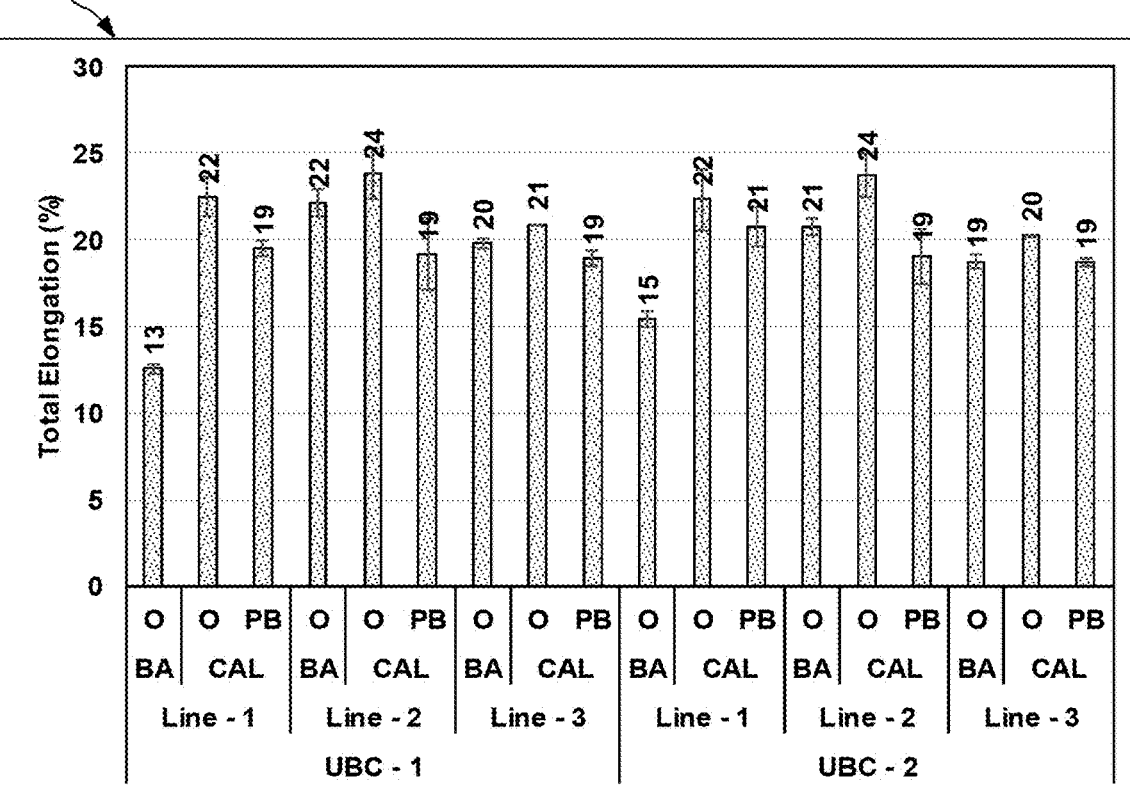
FIG. 27 is a chart depicting the total elongation for metal product samples prepared using UBC-based alloys according to certain aspects of the present disclosure.
Figure 28:
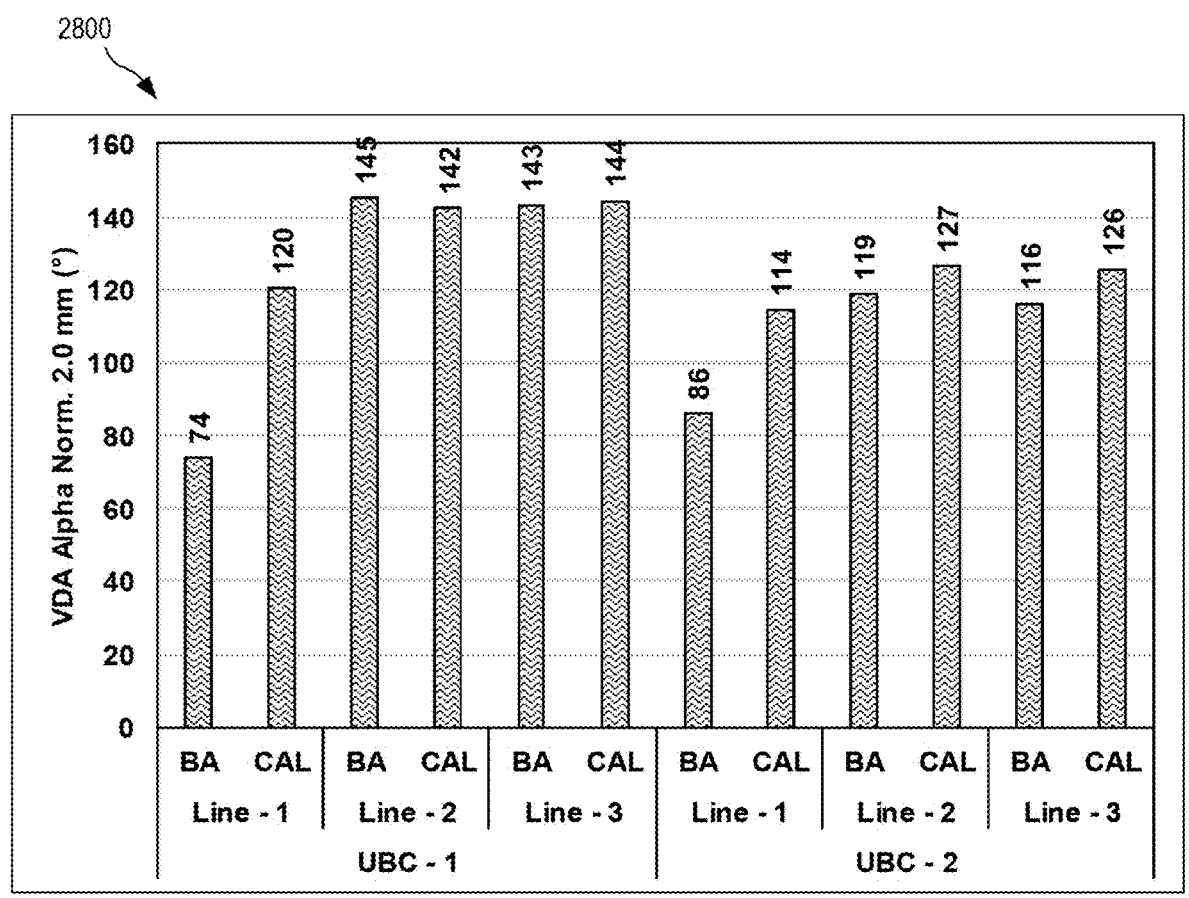
FIG. 28 is a chart depicting 3-point bending test results (external bend angle α) for metal product samples prepared using UBC-based alloys according to certain aspects of the present disclosure.

UBC-based alloys UBC 1 and UBC 2 (see Table 4) were prepared and processed according to Process Line 1 2100, Process Line 2 2120, and Process Line 3 2140 (see FIG. 21). Additionally, the alloy samples were further subjected to batch annealing ("BA") or continuous annealing ("CAL") to provide the alloys in O temper ("O"). Batch annealing was performed by heating the alloys to a temperature of 350° C. at a rate of 50° C./hour and soaking for 2 hours. Continuous annealing was performed as described above. In a further example, each alloy was further subjected to a paint bake ("PB") process after continuous annealing only. Paint baking was performed by straining the alloys 2% and subsequently heating the alloys to a temperature of 185° C. and soaking for 20 minutes. FIG. 24 is a chart 2400 depicting the yield strengths of UBC 1 and UBC 2. FIG. 25 is a chart 2500 depicting the ultimate tensile strengths of UBC 1 and UBC 2. Alloys processed by Process Line 1 2100 (see FIG. 21) exhibited a higher yield strength after the batch annealing process. The higher strength is attributed to energy stored in the alloys imparted by hot rolling and not relaxed by homogenization. Additionally, UBC 1 showed a 15% to 20% lower yield strength when compared to UBC 2, regardless of the processing route, due to the lower Mg content in UBC 1. The paint bake process provided a 45% to 55% increase in yield strength for both alloys. FIG. 26 is a chart 2600 depicting the uniform elongation of UBC 1 and UBC 2. FIG. 27 is a chart 2700 depicting the total elongation of UBC 1 and UBC 2. UBC 1 and UBC 2 exhibited low elongation values after processing according to Process Line 1 2100 (see FIG. 21) and batch annealing. The low elongation is attributed to energy stored in the alloys processed without homogenization. Additionally, the alloys that underwent batch annealing exhibited lower elongation compared to those that underwent continuous annealing due to the effects of heating rate (slower rate for batch annealing versus a faster heating rate for continuous annealing) on texture and grain size. FIG. 28 is a chart 2800 depicting the 3-point bending test results (external bend angle α according to the VDA 238-100 Tight Radius Bending Test (see FIG. 29)). UBC 1 and UBC 2 prepared according to Process Line 1 2100 with batch annealing exhibited a lower external bend angle (α-angle) than UBC 1 and UBC 2 prepared according to Process Line 1 2100 with continuous annealing. The lower external bend angle (α-angle) is attributed to Fe-containing constituent particles in the alloys processed without homogenization. Additionally, UBC 2, having a higher Mg content than UBC 1, exhibited a lower external bend angle (α-angle) than UBC 1 regardless of the processing route.

Figure 30:
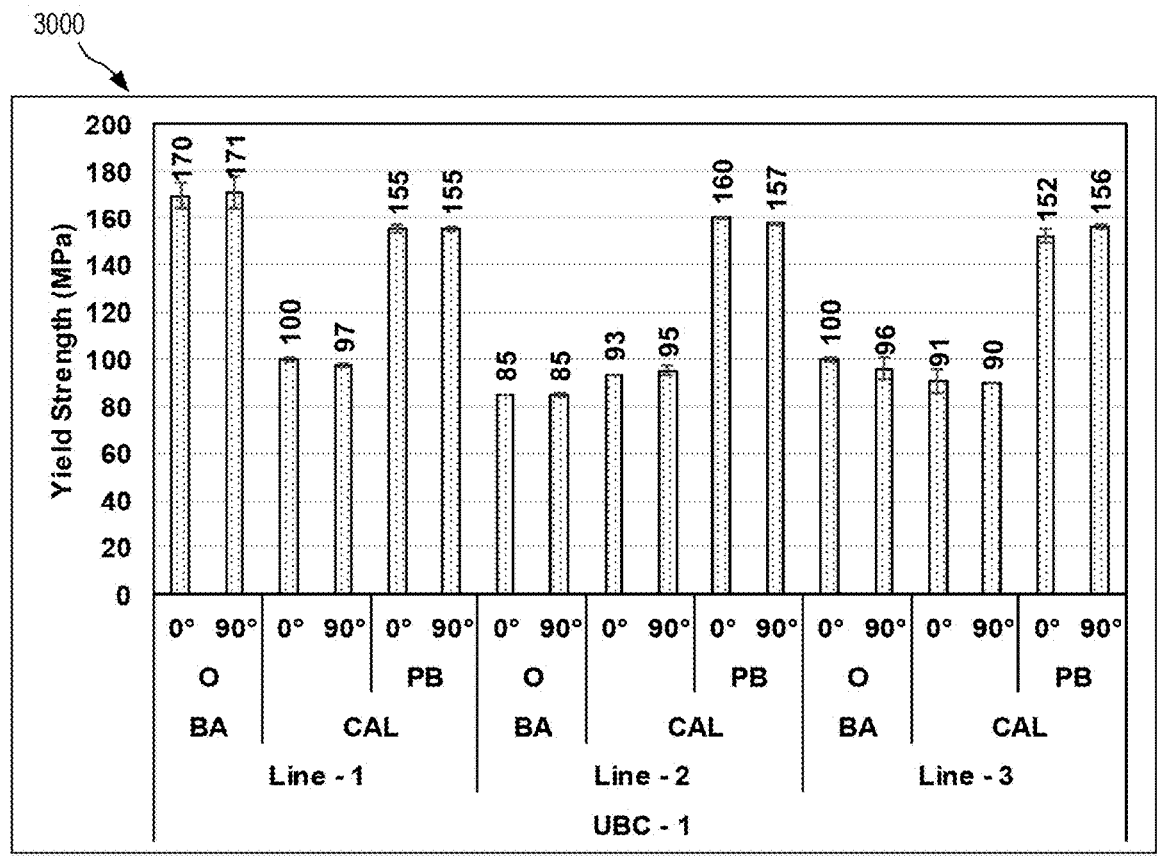
FIG. 30 is a chart depicting the yield strength for metal product samples prepared using UBC-based alloys according to certain aspects of the present disclosure.
Figure 31:
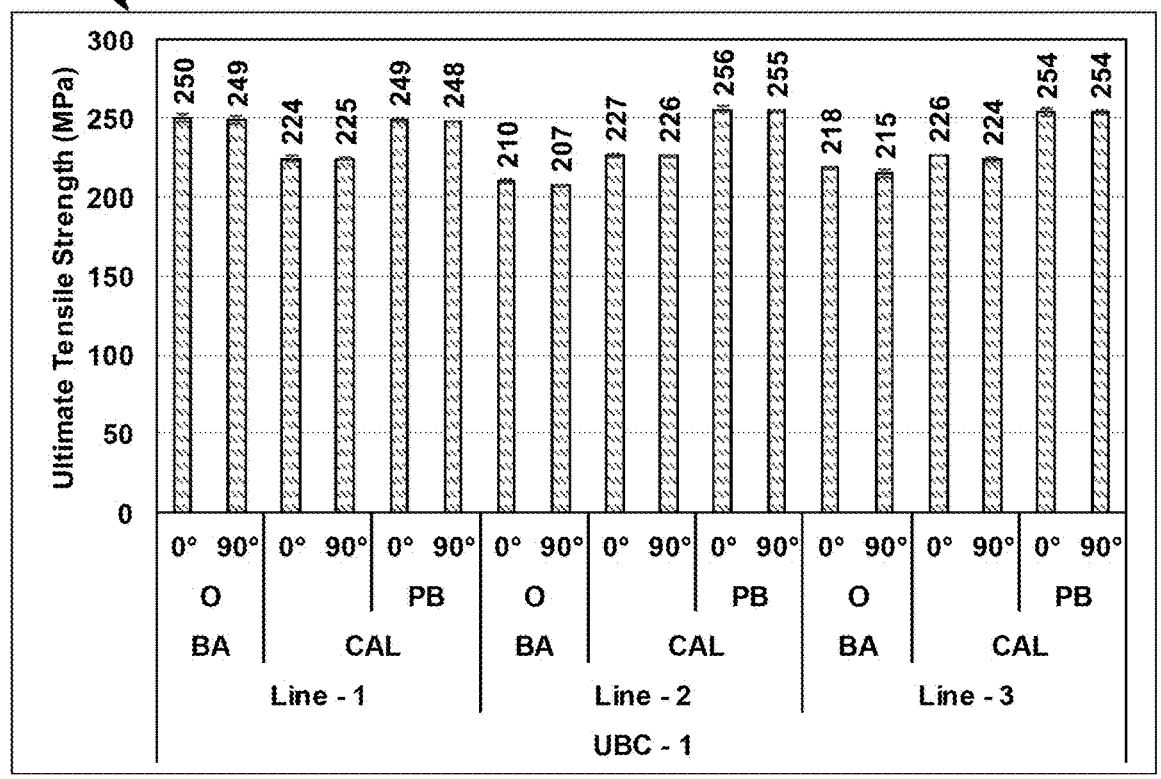
FIG. 31 is a chart depicting the ultimate tensile strength for metal product samples prepared using UBC-based alloys according to certain aspects of the present disclosure.
Figure 32:
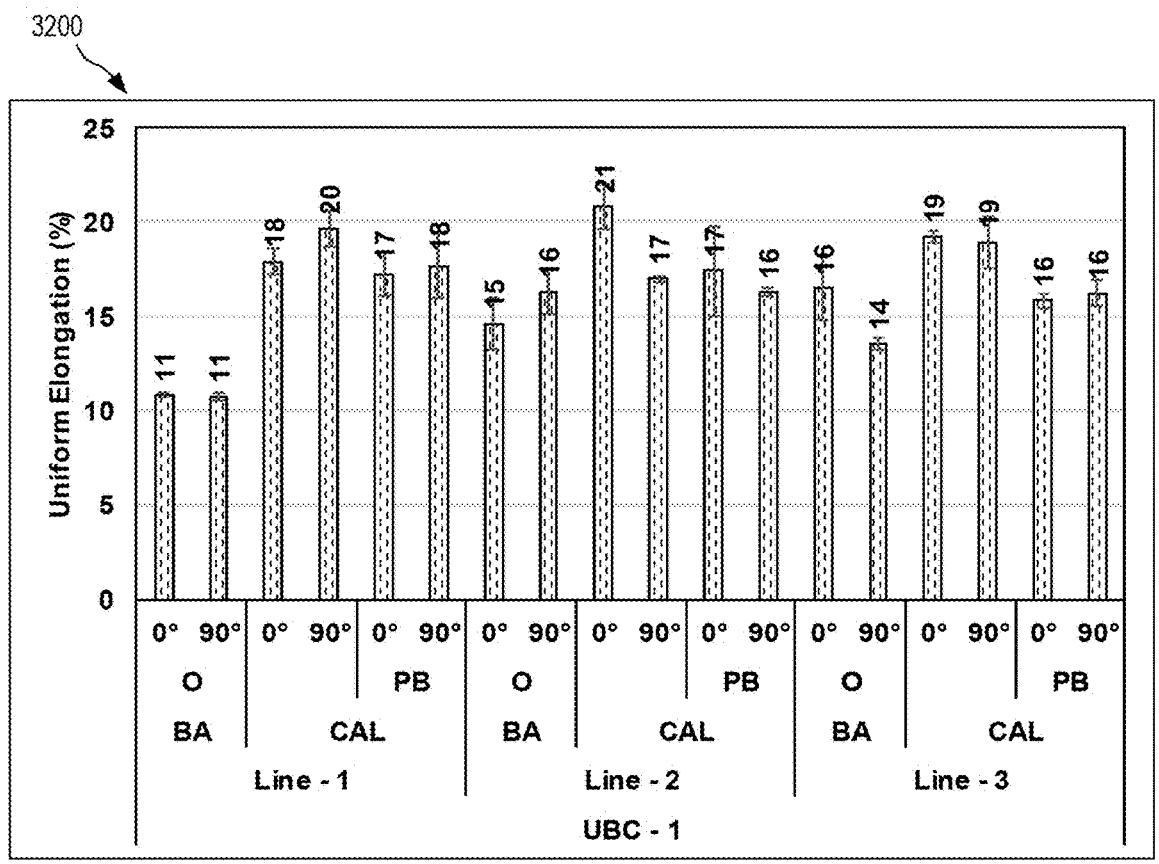
FIG. 32 is a chart depicting the uniform elongation for metal product samples prepared using UBC-based alloys according to certain aspects of the present disclosure.
Figure 33:
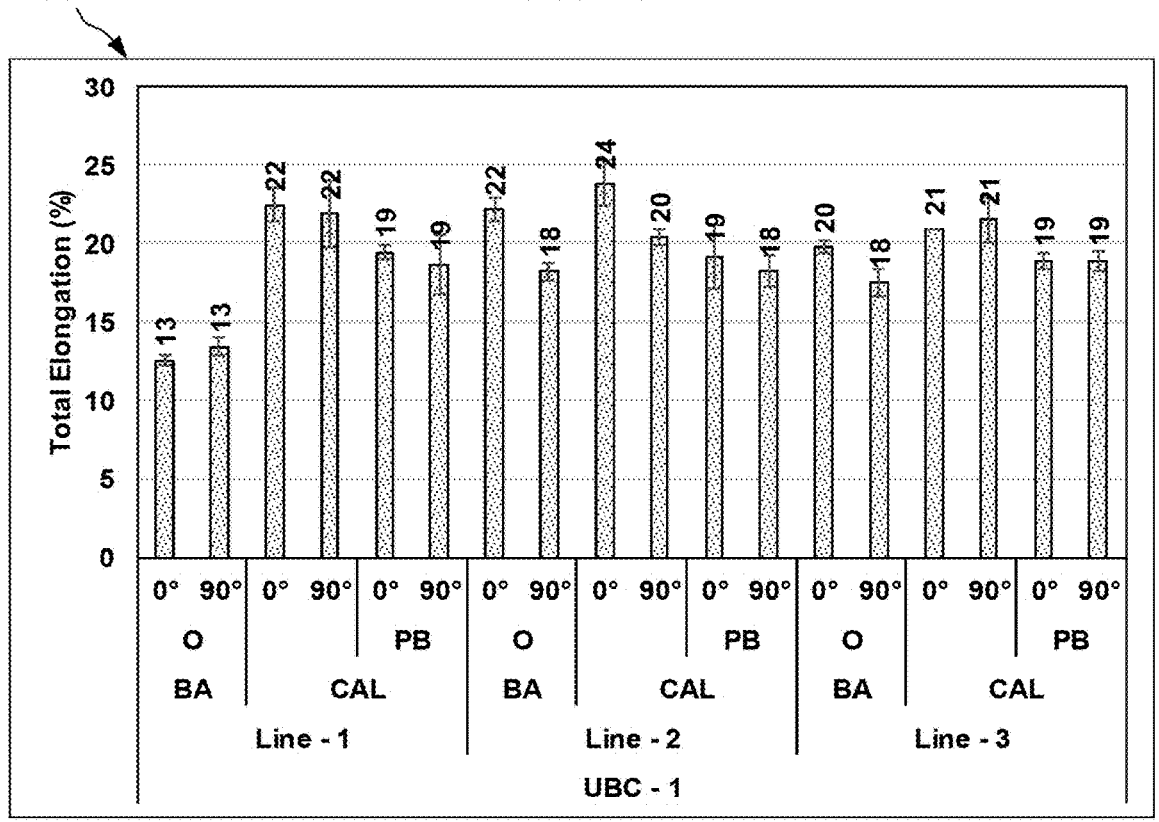
FIG. 33 is a chart depicting the total elongation for metal product samples prepared using UBC-based alloys according to certain aspects of the present disclosure.
Figure 34:
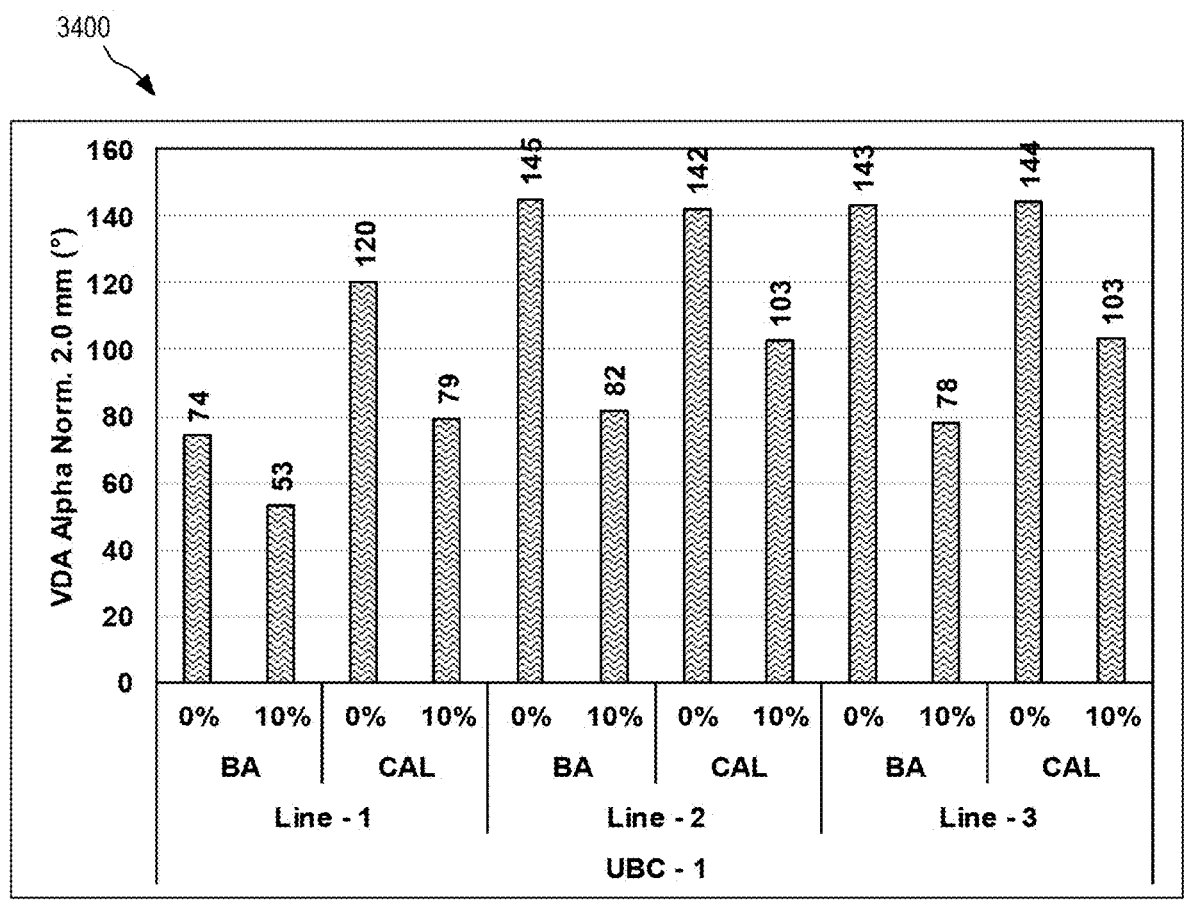
FIG. 34 is a chart depicting 3-point bending test results (external bend angle α) for metal product samples prepared using UBC-based alloys according to certain aspects of the present disclosure.

UBC-based alloy UBC 1 (see Table 4) was prepared and processed according to Process Line 1 2100, Process Line 2 2120, and Process Line 3 2140 (see FIG. 21). Additionally, the alloy was further subjected to batch annealing and continuous annealing to provide the alloy in O temper. The batch annealing and continuous annealing steps were performed as described above. In some cases, the alloys processed by continuous annealing were also subjected to paint baking. The paint bake was performed as described above. FIG. 30 is a chart 3000 depicting the yield strength of UBC 1. FIG. 31 is a chart 3100 depicting the ultimate tensile strength of UBC 1. The yield strength and ultimate tensile strength were measured in a direction longitudinal to the rolling direction of the alloy ("0°") and in a direction transverse to the rolling direction of the alloy ("90°"). The UBC 1 alloy prepared according to Process Line 1 2100 (see FIG. 21) exhibited a higher strength after batch annealing than after continuous annealing due to energy stored in the alloy after hot rolling without homogenization. Likewise, UBC 1 processed according to Process Line 2 2120 and Process Line 3 2140 (see FIG. 21) exhibited a 10% to 15% lower strength than UBC 1 prepared according to Process Line 1 2100 (see FIG. 21). Additionally, employing the paint bake process provided an increase in yield strength regardless of processing route. FIG. 32 is a chart 3200 depicting the uniform elongation of UBC 1. FIG. 33 is a chart 3300 depicting the total elongation of UBC 1. The uniform elongation and total elongation were measured in a direction longitudinal to the rolling direction of the alloy ("0°") and in a direction transverse to the rolling direction of the alloy ("90°"). The UBC 1 alloy processed according to Process Line 1 2100 (see FIG. 21) exhibited lower elongation after batch annealing, as compared to the alloy processed by continuous annealing due to energy stored in the alloy after hot rolling and without homogenization. Likewise, the UBC 1 alloy processed according to Process Line 2 2120 and Process Line 3 2140 (see FIG. 21) exhibited a 5% to 8% higher elongation than UBC 1 processed according to Process Line 1 2100 (see FIG. 21). FIG. 34 is a chart 3400 depicting 3-point bending test results (external bend angle α according to the VDA 238-100 Tight Radius Bending Test (see FIG. 29)). UBC 1 processed according to Process Line 1 2100 with batch annealing and continuous annealing exhibited a lower external bend angle (α-angle) than UBC 1 processed according to Process Line 2 2120 and Process Line 3 2140 (see FIG. 21). The lower external bend angle (α-angle) is attributed to Fe-containing constituent particles in the alloys processed without homogenization. Additionally, applying 10% partial strain ("PS", referred to as "10%" in FIG. 34) to UBC 1 provided a 30% to 40% lower external bend angle (α-angle), regardless of the processing route.

Figure 35:
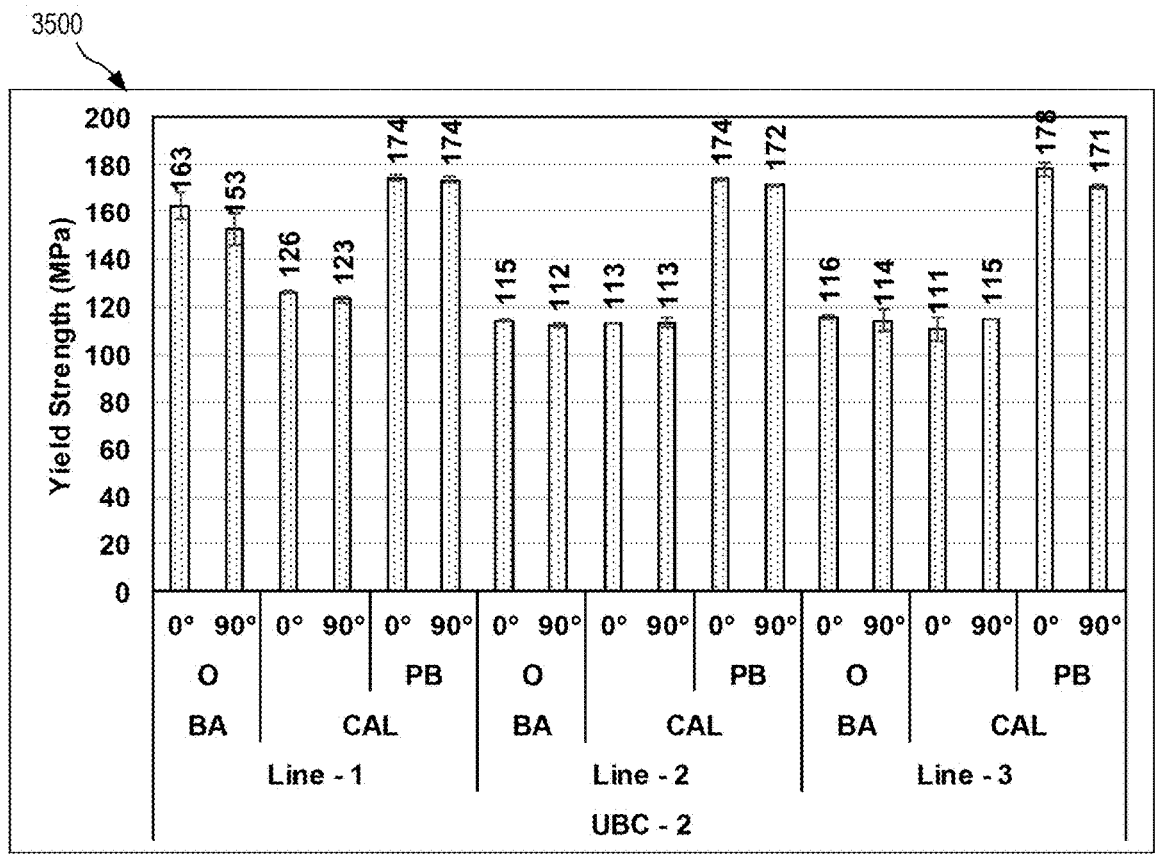
FIG. 35 is a chart depicting the yield strength for metal product samples prepared using UBC-based alloys according to certain aspects of the present disclosure.
Figure 36:
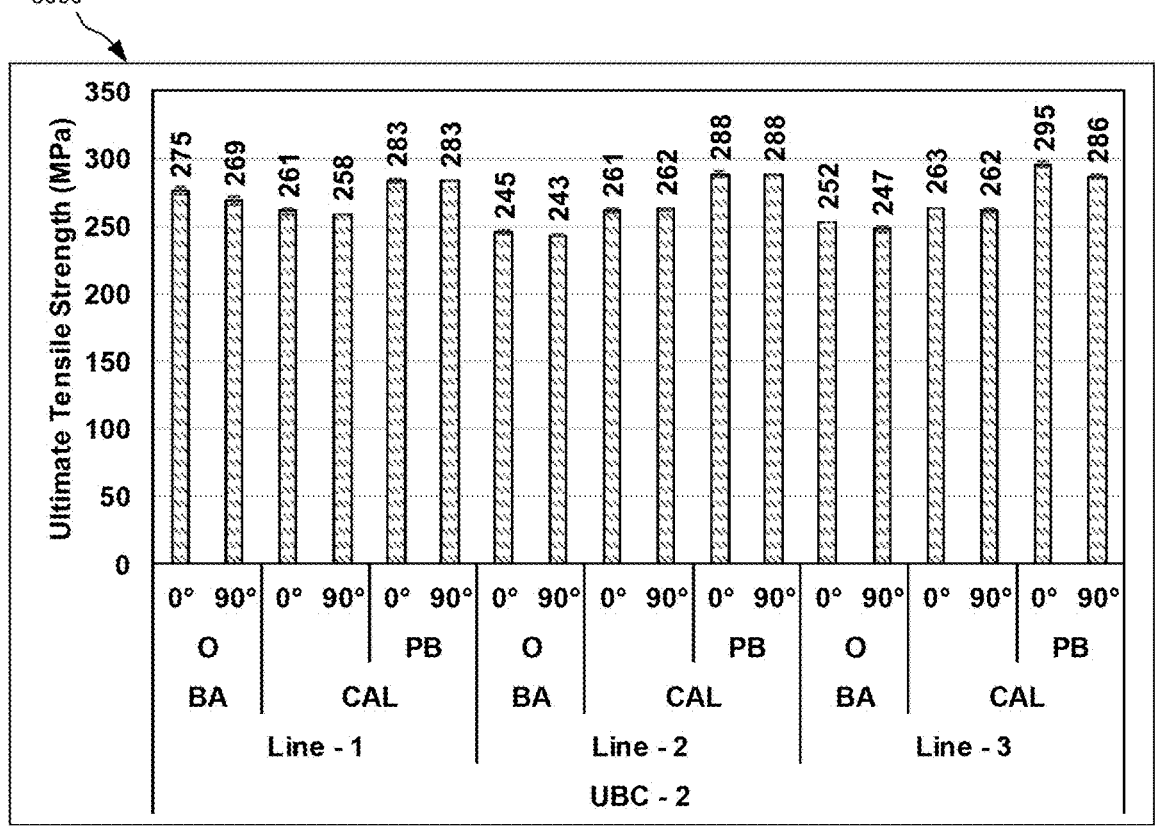
FIG. 36 is a chart depicting the ultimate tensile strength for metal product samples prepared using UBC-based alloys according to certain aspects of the present disclosure.
Figure 37:
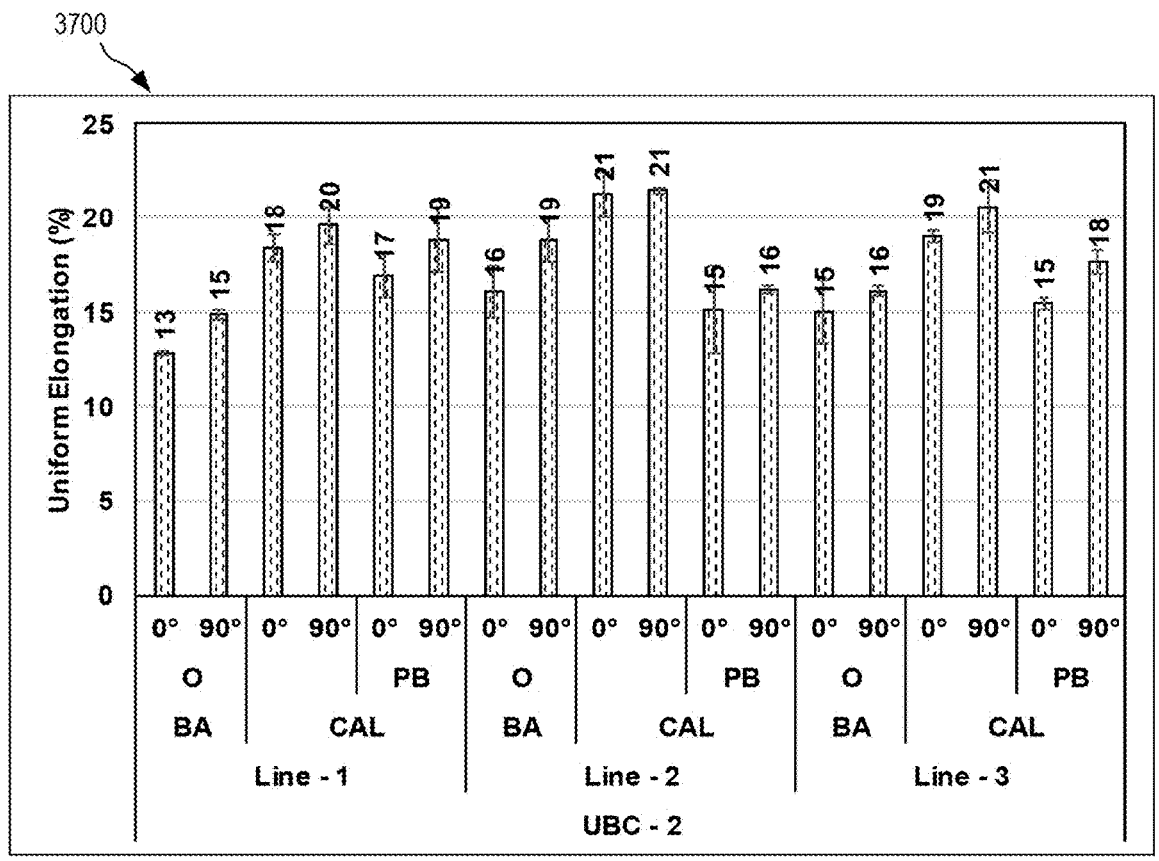
FIG. 37 is a chart depicting the uniform elongation for metal product samples prepared using UBC-based alloys according to certain aspects of the present disclosure.
Figure 38:
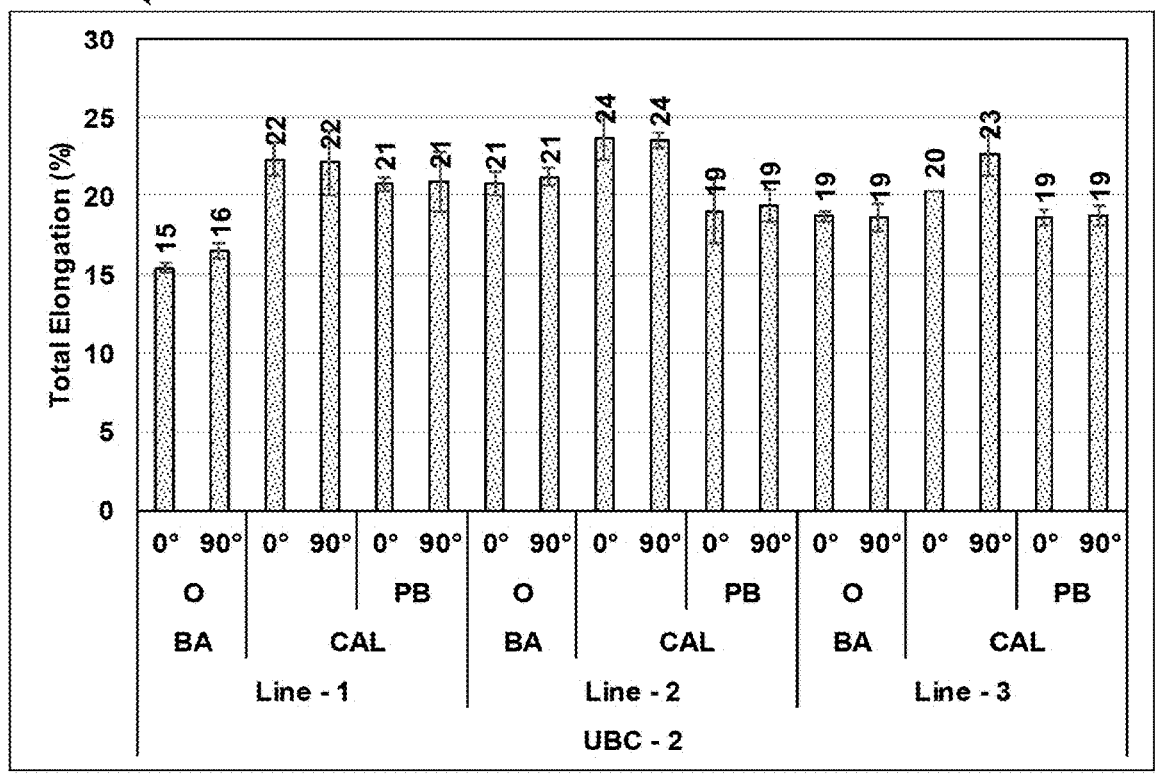
FIG. 38 is a chart depicting the total elongation for metal product samples prepared using UBC-based alloys according to certain aspects of the present disclosure.
Figure 39:
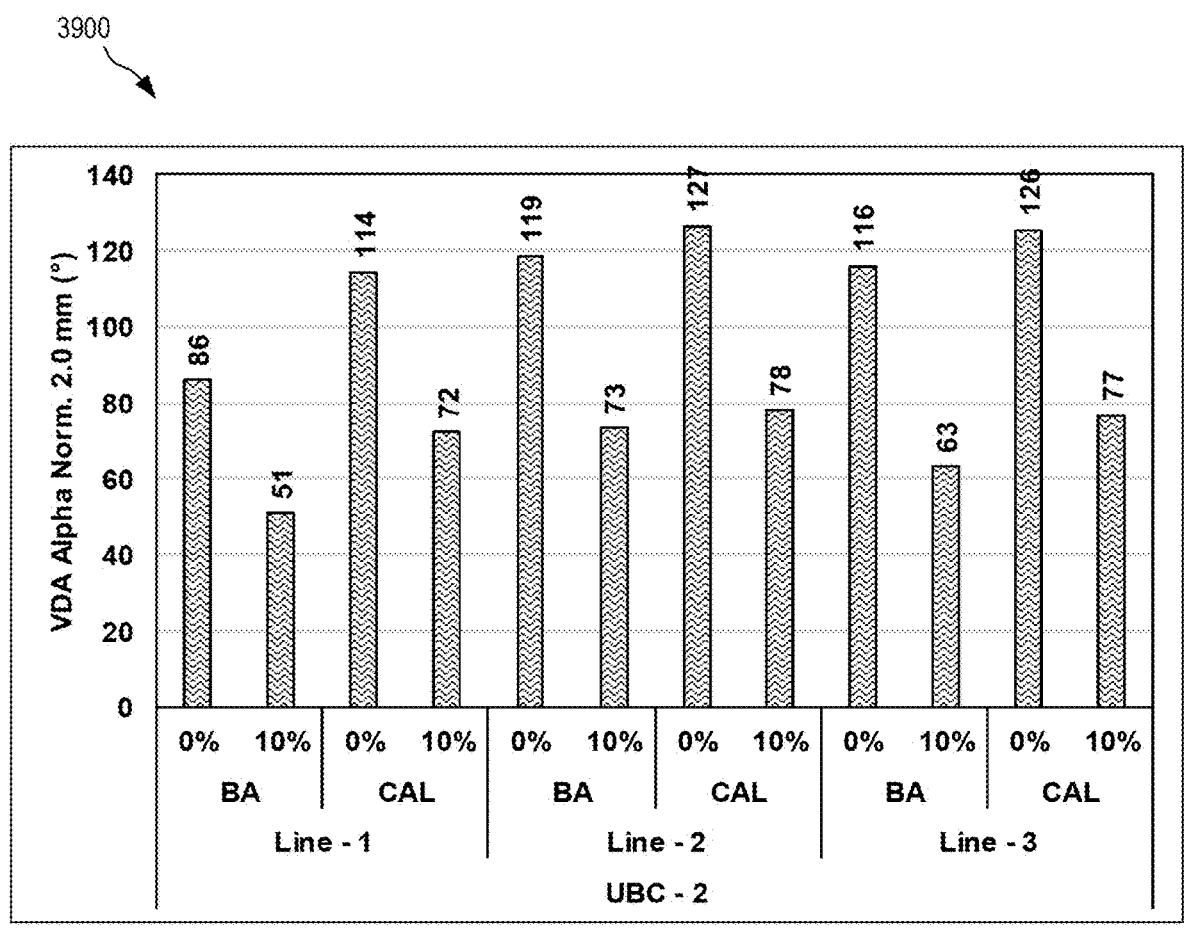
FIG. 39 is a chart depicting 3-point bending test results (external bend angle α) for metal product samples prepared using UBC-based alloys according to certain aspects of the present disclosure.

UBC-based alloy UBC 2 (see Table 4) was prepared and processed according to Process Line 1 2100, Process Line 2 2120, and Process Line 3 2140 (see FIG. 21). Additionally, the alloy samples were further subjected to batch annealing or continuous annealing to provide the alloy in O temper ("O"). Batch annealing and continuous annealing were performed as described above. In some cases, the alloys processed by continuous annealing were further subjected to paint baking. The paint bake was performed as described above. FIG. 35 is a chart 3500 depicting the yield strength of UBC 2. FIG. 36 is a chart 3600 depicting the ultimate tensile strength of UBC 2. The yield strengths and ultimate tensile strengths were measured in a direction longitudinal to the rolling direction of the alloy ("0°") and in a direction transverse to the rolling direction of the alloy ("90°"). The UBC 2 alloy processed according to Process Line 1 2100 (see FIG. 21) exhibited higher strengths after batch annealing than after continuous annealing due to energy stored in the alloy after hot rolling without homogenization. Likewise, UBC 2 processed according to Process Line 2 2120 and Process Line 3 2140 (see FIG. 21), exhibited a 10% to 15% lower strength than UBC 2 processed according to Process Line 1 2100 (see FIG. 21). Additionally, employing the paint bake process provided an increase in yield strength regardless of the processing route. FIG. 37 is a chart 3700 depicting the uniform elongation of UBC 2. FIG. 38 is a chart 3800 depicting the total elongation of UBC 2. The uniform elongation and total elongation were measured in a direction longitudinal to the rolling direction of the alloy ("0°") and in a direction transverse to the rolling direction of the alloy ("90°"). The UBC 2 alloy processed according to Process Line 1 2100 (see FIG. 21) exhibited a lower elongation after batch annealing than after continuous annealing due to energy stored in the alloy after hot rolling and without homogenization. Likewise, UBC 2 processed according to Process Line 2 2120 and Process Line 3 2140 (see FIG. 21) exhibited a 5% to 8% higher elongation than UBC 2 processed according to Process Line 1 2100 (see FIG. 21). FIG. 39 is a chart 3900 depicting 3-point bending test results (external bend angle α according to the VDA 238-100 Tight Radius Bending Test (see FIG. 29)). UBC 2 processed according to Process Line 1 2100 with batch annealing exhibited a 25% lower external bend angle (α-angle) than UBC 2 processed according to Process Line 1 2100 with continuous annealing due to the differences in heat rate that affect grain structure and the texture of the material. Additionally, applying 10% partial strain ("PS", referred to as "10%" in FIG. 39) to UBC 2 provided a 35% to 45% lower external bend angle (α-angle) regardless of processing route.

Figure 40:
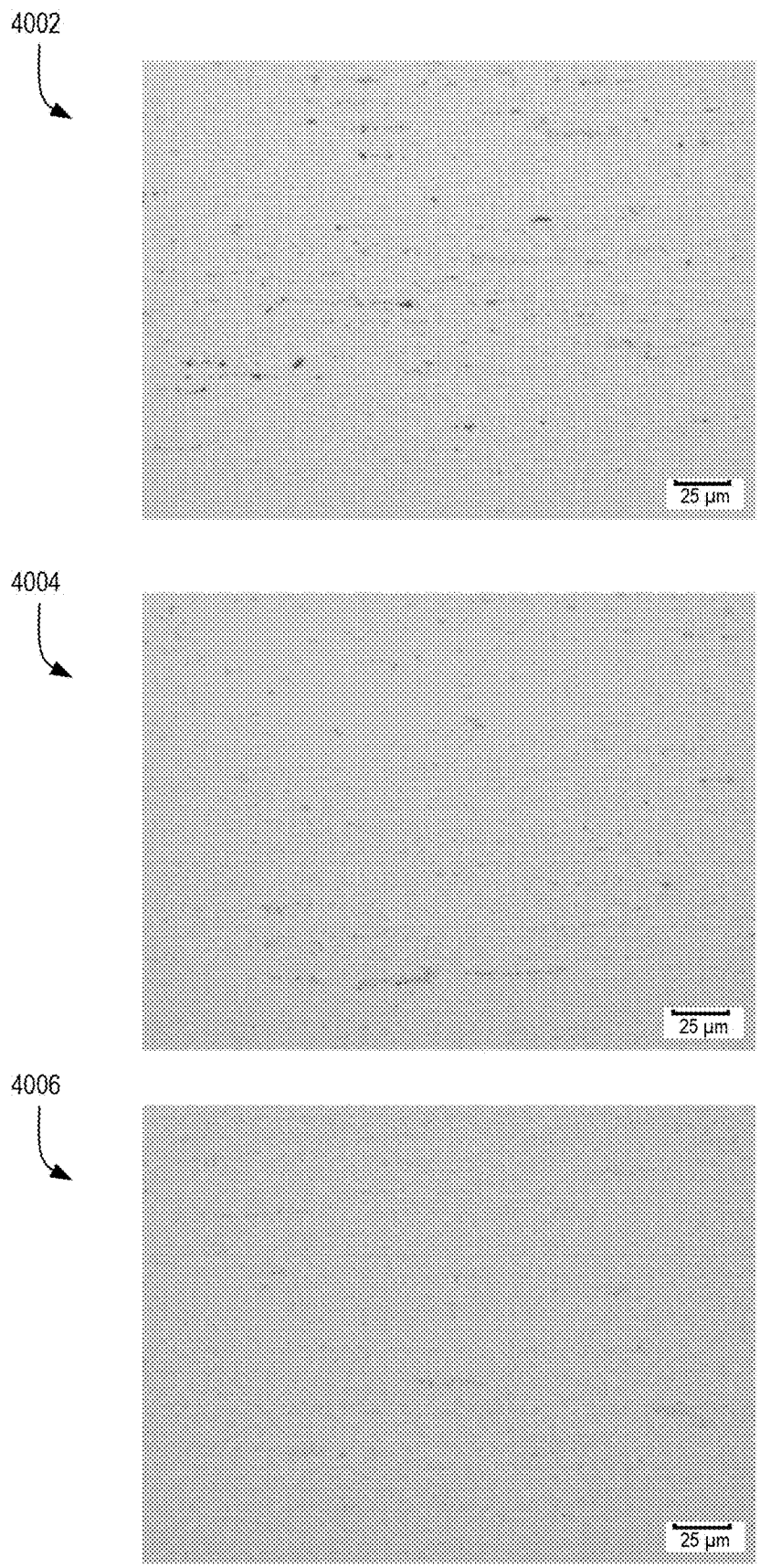
FIG. 40 depicts a set of micrographs for metal product samples prepared using UBC-based alloys according to certain aspects of the present disclosure.

UBC-based alloy UBC 1 was prepared and processed according to Process Line 1 2100, Process Line 2 2120, and Process Line 3 2140 (see FIG. 21). Additionally, the alloy was subjected to batch annealing and continuous annealing as described above. FIG. 40 depicts micrographs showing the particulate content of the alloy after the various processing routes with batch annealing. Micrograph 4002 depicts the particulate content of UBC 1 processed according to Process Line 1 2100, micrograph 4004 depicts the particulate content of UBC 1 after processing according to Process Line 2 2120, and micrograph 4006 depicts the particulate content of UBC 1 after processing according to Process Line 3 2140. In general, the UBC 1 alloy processed according to Process Line 1 2100 provided a greater amount of precipitates and Fe-containing constituents than those processed according to Process Line 2 2120 and Process Line 3 2140.

Figure 41:
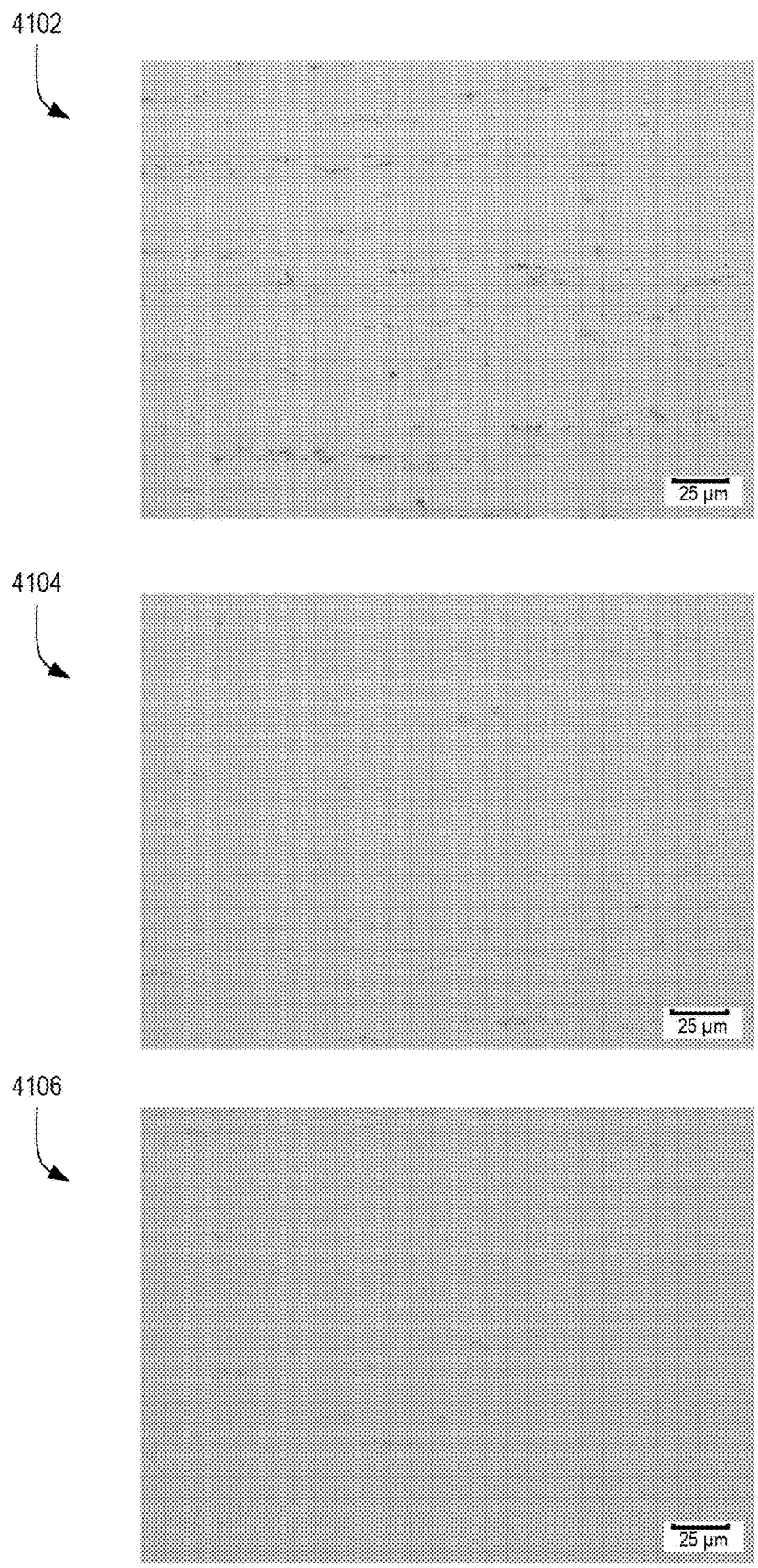
FIG. 41 depicts a set of micrographs for metal product samples prepared using UBC-based alloys according to certain aspects of the present disclosure.

FIG. 41 depicts micrographs showing particulate content of the alloy after the various processing routes with continuous annealing. Micrograph 4102 depicts the particulate content of UBC 1 processed according to Process Line 1 2100, micrograph 4104 depicts the particulate content of UBC 1 after processing according to Process Line 2 2120, and micrograph 4106 depicts the particulate content of UBC 1 after processing according to Process Line 3 2140. UBC 1 processed with continuous annealing exhibited fewer particulates than UBC 1 processed with batch annealing.

Figure 42:
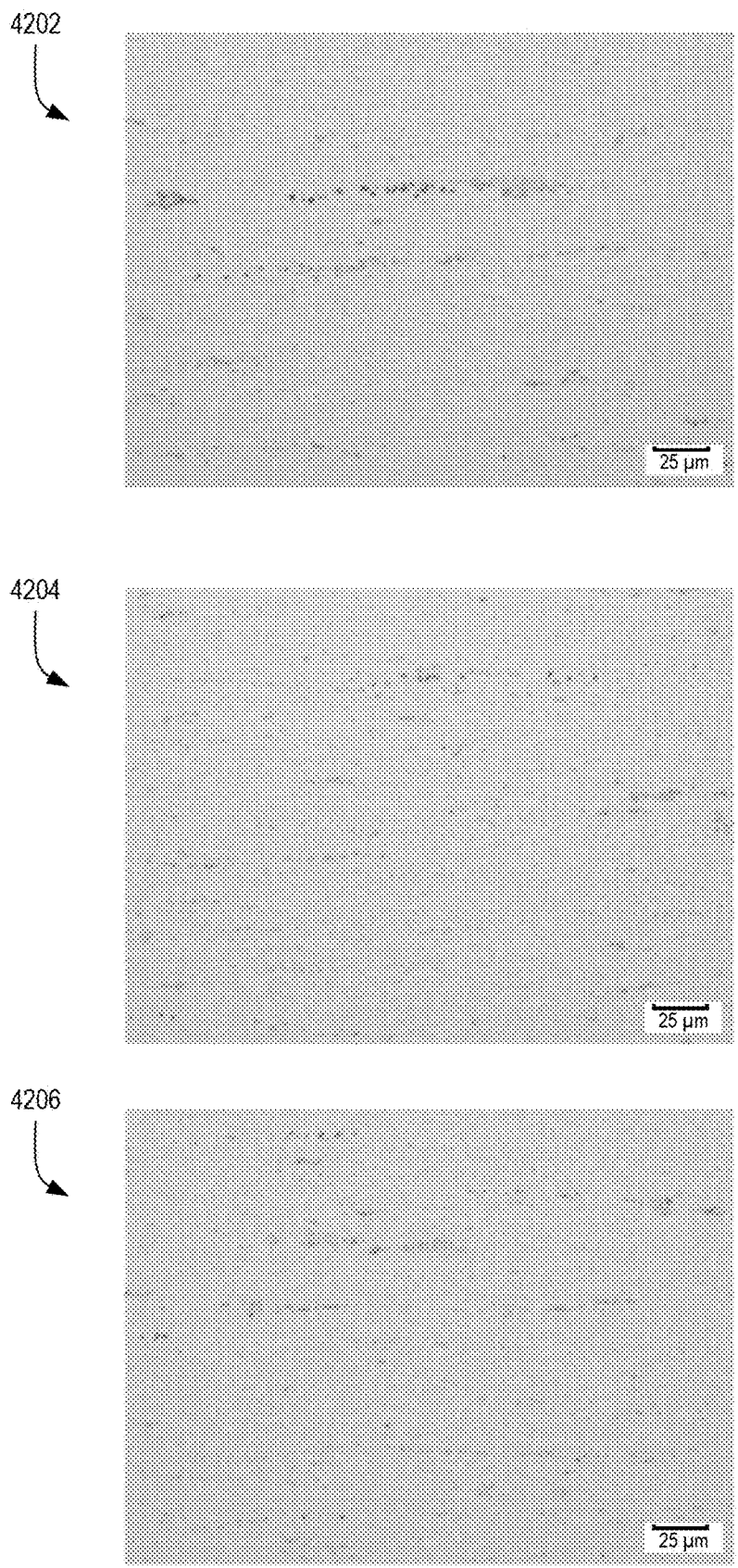
FIG. 42 depicts a set of micrographs for metal product samples prepared using UBC-based alloys according to certain aspects of the present disclosure.

UBC-based alloy UBC 2 was prepared and processed according to Process Line 1 2100, Process Line 2 2120, and Process Line 3 2140 (see FIG. 21). Additionally, the alloys were subjected to batch annealing or continuous annealing as described above. FIG. 42 depicts micrographs showing particulate content of the alloys after the various processing routes with batch annealing. Micrograph 4202 depicts the particulate content of UBC 2 processed according to Process Line 1 2100, micrograph 4204 depicts the particulate content of UBC 2 after processing according to Process Line 2 2120, and micrograph 4206 depicts the particulate content of UBC 2 after processing according to Process Line 3 2140. In general, UBC 2 processed according to Process Line 1 2100 provided a greater amount of precipitates and Fe-containing constituents than those processed according to Process Line 2 2120 and Process Line 3 2140.

Figure 43:
FIG. 43 depicts a set of micrographs for metal product samples prepared using UBC-based alloys according to certain aspects of the present disclosure.
Figure 43:
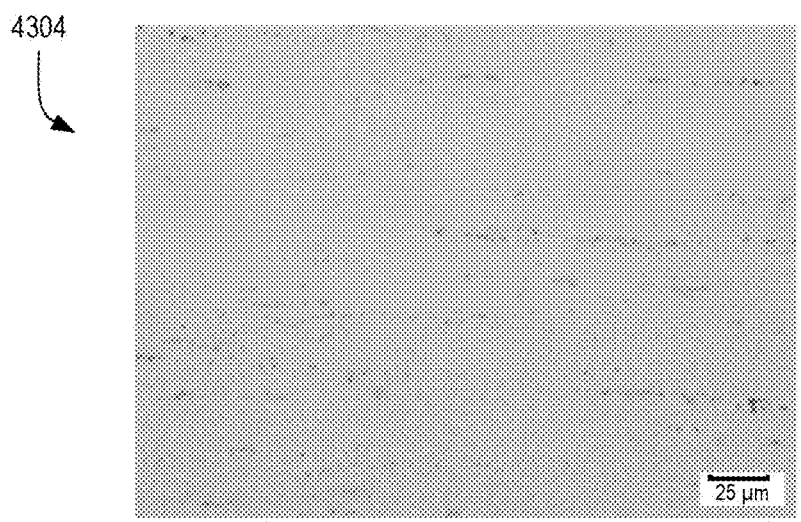
Figure 43:
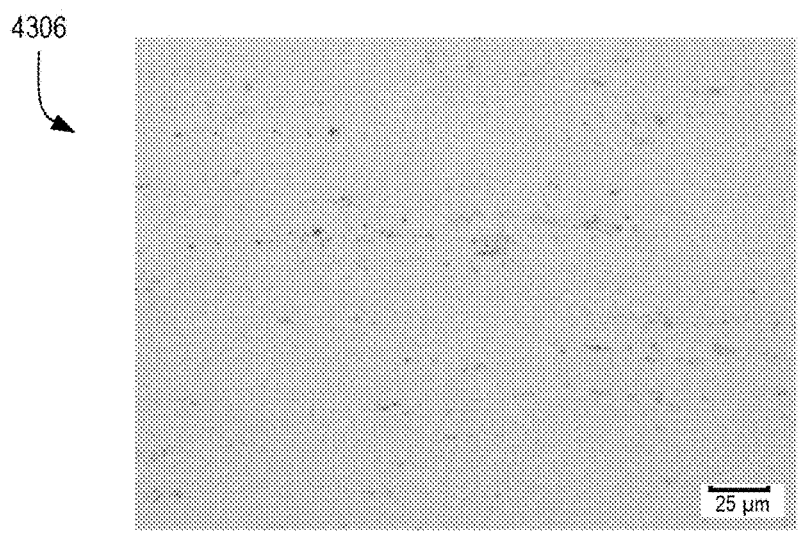

FIG. 43 depicts micrographs showing particulate content of the alloys after the various processing routes with continuous annealing. Micrograph 4302 depicts the particulate content of UBC 2 processed according to Process Line 1 2100, micrograph 4304 depicts the particulate content of UBC 2 after processing according to Process Line 2 2120, and micrograph 4306 depicts the particulate content of UBC 2 after processing according to Process Line 3 2140. UBC 2 processed with continuous annealing exhibited fewer particulates than UBC 2 processed with batch annealing.

Figure 44:
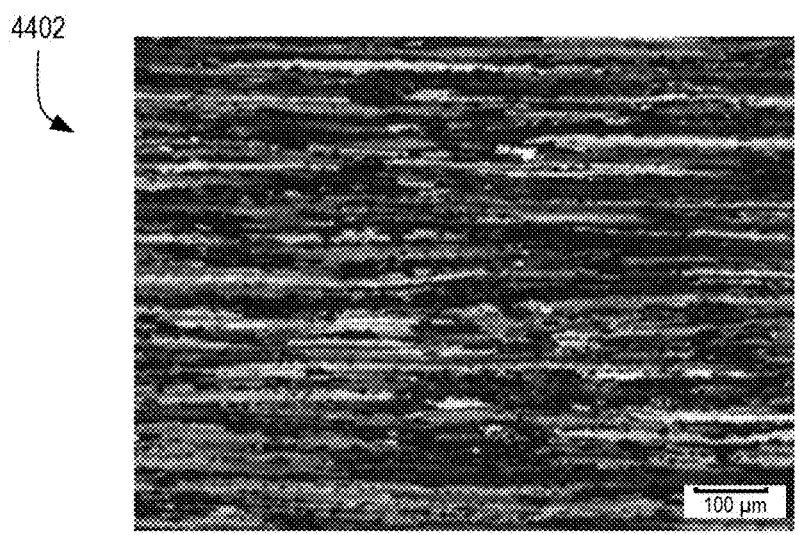
FIG. 44 depicts a set of micrographs for metal product samples prepared using UBC-based alloys according to certain aspects of the present disclosure.
Figure 44:
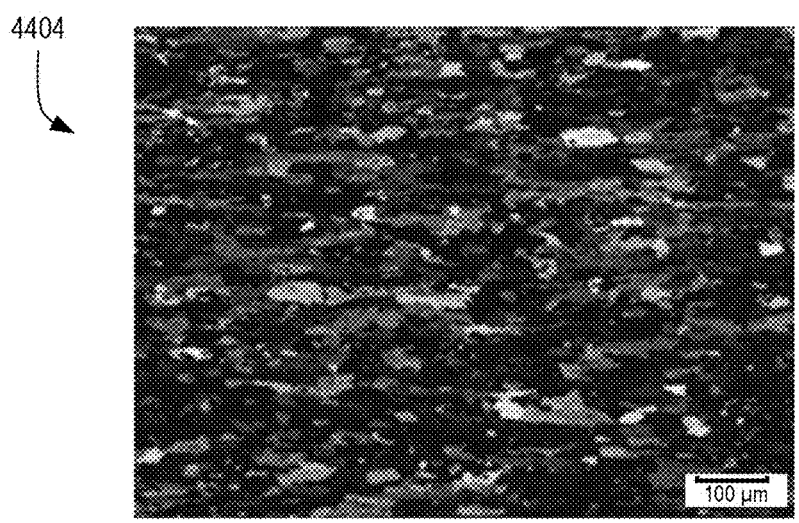
Figure 44:
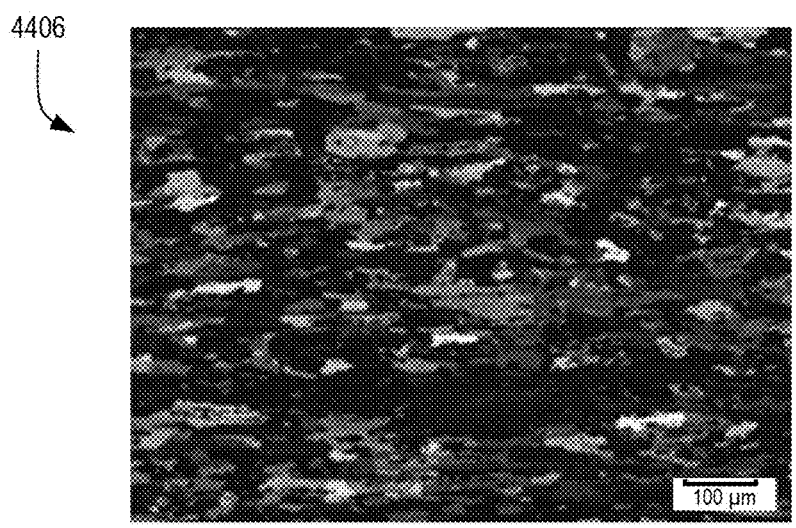

UBC-based alloy UBC 1 was prepared and processed according to Process Line 1 2100, Process Line 2 2120, and Process Line 3 2140 (see FIG. 21). Additionally, the alloys were subjected to batch annealing or continuous annealing as described above. FIG. 44 depicts micrographs showing the grain morphology of the alloys after the various processing routes with batch annealing. Micrograph 4402 depicts the grain morphology of UBC 1 processed according to Process Line 1 2100, micrograph 4404 depicts the grain morphology of UBC 1 after processing according to Process Line 2 2120, and micrograph 4406 depicts the grain morphology of UBC 1 after processing according to Process Line 3 2140. In general, UBC 1 processed according to Process Line 1 2100 with batch annealing provided a greater amount of unrecrystallized grains than processing according to Process Line 2 2120 with batch annealing and Process Line 3 2140 with batch annealing.

Figure 45:
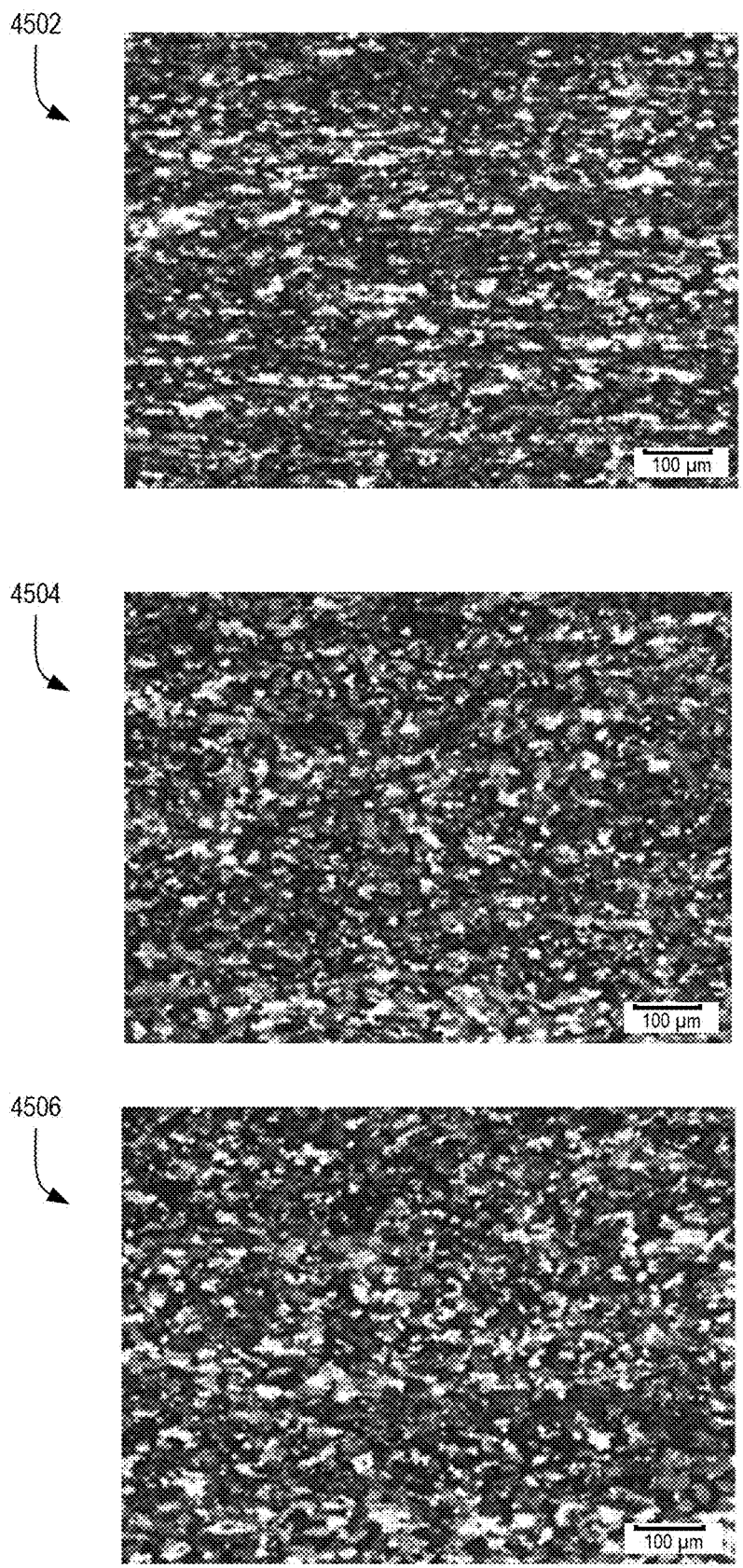
FIG. 45 depicts a set of micrographs for metal product samples prepared using UBC-based alloys according to certain aspects of the present disclosure.

FIG. 45 depicts micrographs showing particulate content of the alloys after the various processing routes with continuous annealing. Micrograph 4502 depicts the grain morphology of UBC 1 processed according to Process Line 1 2100, micrograph 4504 depicts the grain morphology of UBC 1 after processing according to Process Line 2 2120, and micrograph 4506 depicts the grain morphology of UBC 1 after processing according to Process Line 3 2140. The UBC 1 alloy processed with continuous annealing exhibited small, fine, recrystallized grains, in contrast with the grain structure of the UBC 1 alloy processed with batch annealing, which exhibited coarse and elongated grains. The difference in grain structure can be attributed to the heating rate and heat treatment temperature.

Figure 46:
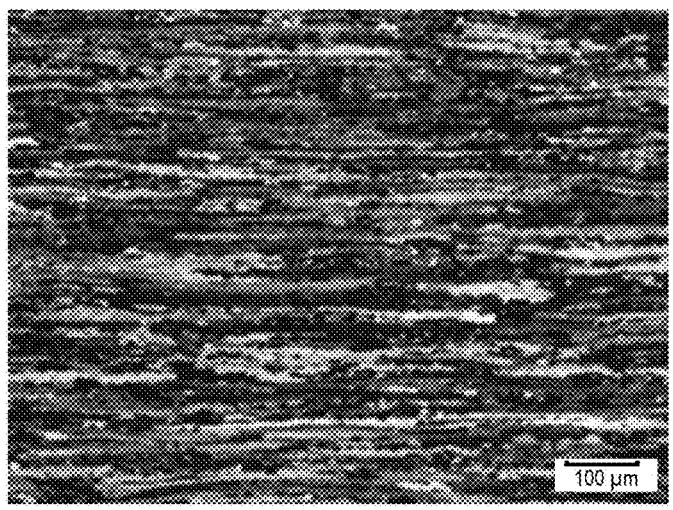
FIG. 46 depicts a set of micrographs for metal product samples prepared using UBC-based alloys according to certain aspects of the present disclosure.
Figure 46:
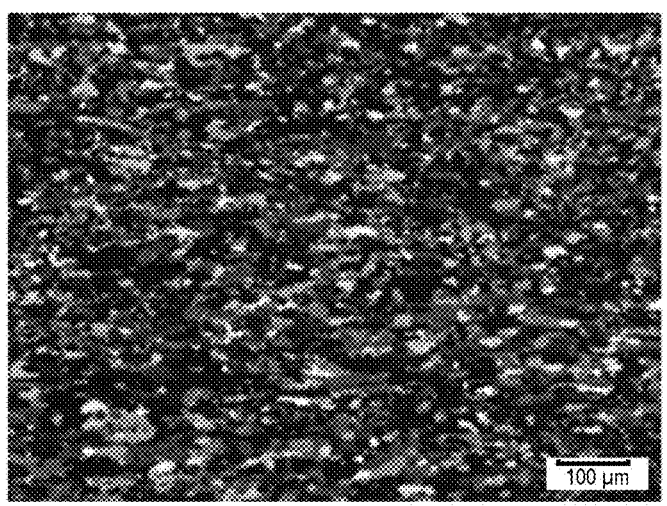
Figure 46:
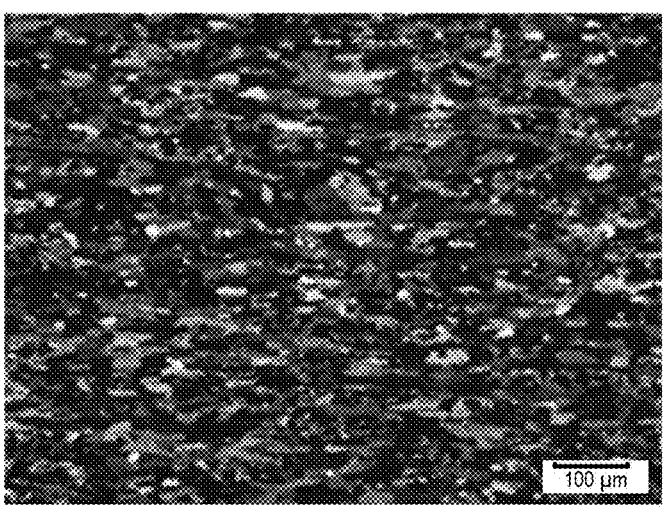

UBC-based alloy UBC 2 was prepared and processed according to Process Line 1 2100, Process Line 2 2120, and Process Line 3 2140 (see FIG. 21). Additionally, the alloy was subjected to batch annealing or continuous annealing as described above. FIG. 46 depicts micrographs showing the grain morphology of the alloys after the various processing routes with batch annealing. Micrograph 4602 depicts the grain morphology of UBC 2 processed according to Process Line 1 2100, micrograph 4604 depicts the grain morphology of UBC 2 after processing according to Process Line 2 2120, and micrograph 4606 depicts the grain morphology of UBC 2 after processing according to Process Line 3 2140. In general, UBC 2 processed according to Process Line 1 2100 with batch annealing provided a greater amount of unrecrystallized grains than processing according to Process Line 2 2120 with batch annealing and Process Line 3 2140 with batch annealing.

Figure 47:
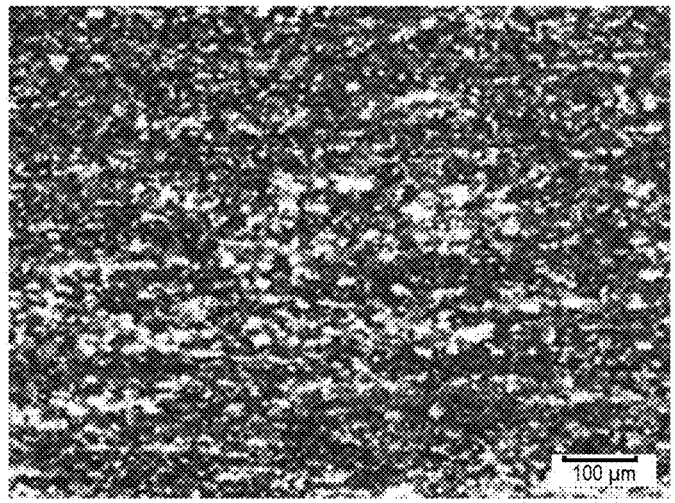
FIG. 47 depicts a set of micrographs for metal product samples prepared using UBC-based alloys according to certain aspects of the present disclosure.
Figure 47:
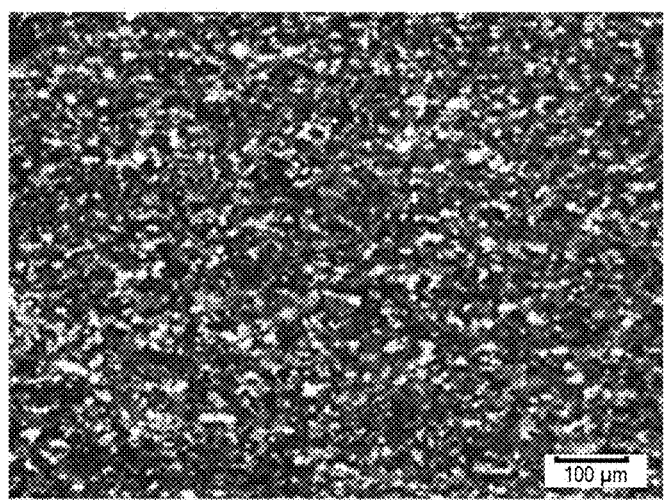
Figure 47:
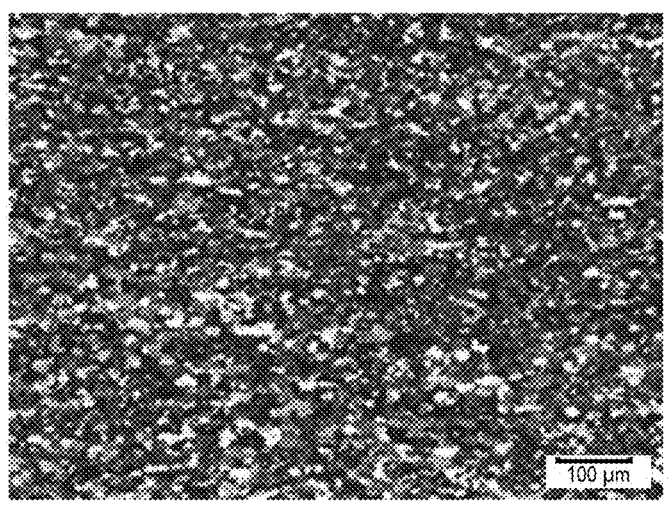

FIG. 47 depicts micrographs showing the grain morphology of the alloy after the various processing routes with continuous annealing. Micrograph 4702 depicts the grain morphology of UBC 2 processed according to Process Line 1 2100, micrograph 4704 depicts the grain morphology of UBC 2 after processing according to Process Line 2 2120, and micrograph 4706 depicts the grain morphology of UBC 2 after processing according to Process Line 3 2140. UBC 2 processed with continuous annealing exhibited a fine, small, recrystallized grain structure, whereas UBC 2 processed with batch annealing (FIG. 46) resulted in relatively coarse grains with some elongated grains. The differences in grain structure can be due to the heating rate and heat treatment temperature.

Figure 48:
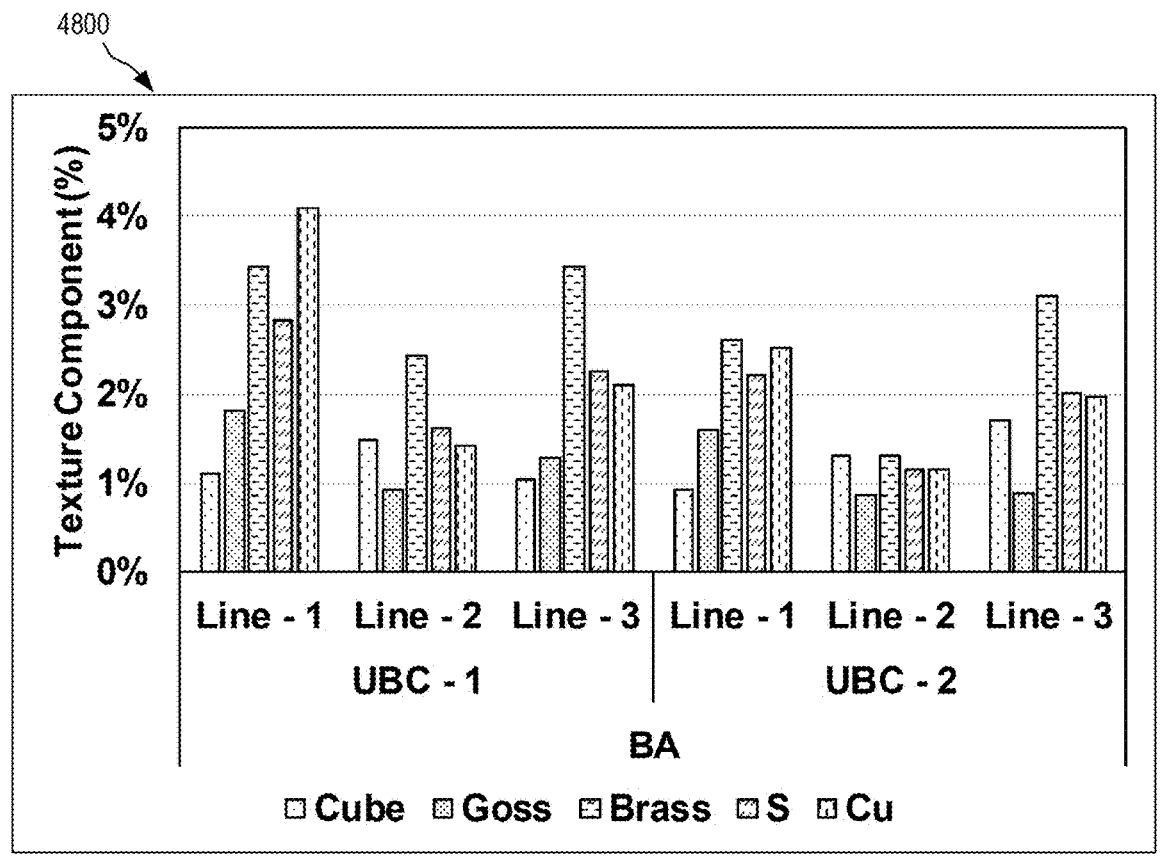
FIG. 48 is a chart depicting the texture component content for metal product samples prepared using UBC-based alloys according to certain aspects of the present disclosure.
Figure 49:
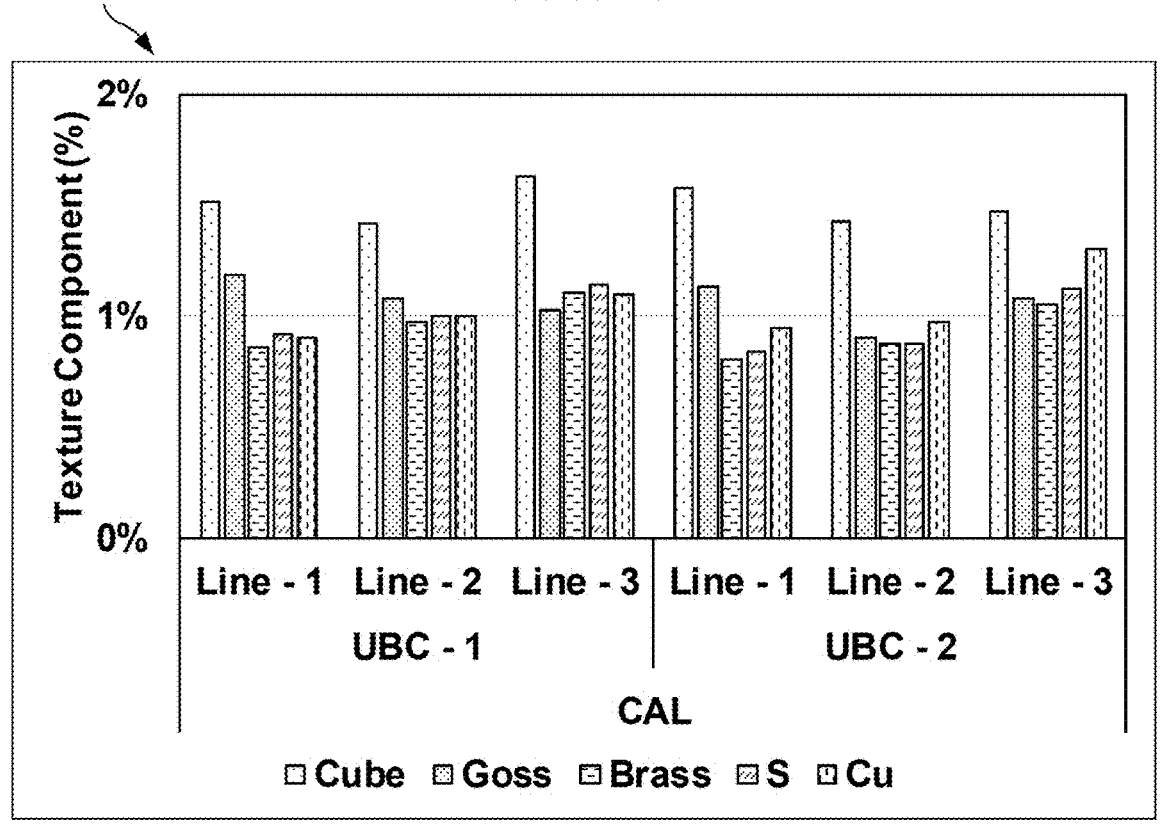
FIG. 49 is a chart depicting the texture component content for metal product samples prepared using UBC-based alloys according to certain aspects of the present disclosure.

UBC-based alloys UBC 1 and UBC 2 were prepared and processed according to Process Line 1 2100, Process Line 2 2120, and Process Line 3 2140 (see FIG. 21), all with batch annealing, as described above. FIG. 48 is a chart 4800 depicting the texture component content of the alloys after processing with batch annealing, including Cube, Goss, Brass, S, and Copper ("Cu"). Additionally, the alloys were prepared and processed according to Process Line 1 2100, Process Line 2 2120, and Process Line 3 2140, all with continuous annealing, as described above. FIG. 49 is a chart 4900 depicting the texture component content of the alloys after processing with continuous annealing, including Cube, Goss, Brass, S, and Copper ("Cu"). The alloys processed with batch annealing exhibited a greater amount of rolled texture components (e.g., Brass, S, and Cu) compared to the alloys processed with continuous annealing. However, the alloys processed with continuous annealing exhibited a more random and uniform texture, regardless of processing route and subsequent thermal treatment.

Figure 50:
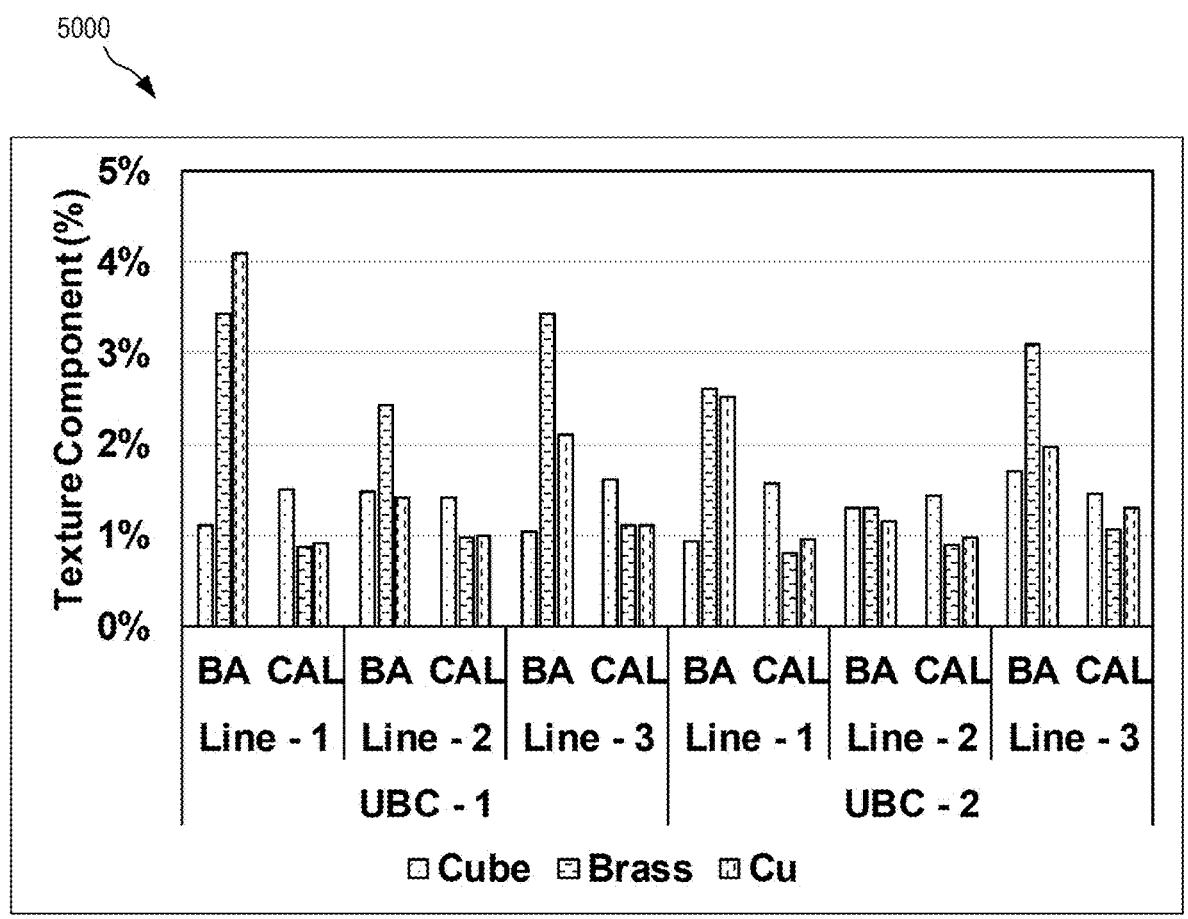
FIG. 50 is a chart depicting the texture component content for metal product samples prepared using UBC-based alloys according to certain aspects of the present disclosure.

FIG. 50 is a chart 5000 depicting a comparison of the texture components Cube, Brass, and Cu in UBC 1 and UBC 2 alloys processed according to Process Line 1 2100, Process Line 2 2120, and Process Line 3 2140 (see FIG. 21), with batch annealing or continuous annealing. The alloys processed with batch annealing exhibited a greater amount of rolled textures (e.g., Brass and Cu) than the alloys processed with continuous annealing. The alloys processed with continuous annealing exhibited more of a random, uniform texture.

Figure 51:
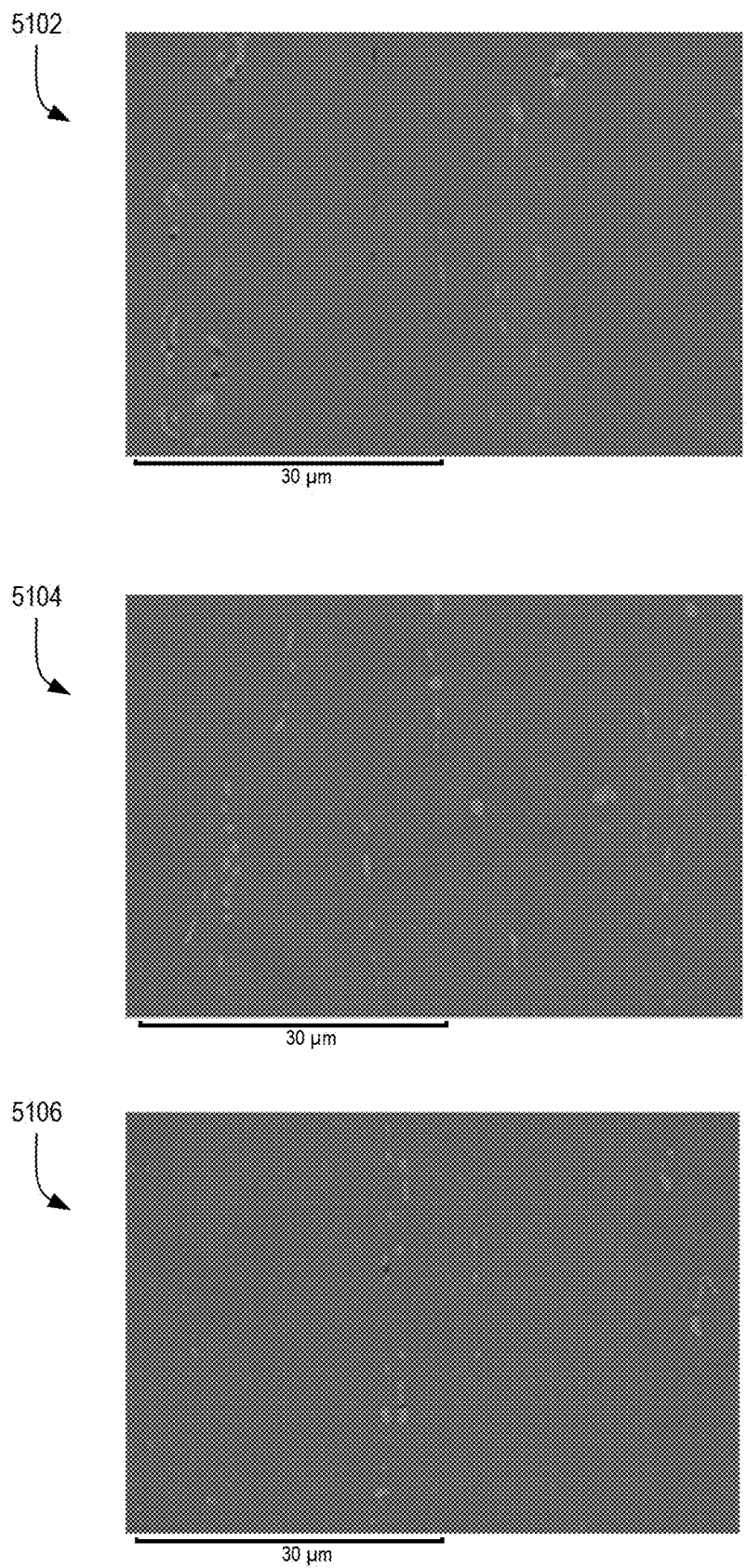
FIG. 51 depicts a set of micrographs for metal product samples prepared using UBC-based alloys according to certain aspects of the present disclosure.

FIG. 51 depicts scanning electron microscope (SEM) micrographs of UBC 1 processed as described above with continuous annealing (CAL). Micrograph 5102 depicts precipitate formation in UBC 1 after processing via Process Line 1 2100, micrograph 5104 depicts precipitate formation in UBC 1 after processing via Process Line 2 2120, and micrograph 5106 depicts precipitate formation in UBC 1 after processing via Process Line 3 2140.

Figure 52:
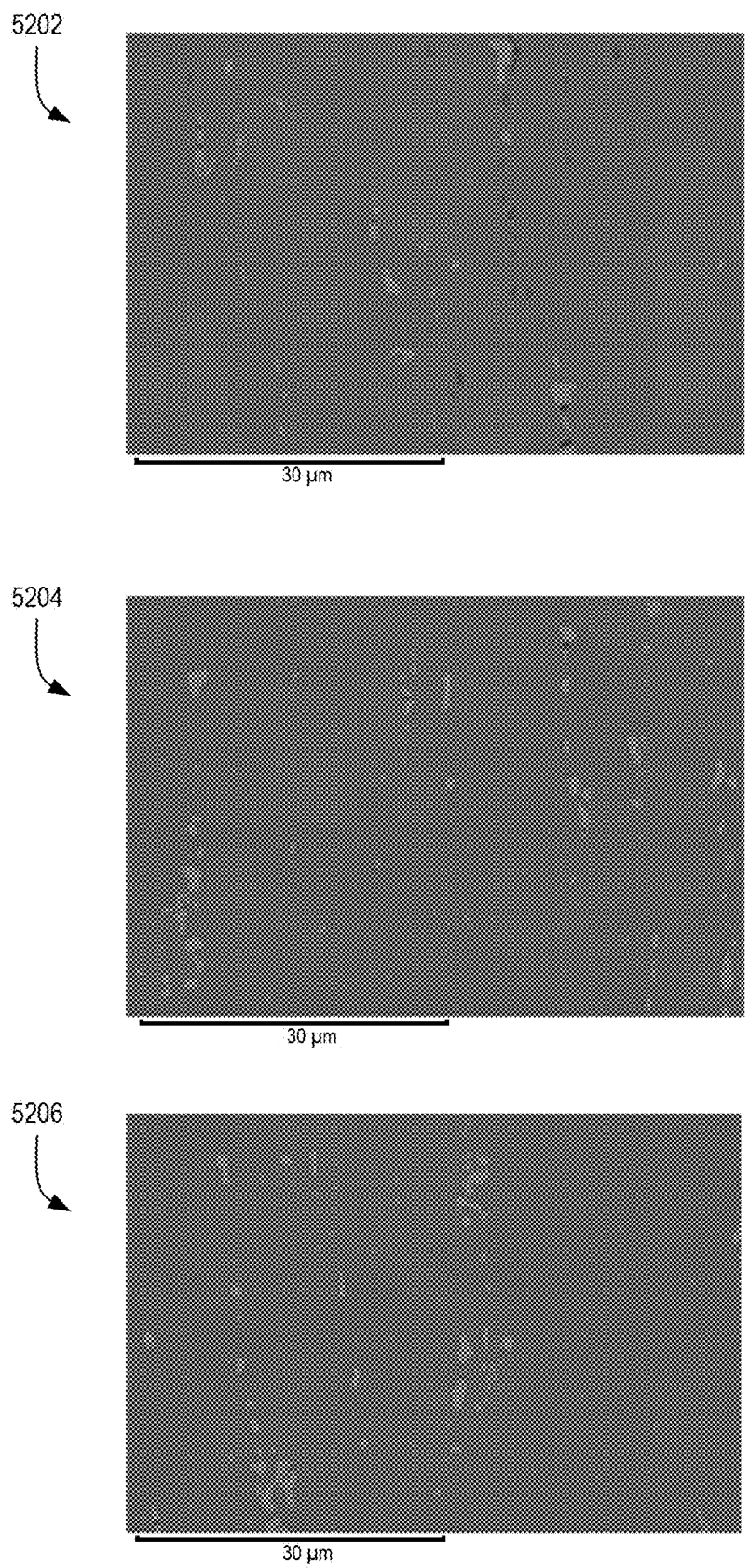
FIG. 52 depicts a set of micrographs for metal product samples prepared using UBC-based alloys according to certain aspects of the present disclosure.

FIG. 52 depicts SEM micrographs of UBC 2 processed via Process Line 1 2100 with continuous annealing (micrograph 5202), UBC 2 processed via Process Line 2 2120 with continuous annealing (micrograph 5204), and UBC 2 processed via Process Line 3 2140 with continuous annealing (micrograph 5206). For both alloys, Process Line 1 2100 provided undissolved precipitates which is attributed to the lack of homogenization after hot rolling. No significant difference in Fe-constituents was observed for UBC 1 or UBC 2 processed via Process Line 2 2120 or Process Line 3 2140.

Figure 53:
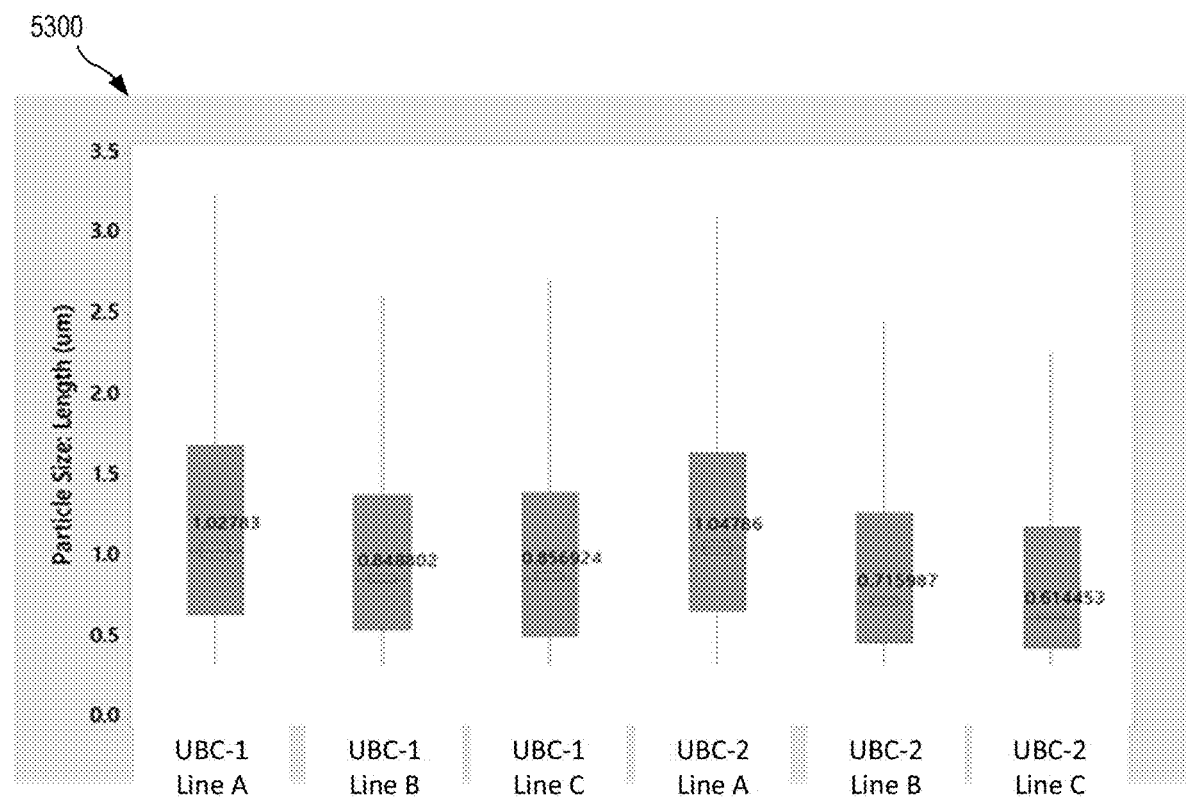
FIG. 53 is a chart depicting the particle size distribution for metal product samples prepared using UBC-based alloys according to certain aspects of the present disclosure.
Figure 54:
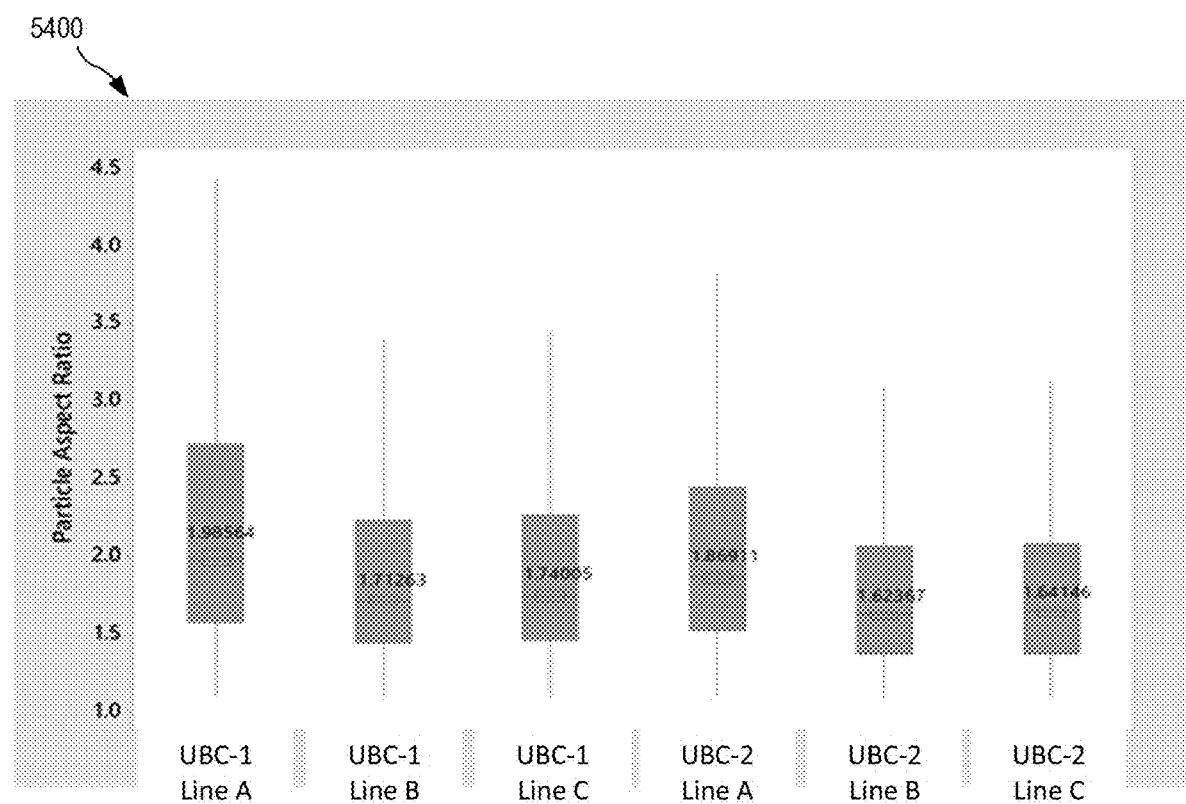
FIG. 54 is a chart depicting the particle aspect ratio for metal product samples prepared using UBC-based alloys according to certain aspects of the present disclosure.

Scanning electron microscopy was employed for further analysis of the precipitate particles found in UBC 1 and UBC 2. FIG. 53 is a chart 5300 depicting the particle size distribution in the alloys after processing according to Processes Line 1 2100, Process Line 2 2120, and Process Line 3 2140. FIG. 54 is a chart 5400 depicting the particle aspect ratio in the alloys after processing according to Processes Line 1 2100, Process Line 2 2120, and Process Line 3 2140. Both alloys processed according to Process Line 1 2100 exhibited 20% to 40% longer Fe-containing constituent particles (see FIG. 53) and an aspect ratio that was 15% to 20% higher for Fe-containing constituent particles (see FIG. 54) than the alloys processed according to Process Line 2 2120 and Process Line 3 2140. The differences in alloys processed according to Process Line 1 2100 can be attributed to the lack of homogenization.

Figure 55:
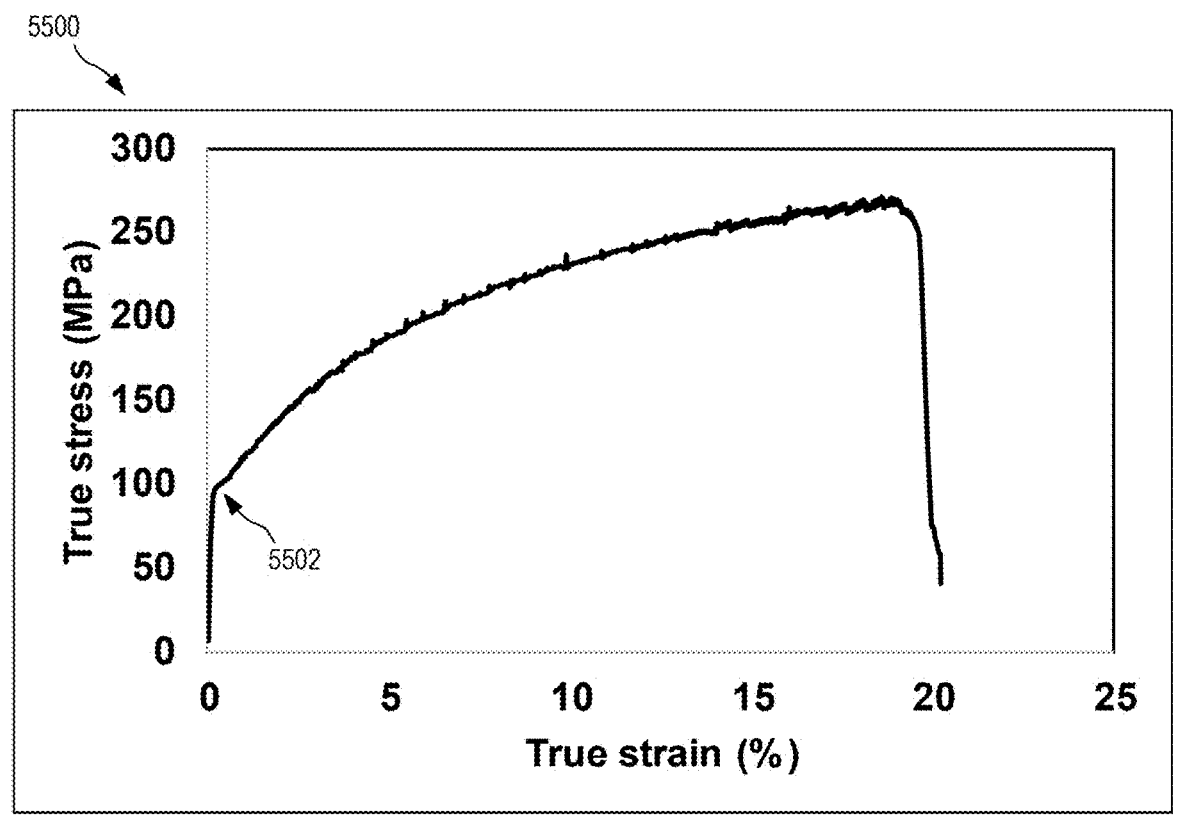
FIG. 55 is a chart depicting a stress-strain curve for a metal product sample prepared using UBC-based alloys according to certain aspects of the present disclosure.
Figure 56:
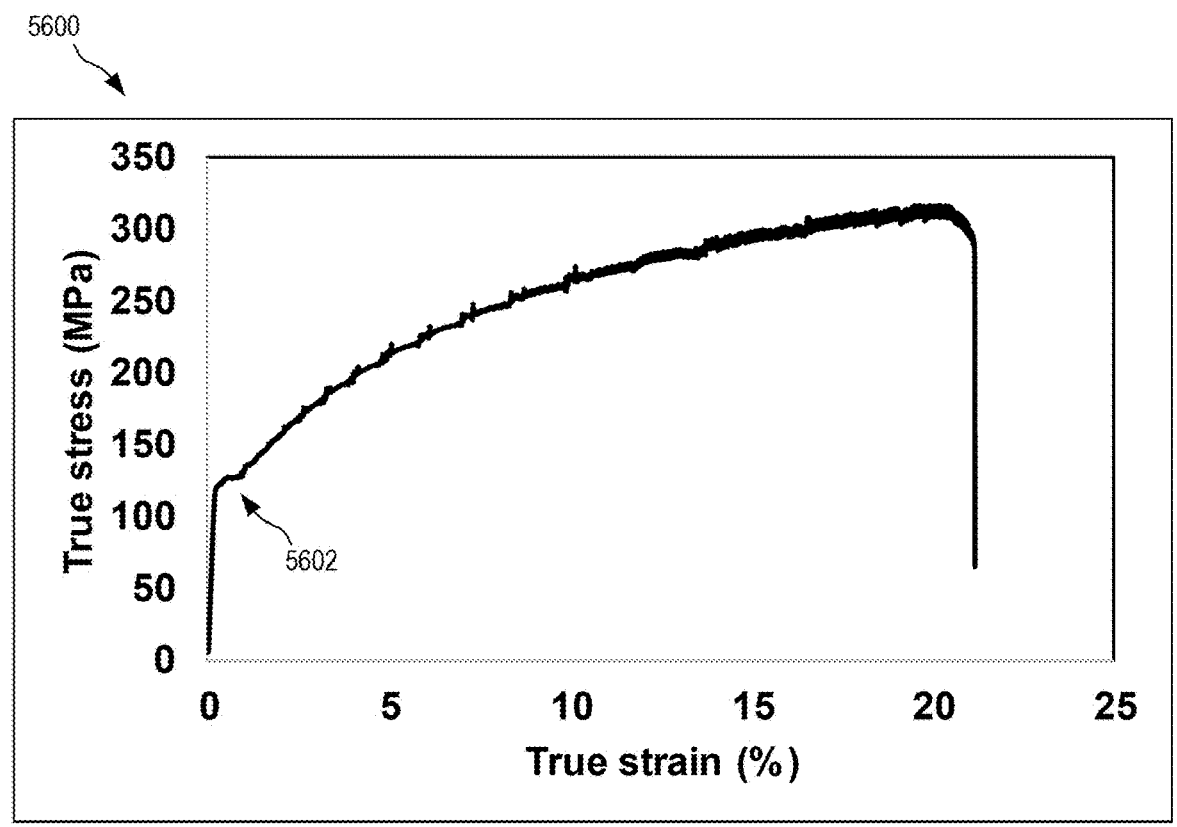
FIG. 56 is a chart depicting a stress-strain curve for a metal product sample prepared using UBC-based alloys according to certain aspects of the present disclosure.
Figure 57:
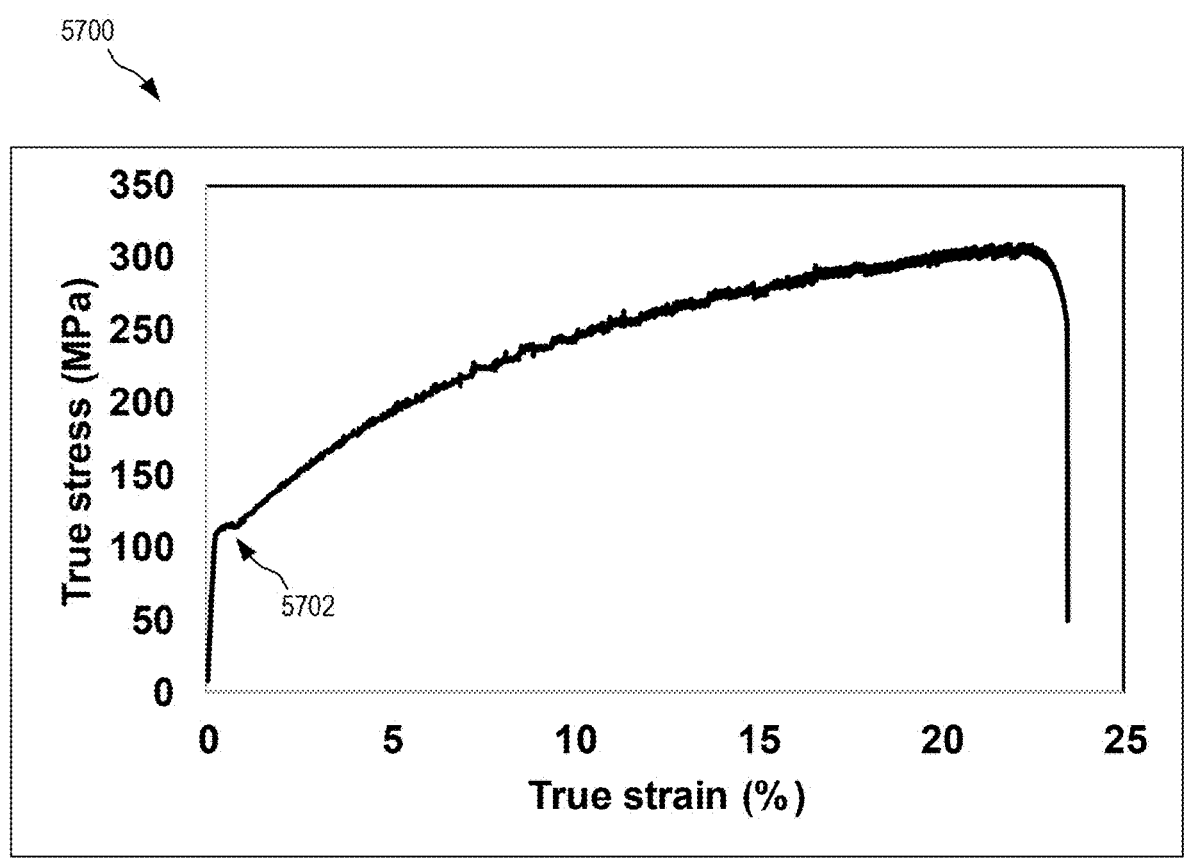
FIG. 57 is a chart depicting a stress-strain curve for a metal product sample prepared using UBC-based alloys according to certain aspects of the present disclosure.

UBC-based alloys UBC 1 and UBC 2, along with 5754CC 1, were prepared and processed according to Process Line 1 2100 with continuous annealing (CAL) as described above. Stress-strain curves of UBC 1 (see FIG. 55), UBC 2 (see FIG. 56), and 5754CC 1 (see FIG. 57) show that all alloys exhibited similar Lüder bands 5502 (see FIG. 55), 5602 (see FIG. 56), 5702 (see FIG. 57) before the start of homogenous deformation. UBC 1 exhibited insignificant yield point elongation (see FIG. 55) as compared to 5754CC 1 (see FIG. 57). Conversely, UBC 2 exhibited a similar yield point elongation (see FIG. 56) to 5754CC 1 (see FIG. 57), as shown by the similar onset of homogenous deformation at about 0.3%-0.4% true strain.

All patents, publications, and abstracts cited above are incorporated herein by reference in their entireties. Various embodiments of the invention have been described in fulfillment of the various objectives of the invention. It should be recognized that these embodiments are merely illustrative of the principles of the present invention. Numerous modifications and adaptions thereof will be readily apparent to those skilled in the art without departing from the spirit and scope of the present invention as defined in the following claims.

What is claimed is:
1. A metal casting method comprising:
melting recycled aluminum into liquid metal;
adding an alloying element to the liquid metal to form a modified liquid metal, the alloying element comprising magnesium, silicon, copper, or combinations thereof;
casting the modified liquid metal into a metal product, wherein the modified liquid metal comprises at least

50% recycled aluminum and a hydrogen content during casting of from 0.08 mL/100 g to 0.25 mL/100 g;
rolling the metal product; and
reheating the metal product to an annealing temperature after the rolling, wherein the annealing temperature is below a solidus temperature for the metal product.

2. The metal casting method of claim 1, wherein the rolling comprises hot rolling the metal product to a gauge for delivery.

3. The metal casting method of claim 2, wherein the gauge for delivery is an intermediate gauge.

4. The metal casting method of claim 2, wherein the gauge for delivery is a final gauge.

5. The metal casting method of claim 1, wherein the rolling comprises cold rolling the metal product to a gauge for delivery.

6. The metal casting method of claim 5, wherein the gauge for delivery is an intermediate gauge.

7. The metal casting method of claim 5, wherein the gauge for delivery is a final gauge.

8. The metal casting method of claim 1, wherein the rolling comprises hot rolling and cold rolling the metal product.

9. The metal casting method of claim 1, wherein the modified liquid metal comprises magnesium in an amount of up to 7 wt. %.

10. The metal casting method of claim 1, wherein the modified liquid metal comprises magnesium in an amount of at least 1.5 wt. %.

11. The metal casting method of claim 1, wherein the modified liquid metal comprises magnesium in an amount of from 1.5 wt. % to 4 wt. %.

12. The metal casting method of claim 1, wherein the casting comprises continuously casting the modified liquid metal.

13. The metal casting method of claim 1, wherein the casting comprises direct chill casting the modified liquid metal.

14. The metal casting method of claim 1, wherein the recycled aluminum comprises used beverage can scrap containing a mixture of recycled metal from can ends and can bodies.

15. The metal casting method of claim 1, wherein the modified liquid metal comprises at least 60% recycled aluminum.

16. The metal casting method of claim 15, wherein the modified liquid metal comprises at least 80% recycled aluminum.

17. A metal product cast from recycled materials according to the metal casting method of claim 1.

18. A metal product, comprising an aluminum alloy comprising 0.01 wt. % to 1.0 wt. % Cu, 0.15 wt. % to 0.8 wt. % Fe, 0.5 wt. % to 7.0 wt. % Mg, 0.01 wt. % to 1.2 wt. % Mn, up to 1.5 wt. % Si, up to 0.15 wt. % impurities, and Al,
wherein the metal product is cast from a modified liquid metal that comprises at least 50% of a recycled aluminum and a hydrogen content during casting of from 0.08 mL/100 g to 0.25 mL/100 g.

19. The metal product of claim 18, wherein the aluminum alloy comprises 0.1 to 0.9 wt. % Cu, 0.25 wt. % to 0.7 wt. % Fe, 1.0 wt. % to 5.0 wt. % Mg, 0.1 wt. % to 0.9 wt. % Mn, 0.01 wt. % to 1.0 wt. % Si, 0.01 wt. % to 0.15 wt. % Ti, 0.01 wt. % to 5.0 wt. % Zn, 0.01 wt. % to 0.25 wt. % Cr, 0.01 wt. % to 0.1 wt. % Zr, up to 0.15 wt. % impurities, and Al.

20. The metal product of claim 18, wherein the aluminum alloy comprises 0.2 to 0.8 wt. % Cu, 0.3 wt. % to 0.6 wt. % Fe, 1.4 wt. % to 3.0 wt. % Mg, 0.2 wt. % to 0.7 wt. % Mn, 0.2 wt. % to 0.5 wt. % Si, 0.02 wt. % to 0.1 wt. % Ti, 0.02 wt. % to 3.0 wt. % Zn, 0.02 wt. % to 0.1 wt. % Cr, 0.02 wt. % to 0.05 wt. % Zr, up to 0.15 wt. % impurities, and Al.

21. The metal product of claim 18, wherein the modified liquid metal includes at least 60% of the recycled aluminum.

22. The metal product of claim 18, wherein the modified liquid metal includes at least 80% of the recycled aluminum.

23. The metal product of claim 18, wherein the recycled aluminum comprises used beverage can scrap comprising a mixture of recycled metal from can ends and can bodies.

24. The metal product of claim 18, wherein the metal product comprises a yield strength of at least 100 MPa.

25. The metal product of claim 18, wherein the metal product comprises an ultimate tensile strength of at least 210 MPa.

26. The metal product of claim 18, wherein the metal product comprises a uniform elongation of at least 18%.

27. The metal product of claim 18, wherein the metal product comprises a total elongation of at least 20.5%.

28. The metal product of claim 18, wherein the metal product comprises Fe-containing constituents.

29. The metal product of claim 28, wherein the Fe-containing constituents have a length ranging from 0.6 μm to 1.8 μm.

30. The metal product of claim 18, wherein the metal product comprises intermetallic particles having a width to height ratio of 3 or less.

* * * * *